(12) United States Patent
Lyons et al.

(10) Patent No.: US 8,522,144 B2
(45) Date of Patent: Aug. 27, 2013

(54) MEDIA EDITING APPLICATION WITH CANDIDATE CLIP MANAGEMENT

(75) Inventors: Charles Lyons, San Francisco, CA (US); Wendy Van Wazer, Campbell, CA (US)

(73) Assignee: Apple Inc., Cupertino, CA (US)

( * ) Notice: Subject to any disclaimer, the term of this patent is extended or adjusted under 35 U.S.C. 154(b) by 216 days.

(21) Appl. No.: 12/688,858

(22) Filed: Jan. 15, 2010

(65) Prior Publication Data

US 2010/0281386 A1    Nov. 4, 2010

Related U.S. Application Data

(63) Continuation-in-part of application No. 12/551,557, filed on Aug. 31, 2009, and a continuation-in-part of application No. 12/433,875, filed on Apr. 30, 2009.

(60) Provisional application No. 61/174,490, filed on Apr. 30, 2009, provisional application No. 61/227,070, filed on Jul. 20, 2009, provisional application No. 61/174,491, filed on Apr. 30, 2009.

(51) Int. Cl.
*G06F 3/00* (2006.01)

(52) U.S. Cl.
USPC ............ 715/723; 715/726; 715/724; 715/720

(58) Field of Classification Search
USPC .......................................... 715/721, 730–732
See application file for complete search history.

(56) References Cited

U.S. PATENT DOCUMENTS

| 5,442,744 A | * | 8/1995 | Piech et al. .................... 715/251 |
| 5,519,828 A | | 5/1996 | Rayner |
| 5,659,539 A | | 8/1997 | Porter et al. |
| 5,664,216 A | | 9/1997 | Blumenau |
| 5,682,326 A | | 10/1997 | Klingler et al. |
| 5,760,767 A | * | 6/1998 | Shore et al. .................... 715/723 |
| 5,781,188 A | | 7/1998 | Amiot et al. |
| 5,826,102 A | | 10/1998 | Escobar et al. |

(Continued)

FOREIGN PATENT DOCUMENTS

| WO | WO 2007/120694 | 10/2007 |
| WO | WO 2010/106586 | 9/2010 |

OTHER PUBLICATIONS

Casares, Juan, et al., "Simplifying Video Editing Using Metadata," Proceedings of Designing Interactive Systems (DIS 2002), Jun. 2002, pp. 157-166, London, United Kingdom.

(Continued)

*Primary Examiner* — Tuyetlien Tran
*Assistant Examiner* — Abimbola Ayeni
(74) *Attorney, Agent, or Firm* — Adeli & Tollen LLP

(57) ABSTRACT

A computer readable medium storing a media editing application for creating media presentations is described. The application includes a graphical user interface (GUI). The GUI has (1) a presentation display area for displaying a composite presentation that the application creates by compositing several media clips, (2) a composite display area for displaying a set of graphical representations that represent a set of committed media clips that are committed to be a part of the composite presentation, (3) several selectable location markers that are associated with several locations in the composite display area, and (4) an audition display area associated with each location marker for receiving and displaying one or more candidate media clips for adding to the composite presentation at the location of the associated location marker.

16 Claims, 25 Drawing Sheets

(56) References Cited

U.S. PATENT DOCUMENTS

| | | | |
|---|---|---|---|
| 5,930,446 A | 7/1999 | Kanda | |
| 6,031,529 A * | 2/2000 | Migos et al. | 715/783 |
| 6,144,375 A * | 11/2000 | Jain et al. | 715/251 |
| 6,154,600 A * | 11/2000 | Newman et al. | 386/281 |
| 6,154,601 A | 11/2000 | Yaegashi et al. | |
| 6,161,115 A | 12/2000 | Ohanian | |
| 6,204,840 B1 * | 3/2001 | Petelycky et al. | 715/202 |
| 6,304,261 B1 * | 10/2001 | Shields et al. | 715/702 |
| 6,305,373 B1 * | 10/2001 | Wallace et al. | 128/204.21 |
| 6,324,335 B1 | 11/2001 | Kanda | |
| 6,400,378 B1 | 6/2002 | Snook | |
| 6,414,686 B1 | 7/2002 | Protheroe et al. | |
| 6,469,711 B2 | 10/2002 | Foreman et al. | |
| 6,486,896 B1 * | 11/2002 | Ubillos | 715/784 |
| 6,539,163 B1 | 3/2003 | Sheasby et al. | |
| 6,546,188 B1 * | 4/2003 | Ishii et al. | 386/280 |
| 6,628,303 B1 | 9/2003 | Foreman et al. | |
| 6,650,826 B1 | 11/2003 | Hatta | |
| 6,658,194 B1 | 12/2003 | Omori | |
| 6,674,955 B2 | 1/2004 | Matsui et al. | |
| 7,073,127 B2 | 7/2006 | Zhao et al. | |
| 7,313,755 B2 * | 12/2007 | Rahman et al. | 715/203 |
| 7,325,199 B1 * | 1/2008 | Reid | 715/723 |
| 7,432,940 B2 | 10/2008 | Brook et al. | |
| 7,434,155 B2 | 10/2008 | Lee | |
| 7,444,593 B1 | 10/2008 | Reid | |
| 7,561,160 B2 | 7/2009 | Fukuya | |
| 7,623,755 B2 * | 11/2009 | Kuspa | 386/282 |
| 7,788,592 B2 * | 8/2010 | Williams et al. | 715/764 |
| 7,805,678 B1 | 9/2010 | Niles et al. | |
| 7,809,802 B2 | 10/2010 | Lerman et al. | |
| 7,889,975 B2 * | 2/2011 | Slone | 386/280 |
| 7,890,867 B1 | 2/2011 | Margulis | |
| 2001/0020953 A1 | 9/2001 | Moriwake et al. | |
| 2001/0036356 A1 | 11/2001 | Weaver et al. | |
| 2001/0040592 A1 * | 11/2001 | Foreman et al. | 345/723 |
| 2002/0023103 A1 * | 2/2002 | Gagne | 707/501.1 |
| 2002/0154140 A1 | 10/2002 | Tazaki | |
| 2002/0154156 A1 | 10/2002 | Moriwake et al. | |
| 2002/0156805 A1 | 10/2002 | Schriever et al. | |
| 2002/0188628 A1 | 12/2002 | Cooper et al. | |
| 2003/0001880 A1 | 1/2003 | Holtz et al. | |
| 2003/0018609 A1 | 1/2003 | Phillips et al. | |
| 2003/0025676 A1 * | 2/2003 | Cappendijk | 345/173 |
| 2003/0117431 A1 | 6/2003 | Moriwake et al. | |
| 2004/0001106 A1 * | 1/2004 | Deutscher et al. | 345/838 |
| 2004/0071441 A1 | 4/2004 | Foreman et al. | |
| 2004/0078761 A1 * | 4/2004 | Ohanian | 715/530 |
| 2004/0125124 A1 | 7/2004 | Kim et al. | |
| 2004/0151469 A1 | 8/2004 | Engholm et al. | |
| 2004/0201609 A1 | 10/2004 | Obrador | |
| 2005/0034056 A1 * | 2/2005 | Rubin et al. | 715/500 |
| 2005/0132293 A1 | 6/2005 | Herberger et al. | |
| 2005/0257152 A1 | 11/2005 | Shimizu et al. | |
| 2006/0008247 A1 | 1/2006 | Minami et al. | |
| 2006/0156246 A1 * | 7/2006 | Williams et al. | 715/764 |
| 2006/0181736 A1 * | 8/2006 | Quek et al. | 358/1.18 |
| 2006/0265657 A1 * | 11/2006 | Gilley | 715/730 |
| 2006/0277454 A1 * | 12/2006 | Chen | 715/500.1 |
| 2007/0154190 A1 * | 7/2007 | Gilley et al. | 386/125 |
| 2007/0262995 A1 | 11/2007 | Tran | |
| 2008/0044155 A1 | 2/2008 | Kuspa | |
| 2008/0152297 A1 | 6/2008 | Ubillos | |
| 2008/0152298 A1 | 6/2008 | Ubillos | |
| 2008/0155420 A1 | 6/2008 | Ubillos et al. | |
| 2008/0155421 A1 * | 6/2008 | Ubillos et al. | 715/724 |
| 2008/0184288 A1 * | 7/2008 | Lipscomb | 725/32 |
| 2008/0253735 A1 | 10/2008 | Kuspa et al. | |
| 2009/0131177 A1 | 5/2009 | Pearce | |
| 2009/0172543 A1 | 7/2009 | Cronin et al. | |
| 2010/0278504 A1 * | 11/2010 | Lyons et al. | 386/52 |
| 2010/0281371 A1 * | 11/2010 | Warner et al. | 715/720 |
| 2010/0281372 A1 * | 11/2010 | Lyons et al. | 715/720 |
| 2010/0281375 A1 * | 11/2010 | Pendergast et al. | 715/723 |
| 2010/0281376 A1 | 11/2010 | Meaney et al. | |
| 2010/0281379 A1 * | 11/2010 | Meaney et al. | 715/723 |
| 2010/0281381 A1 * | 11/2010 | Meaney et al. | 715/723 |
| 2010/0281382 A1 * | 11/2010 | Meaney et al. | 715/723 |
| 2010/0281383 A1 * | 11/2010 | Meaney et al. | 715/723 |
| 2010/0281384 A1 * | 11/2010 | Lyons et al. | 715/723 |
| 2010/0281385 A1 * | 11/2010 | Meaney et al. | 715/731 |
| 2012/0079381 A1 * | 3/2012 | Swenson et al. | 715/716 |
| 2012/0079382 A1 * | 3/2012 | Swenson et al. | 715/716 |

OTHER PUBLICATIONS

Chisan, James, et al., "Video Bench—Final Report: SEng 480a/CSc 586a," Apr. 11, 2003, University of Victoria.

Myers, Brad A., et al., "A Multi-View Intelligent Editor for Digital Video Libraries," The First ACM+IEEE Joint Conference on Digital Libraries (JCDL'01), Jun. 24-28, 2001, pp. 106-115, Roanoke, VA, USA.

Author Unknown, "Apple Announces Final Cut Pro 4," NAB, Apr. 6, 2003, 3 pages, Apple Inc., Las Vegas, NV, USA.

Author Unknown, "iMovie '08 Getting Started," month unknown, 2008, pp. 1-50, Apple Inc., USA.

Author Unknown, "Using Adobe Premiere Elements 8 Editor," updated Aug. 12, 2010, 313 pages, Adobe Systems Incorporated, San Jose, California, USA.

Author Unknown, "Adobe Premiere Pro CS3: User Guide," Apr. 1, 2008, 455 pages, Adobe Systems Incorporated, San Jose, California, USA.

Brenneis, Lisa, "Final Cut Pro 3 for Macinotsh: Visual QuickPro Guide," Apr. 2002, 288 pages, Peachpit Press, Berkeley, California, USA.

* cited by examiner

MEDIA EDITING APPLICATION WITH CANDIDATE CLIP MANAGEMENT

CLAIM OF BENEFIT TO PRIOR APPLICATIONS

This application claims benefit to U.S. Provisional Patent Application No. 61/174,490 entitled "Media Clip Auditioning Used to Evaluate Uncommitted Media Content", filed Apr. 30, 2009. This application also claims benefit to U.S. Provisional Patent Application No. 61/227,070 entitled "Segmented Timeline for a Media-Editing Application", filed Jul. 20, 2009. In addition, this application is a Continuation in Part of U.S. Non-provisional patent application Ser. No. 12/433,875, now published as United States Publication No. 2010/0281371, entitled "Navigation Tool for Video Presentations", filed on Apr. 30, 2009. This application is also a Continuation in Part of U.S. Non-provisional patent application Ser. No. 12/551,557, now published as United States Publication number 2010/0281381, entitled "Graphical User Interface for a Media-Editing Application With a Segmented Timeline", filed on Aug. 31, 2009. U.S. Non-provisional patent application Ser. No. 12/551,557 claims the benefit of U.S. Provisional Patent Application No. 61/174,490 entitled "Media Clip Auditioning Used to Evaluate Uncommitted Media Content", filed Apr. 30, 2009, U.S. Provisional Patent Application No. 61/174,491 entitled "Editing Key-Indexed Graphs in Media Editing Applications", filed Apr. 30, 2009, and U.S. Provisional Patent Application No. 61/227,070 entitled "Segmented Timeline for a Media-Editing Application", filed Jul. 20, 2009.

BACKGROUND

Digital graphic design, image editing, audio editing, and video editing applications (hereafter collectively referred to as media content editing applications or media editing applications) provide graphical designers, media artists, and other users with the necessary tools to create a variety of media content. Examples of such applications include Final Cut Pro® and iMovie®, both sold by Apple, Inc. These applications give users the ability to edit, combine, transition, overlay, and piece together different media content in a variety of manners to create a resulting media project. The resulting media project specifies a particular sequenced composition of any number of text, audio, image, and/or video content elements that is used to create a media presentation.

Various media editing applications facilitate such composition through electronic means. Specifically, a computer or other electronic device with a processor and computer readable storage medium executes the media content editing application. In so doing, the computer generates a graphical interface whereby designers digitally manipulate graphical representations of the media content to produce a desired result.

One difficulty in media editing is that a user cannot conveniently access various candidate clips for a particular section of a presentation. Typically, if a user wishes to evaluate different clips than those included in the composite presentation, the user must select from a large group of clips by iteratively accessing various media libraries.

Another difficulty in media editing is that a user cannot conveniently manage candidate clips (i.e., clips that are not included in a composite presentation) such that the clips can be easily accessed when modifying a particular section of the composite presentation. At any given time, the user may wish to associate one or more candidate clips (e.g., alternative "takes" of a scene, alternative content, etc.) with a particular section of a presentation. Thus, there is a need for a media editing application that allows a user to associate candidate clips with various sections of a composite presentation, thus allowing the user to retrieve the associated clips when evaluating a particular section of the composite presentation.

BRIEF SUMMARY

For a media editing application that creates composite presentations, some embodiments of the invention provide a novel audition display area that allows a user to examine and maintain several different clips that are candidates for addition at or near a particular location in a composite presentation. In some embodiments, the media editing application includes a composite display area (e.g., an area with multiple tracks that span a timeline) for displaying a graphical representation of the composite presentation by displaying graphical representations of the media clips that form the composite presentation. The audition display area in some of these embodiments is an area that is adjacent to the composite display area in order to help an editor to easily move clip representations between the audition display area and the composite display area. The audition display area in some embodiments lists or displays representations (e.g., thumbnail images, textual list, etc.) of the candidate clips associated with a particular location in the composite display area.

In some embodiments, the media editing application also includes several selectable location markers that are associated with several locations in the composite presentation (e.g., different location markers correspond to different instances in time in the composite presentation). For each location marker, the media editing application of some embodiments further includes an associated audition display area that can receive and display one or more clip representations of clips that are candidates for adding to the composite presentation at the location of the associated location marker. Some embodiments use one common audition display area for several or all location markers, while other embodiments use different audition display areas for different location markers.

Different embodiments use different types of location markers. For instance, the location markers in some embodiments are graphical markers (e.g., vertical signposts, two-dimensional objects, etc.) that are within or adjacent to the composite display area. In other embodiments, the location markers are pictorial representations of the media clips that are part of the composite presentation displayed in the composite display area. In some embodiments, the pictorial representations are thumbnail images of some or all of the media clips that are placed in the composite presentation that is represented in the composite display area. Like the graphical markers, the pictorial markers can be placed within or adjacent to the composite display area. For instance, in some embodiments that have the composite display area span a timeline, the pictorial markers are arranged in one or more rows above or within the composite display area.

Different embodiments provide different mechanisms for selecting location markers. For instance, some embodiments allow a user to select a location marker through (1) a keyboard input (e.g., through the use of arrow keys on the keyboard), (2) a cursor click operation (e.g., a single or double click operation), (3) a cursor drag operation (e.g., a drag operation that drags a media clip and drops it on the location marker), or (4) a display-screen touch operation (i.e., a user's touch on the display screen at the location of the marker). Other embodiments can provide yet other mechanisms for selecting a location marker.

The selection of a location marker causes the media editing application of some embodiments to open the audition display area associated with the location marker. Alternatively, in some embodiments, the selection of a location marker causes a section of the audition display area associated with the location marker to be displayed (e.g., when the audition display area was previously opened). When the audition display area has been previously opened, the selection of a location marker causes the media editing application to present the location of the audition display area associated with the location marker (e.g., when the audition display area is a common audition display area for all location markers).

Some embodiments do not have selectable location markers. For instance, some embodiments only have one audition display area for the one composite display area. In one such example, the audition display area is an area that is next to the composite display area and spans along it to provide multiple locations for placement of clips that are candidates for placement at nearby locations in the composite display area. Also, in some embodiments, the locations in the audition display area are scrollable through the audition display area just as the locations in the composite display area are scrollable through the composite display area (i.e., just as the composite presentation is scrollable through the composite display area).

In some embodiments, the audition display area opens, or presents a section associated with a selected location marker, in order to receive candidate media clips in the audition display area and to display previously received candidate media clips. Different embodiments provide different mechanisms for an audition display area to receive candidate media clips (i.e., to add candidate media clips to an audition display area). For example, some embodiments allow a user to add candidate media clips to an audition display area through a keyboard operation, cursor click operation, cursor drag operation, display-screen touch operation, or through some other mechanism for adding candidate clips to a display area.

The candidate media clips associated with a location marker are candidates for insertion in the composite display area at or near the location marker's associated location in the composite display area. In other words, the location markers and their associated audition display areas serve as repositories within the UI of the media editing applications for different locations in the composite display area for containing (e.g., storing, listing, displaying, etc.) media clips that are candidates for addition to the composite presentation at or near the locations of the markers.

In some embodiments, a single candidate clip may be automatically associated with more than one location marker corresponding to one or more consecutive sections of the presentation. When presenting the audition display area associated with a particular location marker, clips associated with surrounding markers may be displayed in addition to the candidate clips associated with the particular location marker. This allows a user to manage candidate clips at or near the section associated with the particular location marker. For instance, in some embodiments, all candidate clips are displayed for any section of the composite presentation that is currently represented in the composite display area.

When a candidate media clip is added to the composite presentation in the composite display area from an audition display area, some embodiments remove the candidate media clip from the audition display area as the clip is no longer a candidate for addition to the composite presentation but it is a clip that has been committed to the composite presentation (i.e., it is a "committed clip"). In other words, some embodiments only keep candidate media clips in an audition display area. Whenever a committed media clip is removed from a particular location in the composite display area, some embodiments add that media clip to the audition display area associated with the particular location, or provide the user with the option of adding the media clip to this audition display area.

Alternatively, in an audition display area that is associated with a particular location in the composite display area, some embodiments list media clips that are candidates for addition to that particular location as well as media clips that are committed to the composite presentation at that particular location (e.g., at the section of the composite presentation that corresponds to the particular location). Accordingly, some of these embodiments do not remove a candidate media clip from an audition display area after the clip has been added to the composite presentation at the display area's associated location. However, in this situation, some of these embodiments change the presentation of the clip in the audition display area to indicate that it has gone from being a candidate media clip for a particular location to a committed media clip for that location. Whenever a committed media clip is removed from a particular location in the composite display area, some embodiments change the media clip's designation in the audition display area associated with the particular location, or provide the user with the option of keeping the media clip in this audition display area but changing its designation.

Some embodiments allow a user to move a candidate clip from the audition display area to an area of a track that holds one or more other committed clips. In some of these embodiments, placing a candidate clip in this manner would change the attributes of a committed clip that it overlaps on the same track (e.g., by trimming the committed clip or pushing the committed clip along the timeline). In other embodiments, such a placement would remove the committed clip from the track (e.g., by placing the committed clip in the audition display area or removing the committed clip from the composite presentation) in the composite display area.

By using an audition display area, a user can iteratively swap the committed clips in the composite presentation with candidate clips that are listed in the audition display area. In this manner, the user can use the audition feature to examine different candidate clips for insertion in the composite presentation. This, in turn, allows the user to determine which, if any, of the candidate clips is ideal for inclusion in the composite presentation.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

For a media editing application that creates composite presentations, some embodiments of the invention provide a novel audition display area that allows a user to examine and maintain several different media clips that are candidates for addition at or near a particular location in a composite presentation (also referred to as "candidate clips"). A media clip is a graphical representation of a piece of media content that is stored on the computing device on which the media editing application executes, or on a computing device to which the media editing application has access. Examples of such content include audio data, video data, text data, pictures, and/or other media data. Accordingly, media clips are any kind of content clip (audio clip, video clip, text clip, picture clip, or other media clip) that can be used to create a composite presentation. A candidate clip is a clip that is included in a media project but is not included in a composite presentation created by the media editing application.

Figure 1:
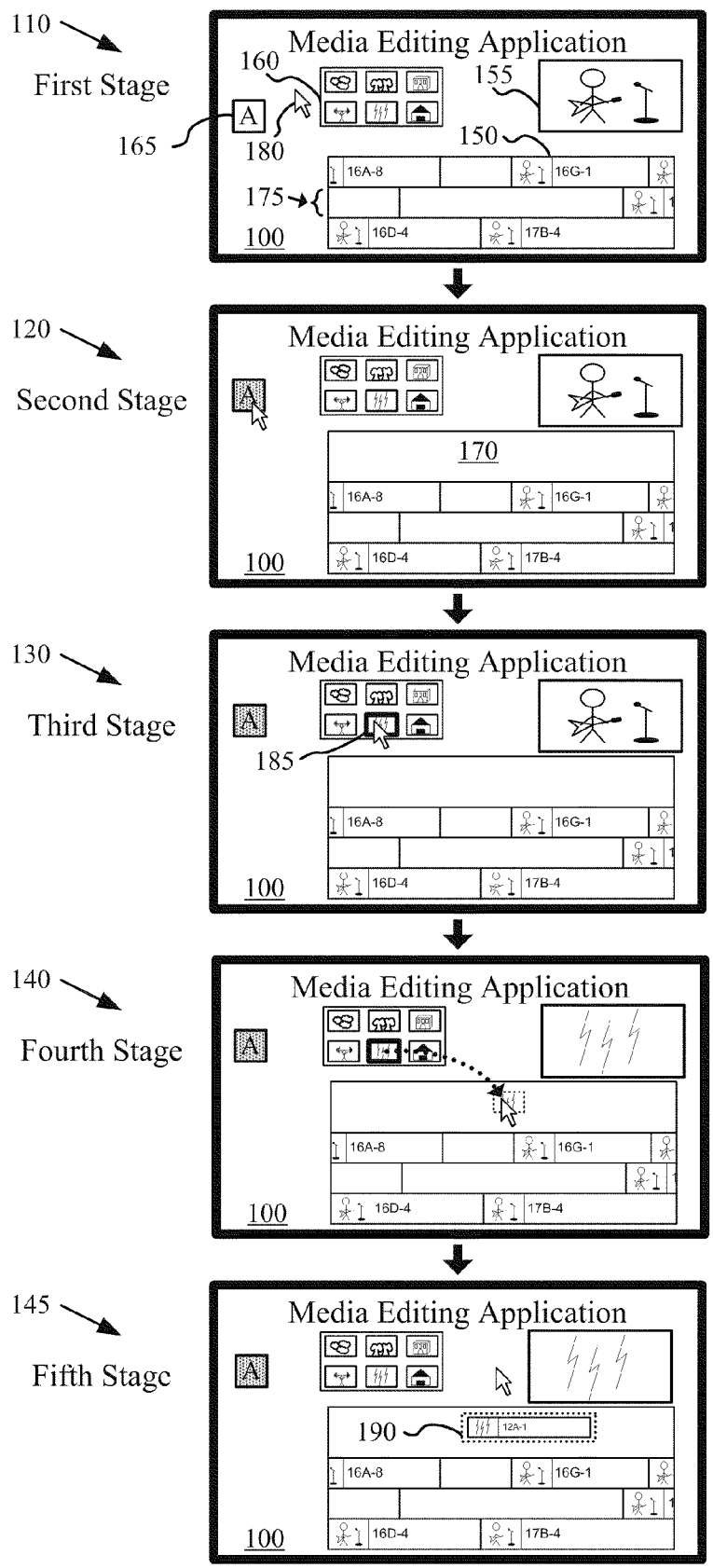
FIG. 1 illustrates a graphical user interface ("GUI") of a media editing application with an audition display area of some embodiments and the use of the area to manage candidate clips.

For some embodiments of the invention, FIG. 1 illustrates a graphical user interface ("GUI") 100 of a media editing application with such an audition display area. Specifically, this figure illustrates the GUI 100 at five different stages 110, 120, 130, 140 and 145 in order to show how the audition display area can be used to add a candidate clip at or near the particular location. Each of these stages will be further described below after an introduction of the elements of the GUI 100.

As shown in FIG. 1, the GUI 100 includes a composite display area 150, a preview display area 155, a media library 160, an audition activation GUI item 165, an audition display area 170, and one or more tracks (e.g., track 175) in the composite display area. The composite display area 150 includes multiple tracks that span a timeline and displays a graphical representation of the composite presentation (also called a "composite representation") by displaying media clips that form the composite presentation. The preview display area 155 displays a preview of a composite presentation that the application creates by compositing several media clips. The media library 160 is an area in the GUI 100 through which the application's user can select media clips to add to a presentation that the user is compositing with the application.

The audition activation item 165 is a conceptual illustration of one or more UI items that allows the audition feature to be invoked. Different embodiments of the invention implement this UI item differently. Some embodiments implement it as a UI button, others as a command that can be selected in a pull-down or drop-down menu, and still others as a navigation command that can be invoked through one or more keystroke operations. Yet other embodiments allow the user to invoke the audition tool through two or more of such UI implementations or other UI implementations.

As further described below by reference to FIG. 2, the selection of the activation item 165 causes the media editing application of some embodiments to display audition display markers (also referred to as "location markers") that can be used to open audition display areas for receiving candidate media clips. However, in the embodiment illustrated in FIG. 1, the invocation of the activation item 165 causes the media editing application to display the audition display area 170.

The audition display area 170 in some of these embodiments is an area that is adjacent to the composite display area in order to help an editor to easily move media clips between the audition display area and the composite display area. The audition display area in some embodiments lists or displays the media clips (e.g., displays them as thumbnail images, textual list, etc.) associated with a particular location in the composite display area. Different embodiments may place the audition display area at different locations (e.g., within the composite display area 150, a GUI location that is non-adjacent to the composite display area, etc.).

The operation of the GUI 100 including such an audition display area will now be described by reference to the state of this GUI during the five stages 110, 120, 130, 140, and 145 that are illustrated in FIG. 1. In the first stage 110, the composite display area 150 displays a composite presentation that includes media clips that span along a timeline (not shown). A user might have added these clips to the composite presentation in a current editing session or by opening a composite project (also referred to as a "project") that was defined in a previous editing session. In first stage 110, the audition feature has not yet been activated.

The second stage 120 displays the GUI 100 after the audition tool has been activated upon the selection of the audition activation item 165 (e.g., through a cursor click operation). This stage 120 illustrates this activation by changing the appearance of UI item 165 and by displaying the appearance of the audition display area 170 above the composite display area 150. Other embodiments might indicate the activation of the audition tool without any change in appearance in any UI items or by changing the appearance of other UI items. For instance, in some embodiments where the UI item 165 is implemented as a command that is invoked through one or more keystrokes (or a selection from a drop-down menu, etc.), the activation of the audition tool is only indicated by the appearance of the audition display area 170 above the composite display area. As further described below, the audition display area 170 may have a different look or may be placed in a different location with respect to the composite display area in other embodiments.

When the audition tool is invoked in the second stage 120, the audition display area does not include any candidate media clips. Also, in the example illustrated in FIG. 1, the audition display area is one display area for storing media clips that are candidates for insertion in the composite display area 150. In this and other examples described below, the composite display areas can display the composite presentation at different zoom levels, such that at some of the zoom levels only a portion of the composite presentation appears within the display area 150. The remainder of the composite presentation is outside of the display area 150 and will have to be scrolled through this display area by the user in order to view this remaining portion. In some embodiments, the content in the audition display area 170 (i.e., the candidate clips in this display area) scrolls along this display area in the same manner that the composite presentation scroll through the composite display area. In other embodiments, the content in the audition display area 170 does not scroll as this display area only provides one immovable static window that is continuously and fully displayed by the display area 170.

The third stage 130 illustrates a user's selection of a clip 185 from the media library 160. In this example, the user has selected the clip 185 by moving a cursor 180 over a media clip 185 in the media library 160, and performing a click-and-hold operation. Other mechanisms can be used to select a clip from the media library 160 in some embodiments. As shown in the third stage 130, this selection of the clip 185 has caused the selected clip to be highlighted, with the highlighting being shown as a thicker border in FIG. 1.

The fourth stage 140 illustrates a user's placement of the selected clip 185 at a location in the audition display area 170. In this example, the user has so placed the clip 185 by performing a drag-and-drop operation. Other mechanisms can be used to add a clip from the media library 160 to the audition display area 170 in some embodiments.

The fifth stage 145 shows the result of placing the clip in the audition display area 170. The selected clip is now visible in the audition display area. In this example, the audition display area 170 changes the representation of the selected clip 185 from the thumbnail representation used in the media library to a clip representation 190 that is similar to the committed clip representation used in the composite display area 150. Other embodiments, however, represent the candidate and/or committed clips in various different ways (e.g., thumbnail images, textual list, etc.).

In the example illustrated in FIG. 1, one audition display area 170 is provided for the entire composite display area 150. Other embodiments, however, provide more than one audition display area for more than one location in the composite display area 170. For instance, in some embodiments, the media editing application includes several selectable location markers that are associated with several locations in the composite presentation (e.g., different location markers correspond to different instances in time in the composite presentation). For each location marker, the media editing application of some embodiments further includes an associated audition display area that can receive and display one or more media clips that are candidates for adding to the composite presentation at the location of the associated location marker. Some embodiments use one common audition display area for several location markers, while other embodiments use different audition display areas for different location markers.

Figure 2:
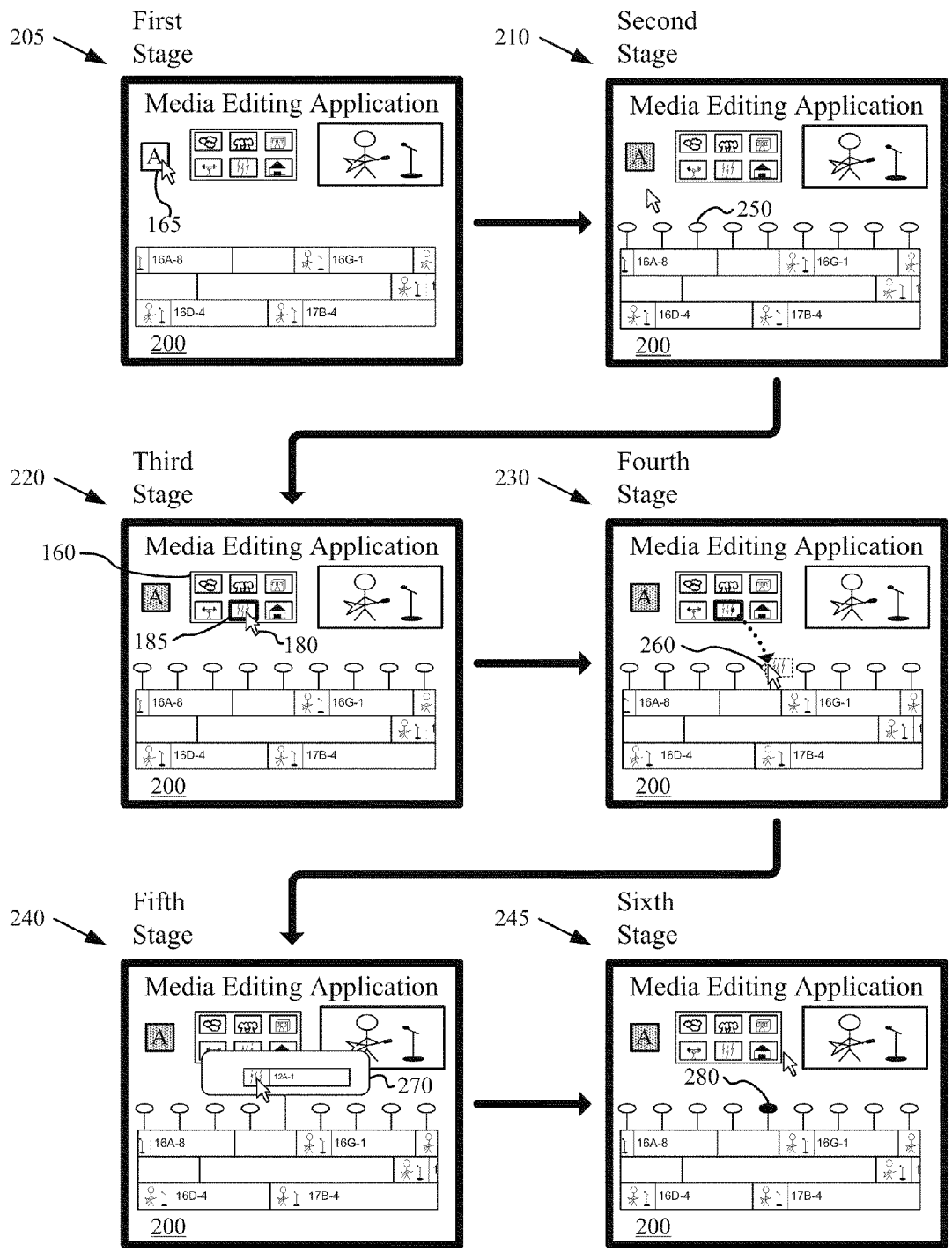
FIG. 2 illustrates a GUI of a media editing application with an alternative audition display area of some embodiments.

FIG. 2 illustrates an example of GUI 200 that includes several selectable location markers 250 with each location marker having a different associated audition display area. This figure illustrates the GUI 200 at six different stages that show the activation of the audition display feature, and the addition of a clip to the audition display area associated with one of the location markers. The GUI 200 is the same GUI 100 of FIG. 1 except that the GUI 200 includes the location markers 250 and an audition display area for each location maker.

Each location marker 250 is associated with a different location within the composite presentation. As further described below, a user can select each location marker in order to cause the media editing application to open the audition display area associated with the location marker. The audition display area opens in some embodiments in order to receive candidate media clips in the audition display area and to display previously received candidate media clips. Different embodiments provide different mechanisms for an audition display area to receive candidate media clips (i.e., to add candidate media clips to an audition display area). For example, some embodiments allow a user to add candidate media clips to an audition display area through keyboard operation, cursor click operation, cursor drag operation, display-screen touch operation, or through other mechanism for adding candidate clips to a display area.

As shown in the first and second stages 205 and 210, the location markers 250 are made to appear through the selection of the audition activation item 165. As in the first stage 110 of FIG. 1, the first stage 205 of FIG. 2 displays the composite display area 150 to include a composite presentation formed by several clips that might have added to the composite presentation in a current editing session or in a previous editing session. In first stage 205, the audition feature has not yet been activated.

The second stage 210 displays the GUI 200 after the audition tool has been activated upon the selection of the audition activation item 165 (e.g., through a cursor click operation). This stage 210 illustrates this activation by changing the appearance of UI item 165 and by displaying the appearance of the location markers 250 above the composite display area 150. As mentioned above, other embodiments might indicate the activation of the audition tool without any change in appearance of any UI items or by changing the appearance of other UI items. For instance, in some embodiments where the UI item 165 is implemented as a command that is invoked through one or more keystrokes (or a selection from a drop-down menu, etc.), the activation of the audition tool is only indicated by the appearance of the location markers 250 above the composite display area. Also, the location markers 250 may have a different look or may be placed in a different location with respect to the composite display area in other embodiments.

When the audition tool is invoked in the second stage 210, none of the audition display areas of none of the location markers 250 contain any candidate media clips. This is reflected by the appearance of the location markers (the lack of shading in this example), as further described below. Also, in this example, the composite display areas can display the composite presentation at different zoom levels, such that at some of the zoom levels only a portion of the composite presentation appears within the display area 250. The remainder of the composite presentation is outside of the display area 250 and will have to be scrolled through this display area by the user in order to view this remaining portion. In some embodiments, the location markers 250 scroll along with the scrolling content in the composite display area.

The third stage 220 illustrates a user's selection of a clip 185 from the media library 160. In this example, the user has selected the clip 185 by moving a cursor 180 over a media clip 185 in the media library 160, and performing a click-and-hold operation. Other mechanisms can be used to select a clip from the media library 160 in some embodiments. As shown in the third stage 220, this selection of the clip 185 has caused the selected clip to be highlighted, with the highlighting being shown as a thicker border in FIG. 2.

The fourth stage 230 illustrates a user's placement of the selected clip 185 over a location marker 260. In this example, the user has so placed the clip 185 by performing a drag-and-drop operation. The user then holds the clip at that location, as indicated by the dashed border over the location marker 260, which signifies that the click operation that is part of the drag-and-drop operation has not been released. After a brief hold of the clip over the location marker 260, the location marker's audition display area 270 opens for receiving the clip 185.

The fourth stage 230 illustrates one manner for associating a clip with a location marker. Other mechanisms can be used in some embodiments to associate a clip from the media library 160 to a location marker. For instance, some embodiments allow a user to select a location marker for associating with a selected clip through (1) a keyboard input (e.g., through the use of arrow keys on the keyboard), (2) a cursor click operation (e.g., a single or double click operation), and/or (3) a display-screen touch operation (i.e., a user's touch on the display screen at the location of the marker). Other embodiments can provide yet other mechanisms for selecting a location marker.

As mentioned above, the fifth stage 240 shows the opening of the location marker's audition display area 270 for receiving the clip 185. The user drops the clip 185 (i.e., releases the cursor click to complete the drag-and-drop operation that started in the fourth stage 230) in order to add this clip to the audition display area 270. As mentioned above, other mechanisms can be used in some embodiments to add a clip to an audition display area of a location marker.

The fifth stage 240 shows the audition display area 270 to include the newly added clip 185 as a candidate clip for the composite presentation location associated with the location marker 270. In this example, the audition display area 270 changes the representation of the selected clip 185 from the thumbnail representation used in the media library to a clip representation that is similar to the committed clip representation used in the composite display area 150. Other embodiments, however, represent the candidate and/or committed clips in various different ways (e.g., thumbnail images, textual list, etc.).

The sixth stage 240 shows that once a clip has been added to the audition display area of a location marker, the audition display area automatically closes in some embodiments. Specifically, this stage illustrates that the expanded audition display area 270 has been automatically removed from the display, and the original location marker 260 has been replaced by a location marker 280 with a different appearance, which in this example is with a different shading. In some embodiments, the expanded audition display area is displayed until it is manually closed by the user (e.g., by selecting a menu option, by clicking on a GUI item, etc.).

The different shading allows a user to differentiate between audition display areas that have associated candidate clips and those that do not contain any candidate clips. Different embodiments may differentiate the markers in different ways (e.g., by changing the color of the marker, by changing the shape of the marker, etc.) or not at all. In addition, some embodiments use the location markers to indicate other information (e.g., recently modified audition display areas may be differentiated). Furthermore, the location markers could be organized in various ways in order to indicate associations to sections of the project (e.g., all markers associated with a particular section of the project may share a same color, shape, etc., that is different than the color, shape, etc., of markers associated with other sections of the project).

In the example illustrated in FIG. 2, each location marker has its own associated audition display area, and the selection of a location marker causes the audition display area associated with the location marker to be displayed. Other embodiments might share one audition display area among several or all of the location markers. In some such embodiments, when the audition display area has been previously opened, the selection of a location marker causes the media editing application to present the location of the audition display area associated with the location marker. Also, upon selection of a location marker that does not have its audition display area open and that shares its audition display area with another location marker, some such embodiments open the selected location marker's audition display area and then navigate to the portion of this display area associated with the selected location marker. As mentioned above, some embodiments open the audition display area, or present a section of this display area that is associated with a selected location marker, in order to receive candidate media clips in the audition display area and to display previously received candidate media clips.

Furthermore, in the example illustrated in FIG. 2, the location marker takes the form of vertical sign posts that are adjacent to the composite display area. Other embodiments, however, might use alternative representations for the location markers, such as other graphical markers (e.g., two-dimensional objects, etc.) that are within or adjacent to the composite display area. In other embodiments, the location markers are pictorial representations of the media clips that are part of the composite presentation displayed in the composite display area. In some embodiments, the pictorial representations are thumbnail images of some or all of the media clips that are placed in the composite presentation in the composite display area. Like the graphical markers, the pictorial markers can be placed within or adjacent to the composite display area. For instance, in some embodiments that have the composite display area span a timeline, the pictorial markers are arranged in one or more rows above or within the composite display area.

In addition, although the example of FIG. 2 shows one possible way of adding a clip to an audition display area 270, one of ordinary skill in the art will recognize that various other ways may be implemented using such an audition display area. For instance, although the example of FIG. 2 shows the clip being selected before the audition display area is opened, some embodiments open the audition display area before selecting a clip to add to the area (e.g., by activating a GUI item such as audition activation item 165). Furthermore, different embodiments may add a clip to the audition display area in different ways. For instance, instead of the drag operation as illustrated in FIG. 2, some embodiments allow a user to perform a right-click operation over a clip in the media library 160 and activating a pop-up menu that allows the user to place clips in a particular audition display area (e.g., at a default location, at a location previously selected by the user, etc.).

Figure 3:
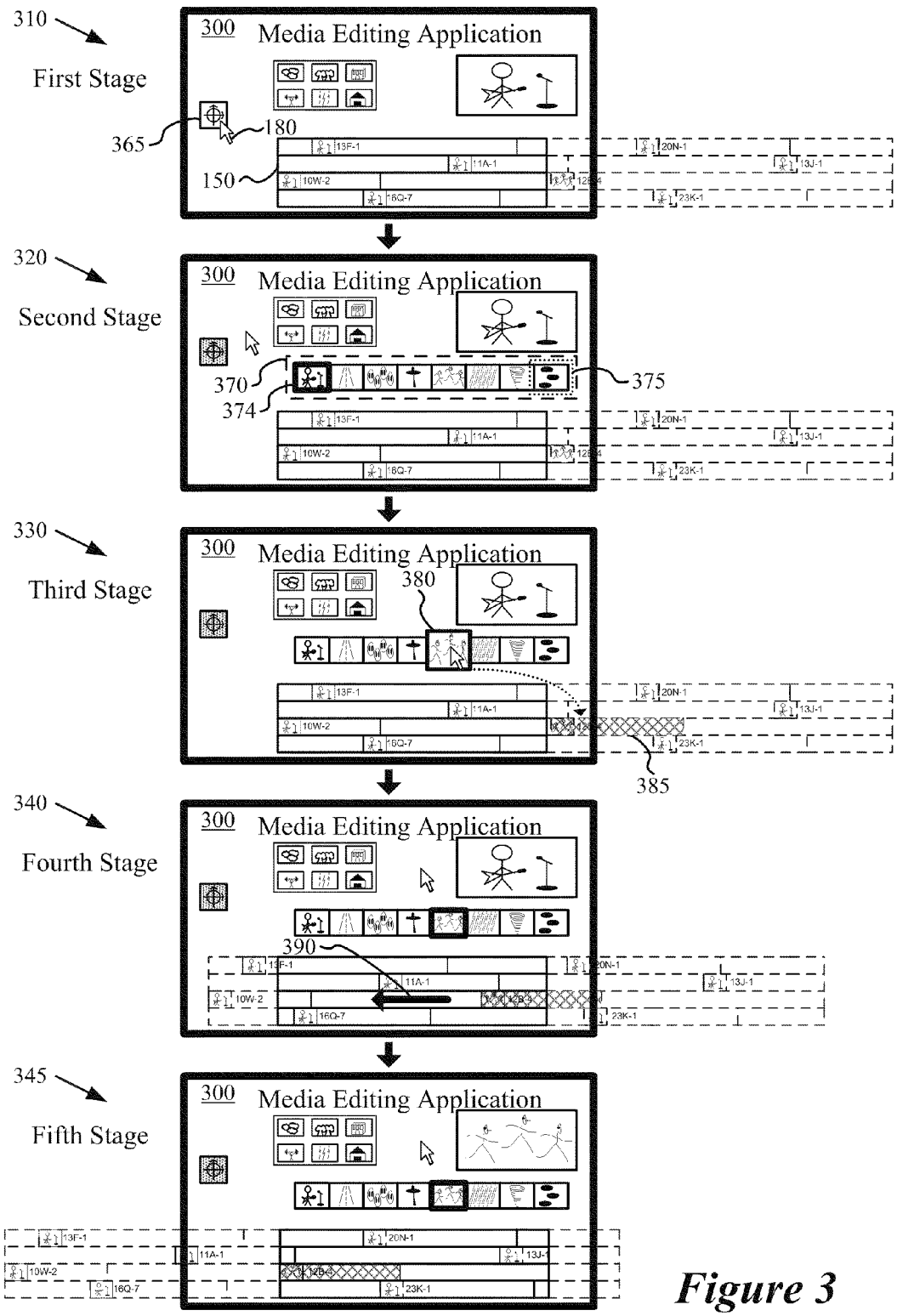
FIG. 3 illustrates an example GUI including selectable location markers as provided by a navigation tool of some embodiments.
Figure 4:
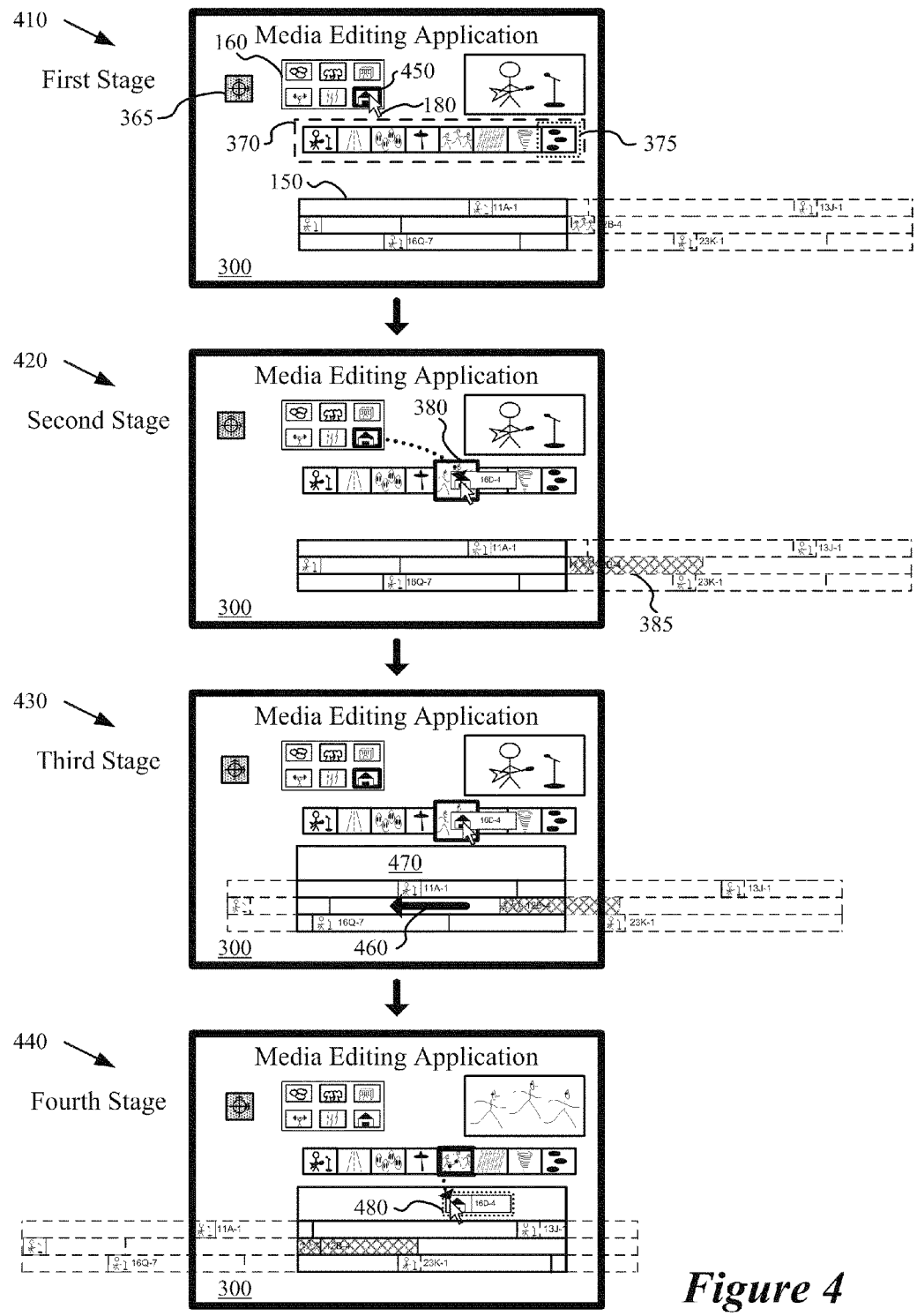
FIG. 4 illustrates an example of adding a candidate clip to an audition display area associated with a particular location marker using the GUI of some embodiments.

FIGS. 3 and 4 illustrate an example of a GUI 300 of a media editing application that has one row of thumbnail images that serve as such pictorial location markers. These thumbnail images are part of a navigation tool 370 that allows a user to cause the composite display area to navigate to different parts of the composite presentation that is displayed in this display area. Before describing the use of these thumbnail images for implementing the audition feature of the GUI 300 by reference to FIG. 4, the use of these images for performing navigation operations will be described by reference to FIG. 3.

In the example of FIG. 3, the application's navigation tool 370 includes several selectable thumbnail images 375. The thumbnail images 375 are navigation markers that are associated with several navigable locations in the composite presentation that is represented in the composite display area. When a thumbnail image is selected, the composite display area presents the navigable location that is associated with the selected thumbnail image. In this manner, the navigation tool allows a user to navigate through a large number of media clips that cannot be viewed in the composite display area even though they are part of the composite presentation, because they have scrolled off the finite display space provided by the composite display area.

In some embodiments, each navigable location corresponds to a fixed location in the composite presentation, or to a location of a media clip or a set of associated media clips in the composite display area. For instance, in the example of FIG. 3, the composite presentation in the composite display area spans a timeline. In some such embodiments, the navigable locations are instances along the timeline, where these instances are fixed locations along the timeline or temporal locations of media clips along the timeline. In some embodiments, the navigation markers (i.e., the thumbnail images) are associated with the media clips in the composite display area, and in turn through this association, are associated with the locations in the composite presentation as the media clips have specified locations in the presentation. In other embodiments, the navigable locations are associated with sections along the timeline that may be of uniform or variable duration.

In some of the embodiments that have fixed locations in the composite presentation as navigable locations, the thumbnail images are images of the media clips (e.g., thumbnail images of frames of video clips, cover art of audio clips, etc.) that are at or near the fixed locations. Alternatively, for some of the embodiments that define each navigable location as the location of a media clip or a set of associated media clips, the thumbnail images are images of the media clips associated with the navigable locations.

Different embodiments use different techniques to generate thumbnail images for the media clips that are part of a composite presentation. For instance, when generating a thumbnail image for a particular video clip or set of video clips, some embodiments initially identify a representative video frame for the clip or set of clips, and then generate a thumbnail image from the identified frame. Different embodiments identify the representative video frame for a clip or set of clips differently. For example, some embodiments identify the frame based on location within the clip, based on an analysis of the clip, etc.

In the example illustrated in FIG. 3, the navigation tool 370 and its associated navigation markers 375 are placed in one row that is adjacent to the composite display area and spans along the composite display area in a direction along which media clips are arranged in the composite display area. Other embodiments arrange the navigation tool and its markers differently. For instance, some embodiments place this tool and its markers in one row in the composite display area, or in more than one row adjacent to or within the composite display area.

Also, in the example illustrated in FIG. 3, the media editing application presents all the navigation markers in one display area simultaneously. Other embodiments allow the navigation markers to scroll through the navigation tool's display area. Some embodiments also provide zoom controls to adjust the size of the navigation markers that are displayed in the tool's display area. The navigation tool 370 also includes a highlighting feature that highlights and/or enlarges each navigation marker 375 as the marker becomes a candidate for selection by a user (e.g., as a cursor pans across the marker while the user is moving the cursor to a marker to select).

The navigation markers 375 are arranged in the same order as their associated locations within the composite display area. In this manner, each navigation marker 375 of the navigation tool 370 represents a relative location within the composite representation in the composite display area. For instance, a first marker that is to the left of a second marker in the navigation tool corresponds to a location in the composite display area that is earlier than a location corresponding to the second marker.

The operation of the GUI 300 will now be described by reference to the state of this GUI during the five stages 310, 320, 330, 340 and 345 that are illustrated in FIG. 3. As in the first stage 110 of FIG. 1, the first stage 310 of FIG. 3 displays the composite display area 150 to include a composite presentation formed by several clip shapes that might have added to the composite presentation in a current editing session or in a previous editing session. In first stage 310, the audition/navigation feature has not yet been activated.

The second stage 320 displays the composite display area 150 after the navigation tool has been activated upon the selection of a navigation activation item 365 (e.g., through a cursor click operation). The navigation tool activation item 365 is a conceptual illustration of one or more UI items that allow the navigation tool 370 to be invoked. Different embodiments of the invention implement this UI item differently. Some embodiments implement it as a UI button, others as a command that can be selected in a pull-down or drop-down menu, and still others as a navigation command that can be invoked through one or more keystroke operations. Yet other embodiments allow the user to invoke the navigation tool through two or more of such UI implementations or other UI implementations. The media editing application displays the navigation tool 370 once it is invoked through the activation item 365.

This stage 320 illustrates the activation of the navigation tool by changing the appearance of UI item 365 and by displaying the appearance of the navigation tool 370 above the composite display area 150. Other embodiments might indicate the activation of the navigation tool without any change in appearance in any UI items or by changing the appearance of other UI items. For instance, in some embodiments where the UI item 365 is implemented as a command that is invoked through one or more keystrokes (or a selection from a drop-down menu, etc.), the activation of the navigation tool is only indicated by the appearance of the navigation tool above the composite display area. As mentioned above, the navigation tool may have a different look or may be placed in a different location with respect to the composite display area in other embodiments.

In this example, a navigation marker 374 has been shown with a thicker border to indicate that the navigation marker corresponds to the location shown in the composite display area. Different embodiments may indicate such a navigation maker in different ways or not at all. By differentiating the navigation marker that corresponds to the currently displayed location (if any), the navigation tool provides, at startup, an indication of the location displayed in the composite display area.

When the navigation tool is invoked in the second stage 320, the composite display area 150 displays the composite presentation at a particular zoom level that allows only a portion of the composite presentation to appear within the display area 150. The remainder of the composite presentation is outside of the display area 150. FIG. 3 uses dashed lines to illustrate portions of the composite presentation that fall outside of the display area 150.

In the third stage 330, a user moves a cursor 180 to a location over the navigation tool. As shown, this action has caused a selectable navigation marker 380 to be enlarged and highlighted, in order to highlight this marker and to indicate that it is a candidate for selection by the user. In this example, the navigation marker corresponds to a particular clip 385 in the composite presentation. The particular clip 385 is highlighted with a cross-hatch pattern. This highlighting is not performed by the media editing application but rather is presented in FIG. 3 in order to identify this clip 385 in this figure. The clip 385 is completely outside of the composite display area in the third stage 330.

The fourth stage 340 illustrates the GUI 300 after the user has selected the navigation marker 380 (e.g., by clicking on this marker). This selection causes the composite representation to scroll through the composite display area 150 in order to cause the particular clip 385 to appear in the display area 150. The fourth stage 340 illustrates an arrow 390 to indicate that the scrolling is in midstream, i.e., it is before the clip 385 has reached its final location in response to the selection of the marker 380.

The fifth stage 345 shows the GUI 300 after the clip 385 has reached its final destination in response to the selection of the marker 380. The selected clip is now visible in the composite display area. In this example, the clip has been positioned at the far left of the composite display area, however different embodiments may position the selected location at different places within the composite display area (e.g., at an offset from the far left, at a location selected by a user, etc.).

In the fifth stage 345, the clip 385 is fully visible in the composite display area along with other clips that neighbor it. Some embodiments automatically perform zoom adjustments (adjustments without direct user input) to adjust the zoom level in the composite display area so that a desired number of neighboring clips are presented along with the clip that is brought up in response to a navigation selection through the tool 370. In some embodiments, the desired number of neighboring clips and the location of the retrieved clip in the composite display area can be specified by a user through preference settings of the media editing application.

As mentioned above, the thumbnail images 375 not only serve as navigation markers that cause the application to navigate the composite display area 150, but also serve as audition location markers that direct the application to open an audition display area as with the markers for placing candidate clips. FIG. 4 illustrates how one such thumbnail image can be used to open an audition display area to receive a clip as a candidate clip. This figure illustrates the GUI 300 during four different operational stages.

The first stage 410 illustrates the composite display area 150 in the same state as in the second stage 320 of the GUI 300 in FIG. 3. Specifically, it shows the GUI 300 after the selection of the navigation activation items 365. This selection has caused the navigation tool 370 to appear along with its thumbnail navigation markers 375. The first stage also shows the user's selection of a particular clip 450 from the media library 160 by moving the cursor 180 to a location over the particular clip and performing a click operation. FIG. 4 illustrates this selection by highlighting the particular clip 450.

In the second stage 420, the user moves the selected clip to a location over the navigation tool. As shown, this action has caused selectable navigation marker 380 to be enlarged and highlighted in order to indicate that this marker has been selected. As mentioned above, the navigation marker corresponds to clip 385, which again has been highlighted with a cross-hatch pattern to help identify this clip in FIG. 4. The clip 385 is completely outside of the composite display area in the third stage 430.

The third stage 430 illustrates that the selection of the thumbnail navigation marker 380 has caused the composite representation to scroll through the composite display area 150 in order to cause the particular clip 385 to appear in the display area 150. The third stage 430 illustrates an arrow 460 to indicate that the scrolling is in midstream, i.e., it is before the clip 385 has reached its final location in response to the selection of the marker 380.

The third stage 430 also illustrates that the selection of the thumbnail navigation marker 380 causes the audition display area 470 to open. In some embodiments, this display area 470 is the audition display area for just the section of the project associated with thumbnail navigation marker 380. As the navigation marker 380 is associated with a particular navigable location of the composite display area, the audition display area 470 in these embodiments serves as a repository for holding (e.g., storing, listing, displaying, etc.) the candidate clips for the particular navigable location and locations near this location. In other embodiments, the audition display area 470 is shared among all or several of the thumbnail navigation markers. In some of these embodiments, the audition display area 470 opens to a section of the audition display area that is associated with the thumbnail navigation marker 380.

The fourth stage 440 shows the GUI 300 after the clip 385 has reached its final destination in response to the selection of the marker 380. The selected clip is positioned at the far left of the composite display area and is completely visible in the composite display area. However, as mentioned above, other embodiments may position the selected location at different places within the composite display area (e.g., at an offset from the far left, at a location selected by a user, etc.), and allow a user to specify the desired number of neighboring clips and the location of the retrieved clip in the composite display area.

At the fourth stage 440, the user has two options; one is to add the clip 450 to the composite display area in order to commit it to the composite presentation, while the other is to add the clip to the opened audition display area 470. In the example illustrated in FIG. 4, the user selects the latter option. Specifically, the fourth stage 440 in FIG. 4 shows the insertion of clip 450 in the audition display area 470 at a location 480 which is adjacent to the location of the clip 385 in the composite display area. This insertion is done by dragging the clip 450 from its previous position over the marker 380 to the location 480.

Accordingly, through a single click-and-drag operation, the user (1) selects the clip 450 from the media library 160, (2) drags this clip to the marker 380 to cause the display area 150 to present the location adjacent to clip 385 and to cause the audition display area 470 to open, and (3) drags and drops the clip 450 at a location presented in the composite display area or the audition display area. By so placing the clip 450 in the composite representation in the composite display area, the user edits the composite project to include the clip at the particular location in the composite project specified by the user. Alternatively, by so placing the clip 450 in the audition display area 470, the user creates (or alters) a set of clips that are candidates for addition to the composite presentation at a particular location in the composite presentation.

Although the example of FIG. 4 shows one possible way of adding a clip to an audition display area 470, one of ordinary skill in the art will recognize that various other ways may be implemented using such an audition display area. For instance, although the example of FIG. 4 shows the clip being selected before the audition display area is opened, some embodiments may open the audition display area before selecting a clip to add to the area (e.g., by activating a GUI item such as audition activation item 165). Furthermore, different embodiments may add a clip to the audition display area in different ways. For instance, instead of the drag operation as illustrated in FIG. 4, some embodiments allow a user to perform a right-click operation over a clip in the media library 160 and activating a pop-up menu that allows the user to place clips in a particular audition display area (e.g., at a default location, at a location previously selected by the user, etc.).

As mentioned above, the candidate media clips associated with a location marker are candidates for insertion in the composite display area at or near the location marker's associated location in the composite display area. In other words, the location markers and their associated audition display areas serve as repositories within the UI of the media editing applications for different locations in the composite display area for containing (e.g., storing, listing, displaying, etc.) media clips that are candidates for addition to the composite presentation at or near the locations of the markers.

Also, in some embodiments, a single candidate clip is automatically associated with more than one location marker corresponding to one or more consecutive sections of the presentation. When presenting the audition display area associated with a particular location marker, clips associated with surrounding markers may be displayed in addition to the candidate clips associated with the particular location marker. This allows a user to manage candidate clips at or near the section associated with the particular location marker. For instance, in some embodiments, all candidate clips are displayed for any section of the composite presentation that is currently represented to a user in the composite display area.

The fourth stage also illustrates the display in the preview display area 155 to be updated to reflect the content associated with the selected location marker 380. Other embodiments do not update the display in the preview display area 155 at this stage. For instance, some embodiments perform this update upon the selection of the thumbnail navigation marker 380 during the second stage.

Other embodiments may display the audition display area in other ways. In the example described above by reference to FIG. 4, the user places the clip 450 at the desired location 480 within the audition display area by performing a cursor-release operation after moving the clip to the desired location. Alternatively, in some embodiments, the user may simply release the clip over the thumbnail navigation marker 380 in order to add the clip (as a candidate clip) to the audition display area associated with this marker. In some of these embodiments, the clip is automatically placed at a location in the audition display area (e.g., at the top left corner of the audition display area, at a location previously set by a user, etc.).

When a candidate media clip is added to the composite presentation in the composite display area from an audition display area, some embodiments remove the candidate media clip from the audition display area as the clip is no longer a candidate for addition to the composite presentation but it is a clip that has been committed to the composite presentation (i.e., it is a "committed clip"). In other words, some embodiments only keep candidate media clips in an audition display area. Whenever a committed media clip is removed from a particular location in the composite display area, some embodiments add that media clip to the audition display area associated with the particular location, or provide the user with the option of adding the media clip to this audition display area.

Alternatively, in an audition display area that is associated with a particular location in the composite display area, some embodiments list media clips that are candidates for addition to that particular location as well as media clips that are committed to the composite presentation at that particular location (e.g., at the section of the composite presentation that corresponds to the particular location). Accordingly, some of these embodiments do not remove a candidate media clip from an audition display area after the clip has been added to the composite presentation at the display area's associated location. However, in this situation, some of these embodiments change the presentation of the clip in the audition display area to indicate that it has gone from being a candidate media clip for a particular location to a committed media clip for that location. Whenever a committed media clip is removed from a particular location in the composite display area, some embodiments change the media clip's designation in the audition display area associated with the particular location, or provide the user with the option of keeping the media clip in this audition display area but changing its designation.

Figure 5:
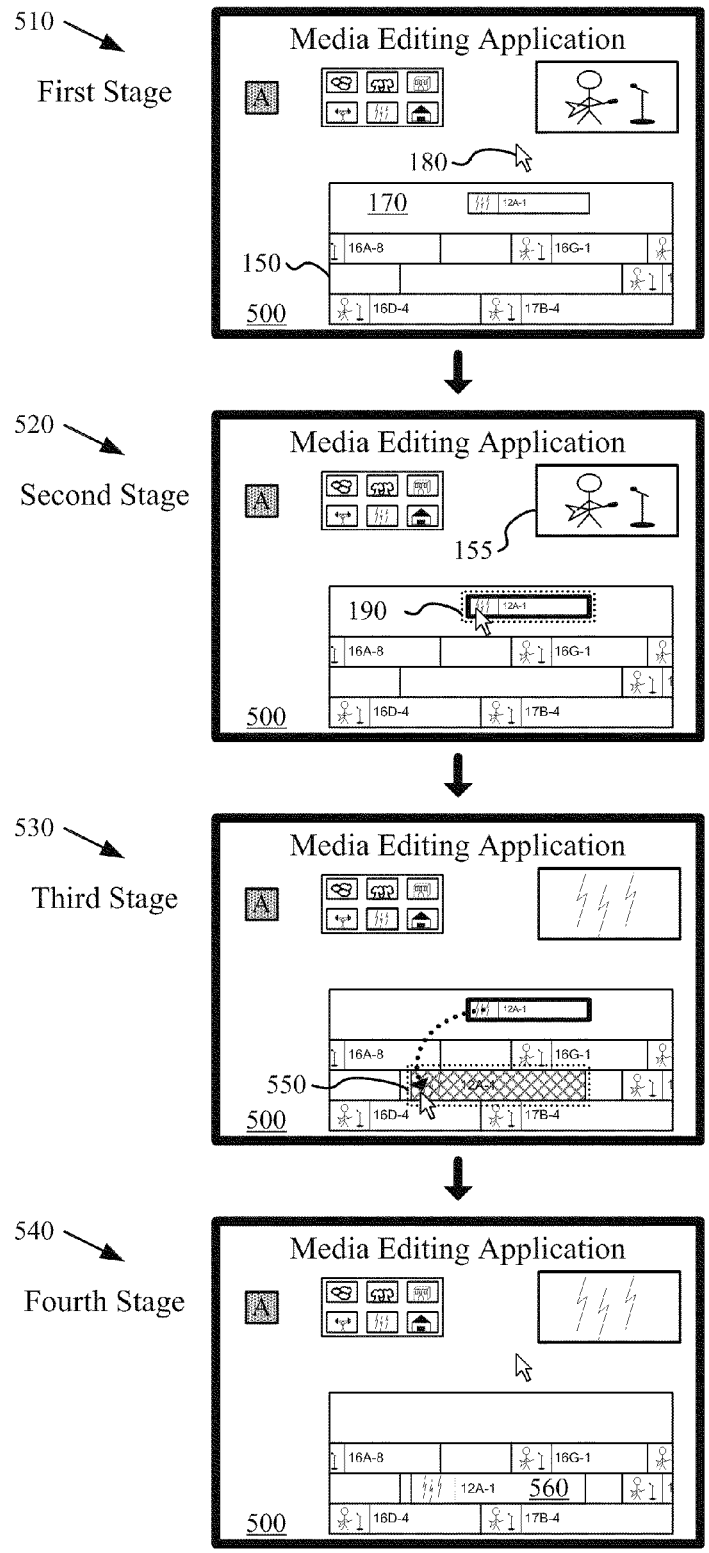
FIG. 5 illustrates an example of moving a candidate clip from an audition display area to a location in the composite display area using the GUI of some embodiments.

FIG. 5 illustrates an example of moving a candidate clip from an audition display area 170 to a location in the composite display area 150. The audition display area 170 is similar to the audition display area 170 of FIG. 1, although the description is equally applicable to the operation of the audition display areas 270 and 470 of FIGS. 2 and 4 in some embodiments of the invention.

FIG. 5 illustrates its example in terms of four stages 510-540 of operations of a GUI 500 of a media editing application. The GUI 500 is similar to the GUI 100 of FIG. 1. The example of FIG. 5 continues from the end of the example of FIG. 1. Specifically, the first stage 510 is the same as the fifth stage 145 described above in reference to FIG. 1.

In the second stage 520 of FIG. 5, a user moves the cursor 180 to a location over the candidate clip 190 and performs a click-and-hold operation. As shown, this action causes the clip to be displayed with a thicker border. In the third stage 530, the user moves the selected clip to a location 550 over the composite display area 150 (e.g., by using a click-and-drag operation) and places the clip at the location 550 (e.g., through a click release operation). In this example, the clip is highlighted using a crosshatch pattern. In addition, the preview display area 155 has been updated to reflect the content in the selected clip. The fourth stage 540 shows the result of the placement. The committed clip 560 is now displayed in the composite display area in the same manner as other committed clips. In addition, the candidate clip 190 has been removed from the audition display area in this example.

Some embodiments allow a user to move a candidate clip from the audition display area to an area of a track that holds one or more other committed clips. In some of these embodiments, placing a candidate clip in this manner would change the attributes of a committed clip that it overlaps on the same track (e.g., by trimming the committed clip or pushing the committed clip along the timeline). In other embodiments, such a placement would remove the committed clip from the track (e.g., by placing the committed clip in the audition display area or removing the committed clip from the composite presentation) in the composite display area.

Figure 6:
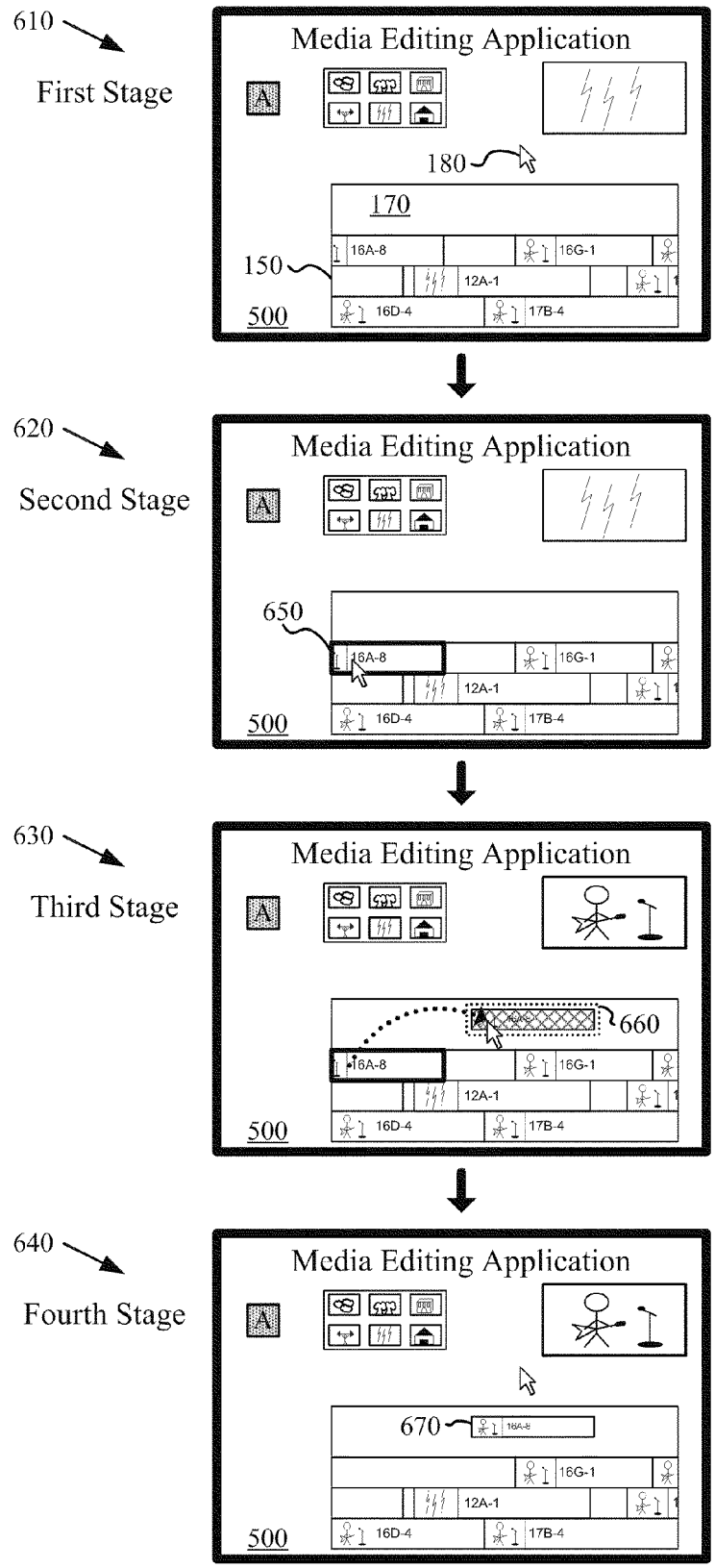
FIG. 6 illustrates an example of moving a candidate clip from a location in the composite display area to the audition display area using the GUI of some embodiments.

FIG. 6 illustrates an example of moving a candidate clip from a location in the composite display area 150 to the audition display area 170. The audition display area 170 is similar to the audition display area 170 of FIG. 1, although the description is equally applicable to the operation of the audition display areas 270 and 470 of FIGS. 2 and 4 in some embodiments of the invention.

FIG. 6 illustrates its example in terms of four stages 610-640 of operations of the GUI 500 of a media editing application. The GUI 500 is the same as GUI 500 of FIG. 5. The example of FIG. 6 continues from the end of the example of FIG. 5. Specifically, the first stage 610 is the same as the fourth stage 540 described above by reference to FIG. 5.

In the second stage 620 of FIG. 6, the user moves the cursor 180 to a location over committed clip 650 and performs a click-and-hold operation. As shown, this action has caused the clip to be displayed with a thicker border. In the third stage 630, the user moves the selected clip to a location 660 over the audition display area 170 (e.g., by using a click-and-drag operation) and places the clip at the location (e.g., through a click-release operation). In this example, the clip is highlighted using a crosshatch pattern. In addition, the preview display area 155 has been updated to reflect the content in the selected clip. The fourth stage 640 shows the result of the placement. The candidate clip 670 is now displayed in the audition display area as a candidate clip. In addition, the committed clip 650 has been removed from the composite display area in this example.

The location markers and their associated audition display areas allow a user to iteratively swap the committed clips in the composite presentation with candidate clips that are listed in the audition display areas. In this manner, the user can use the audition feature to examine different candidate clips for insertion in the composite presentation. This, in turn, allows the user to determine which, if any, of the candidate clips is ideal for inclusion in the composite presentation.

While many embodiments were described above by reference to a timeline, media editing applications may use other types of representations of composite presentations. For instance, some media editing applications (such as Shake® sold by Apple Inc.) use a tree-based graph approach to illustrate the compositing of a multi-media project. In such editing applications, each node may represent media and/or image processing operations while the links between nodes sometimes represent a sequence of operations. In these embodiments, the navigable locations may refer to nodes, groups of nodes, links among nodes, a combination of nodes and links, etc.

In addition, although many examples refer to a navigation tool that provides direct navigation to various locations without any hierarchical relationship between the locations, different embodiments may allow different types of navigation. For instance, some embodiments may include hierarchical navigation where the selection of a particular navigation marker may provide a set of markers corresponding to sub-locations of the selected marker. Furthermore, although many examples below show GUI items and controls similar to a video editing application, one of ordinary skill in the art will understand that other types of applications may be used (e.g., video playing applications, photo viewing applications, audio editing applications, etc.).

The preceding discussion provided an overview of the UI items some embodiments use to implement the audition display area. The discussion that follows describes various process and operations performed by or with the audition display area. These processes and operations are described by reference to more detailed UI examples.

Several more detailed embodiments of the invention are described in the sections below. Section I provides a conceptual description of the environment in which the audition display area operates and various ways to invoke and use the audition display area. Section II describes various types of navigable locations that may have associated audition display areas in some embodiments. In addition, Section II describes a process for navigating among the navigable locations. Section III then describes adding candidate clips to a project using the audition display area. Next, Section IV describes edit operations using the audition display area. Section V then describes the software modules and data structures used to implement the media editing application of some embodiments. Section VI then describes the process used to define the media editing application of some embodiments. Lastly, Section VII describes a computer system which implements some of the embodiments of the invention.

I. Managing Media Using the Audition Display Area

Sub-section I.A provides a conceptual description of the environment in which the audition display area operates. Sub-section I.B then describes various ways of invoking the audition display area. Lastly, sub-section I.C describes several alternative views of the audition display area.

A. Media Editing Application Environment

Figure 7:
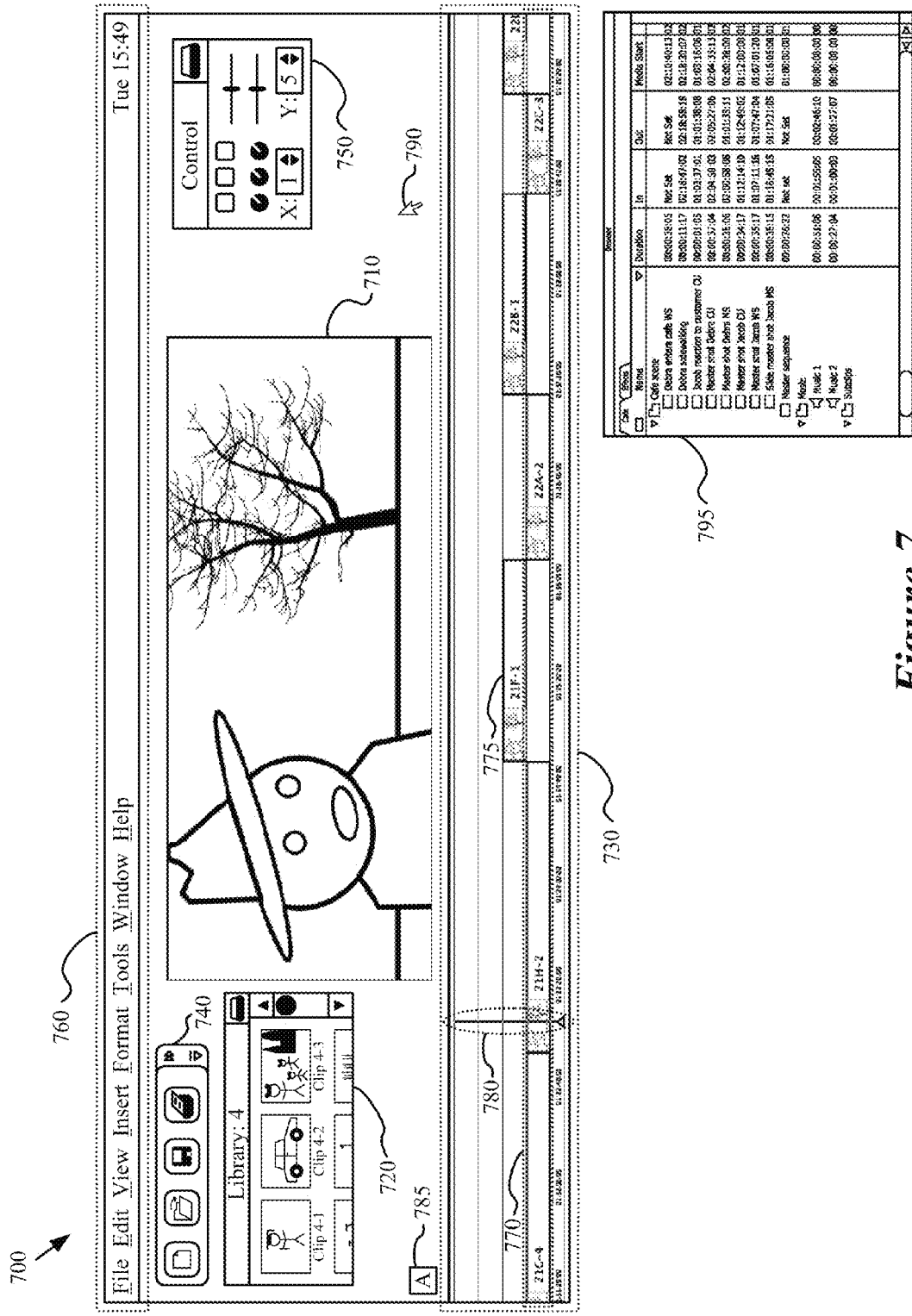
FIG. 7 illustrates an example GUI of a media editing application of some embodiments.

For some embodiments of the invention, FIG. 7 illustrates a graphical user interface ("GUI") 700 of a media editing application. Specifically, this figure illustrates one example layout of various components included in a typical user interface of a media editing application. As shown in FIG. 7, the GUI 700 includes a preview display area 710, a media library 720, a composite display area 730, various buttons 740 and other controls 750, a menu bar 760, one or more tracks (e.g., track 770) in the composite display area, a playhead 780, an audition display area selection GUI item 785, and a cursor 790.

The preview display area 710 displays a preview of a composite presentation that the application creates by compositing several media clips. The media library 720 is an area in the GUI 700 through which the application's user can select media clips to add to a presentation that the user is compositing with the application. In the example of FIG. 7, the clips in the media library are represented as thumbnails that can be selected and added to the composite display area 730 (e.g., through a drag-and-drop operation or a menu selection operation). The clips in the media library may also be represented as a list, a set of icons, or some other representation that allows a user to view and select the various clips in the library. In some embodiments, the media library 720 may include audio clips, video clips, text overlays, pictures, and/or other media. The media library 720 may provide access to media that is stored locally or at a central location (e.g., a location accessed through a network).

In some embodiments media content may be selected from locations outside the media library 720 or the GUI 700. For instance, in some embodiments a user may select media clips using other components of GUI 700 (e.g., by using menu commands provided by the menu bar 760, by copying a clip that is displayed in the composite display area 730, etc.). In addition, some embodiments allow a user to select media clips from a location outside the GUI 700 (e.g., the desktop, a folder that includes media content, a browser window, etc.) and place the content at a location within the GUI (e.g., in the media library 720, at a location in the composite display area 730, etc.).

The composite display area 730 displays one or more media clips that are part of the composite presentation. In the example illustrated in FIG. 7, the composite display area 730 is an area that includes multiple tracks that span a timeline (e.g., track 770). One or more media clips 775 can be placed on each track. The various buttons and controls 740-750 allow the user to select various options, perform different tasks, define certain parameters, etc. The menu bar 760 provides several grouped sets of menu commands and options for the media editing application.

The playhead 780 is for highlighting an instance in time in the composite presentation that is being represented in the composite display area. Highlighting this instance in time is useful for a variety of reasons. For example, when viewing a preview of the composite presentation in the preview display area 710, the playhead 780 scrolls across the timeline to identify the location in the composite representation in the composite display area 730 that is being currently displayed in the preview display area 710. Furthermore, the playhead 780 location also acts as an insertion point when adding clips, effects, or other media to the project. The audition display area selection GUI item 785 is a conceptual representation of one or more UI items for activating an audition display area of some embodiments. The cursor 790 provides feedback to a user and operates various selection items or other controls included in the GUI 700. The cursor 790 also allows a user to select or manipulate various representations of content that are included in the GUI 700. The operation of GUI 700 will be described below.

In addition to the components included in GUI 700, FIG. 7 shows a list of video clips in a browser window 795 that is displayed separately from the GUI 700. The browser window 795 in this example includes a list of video clips along with metadata (e.g., timecode information) about the video clips. In some embodiments, the list of video clips is the list of video clips in a particular sequence of video clips, and the metadata specifies in and out points, durations, etc. for the video clips. In this example, the browser window is displayed separately from the other components of the GUI 700; however, the browser window may also be displayed within the GUI 700. Similarly, various other elements of GUI 700 may be displayed in a separate window than GUI 700. In addition, although the browser window 795 is displayed separately from the GUI 700, the browser window and GUI may conjunctively perform various operations (e.g., modifications to items in the browser window may affect the display of the GUI 700, the data included in a composite project that is active in the GUI 700, etc.).

In addition to the components described above, the media editing application of some embodiments may include video editing tools that allow a user to graphically set in and out points for video clips (in other words, where in the final project a specific clip or part of a clip will be shown). For instance, the video editing tools may include a number of timelines that can be used to modify the temporal sequence of the video frames and to synchronize audio tracks with video tracks (e.g., in order to add music over a video clip). In some embodiments, such video editing tools also give users the ability to edit in effects or perform other video editing functions.

In some cases, some or all of the video clips that are displayed in the list of video clips, played in displays, and edited by a user with video editing tools, are video clips of real-world objects (e.g., people, landscapes, etc.) filmed by a camera and include real-world audio (e.g., conversations, real-world noises, etc.) recorded by a camera, microphone, etc. In some cases, some or all of the video clips are computer-generated animations or include computer generated animations (e.g., animated objects, computer-generated effects, etc.).

Figure 8:
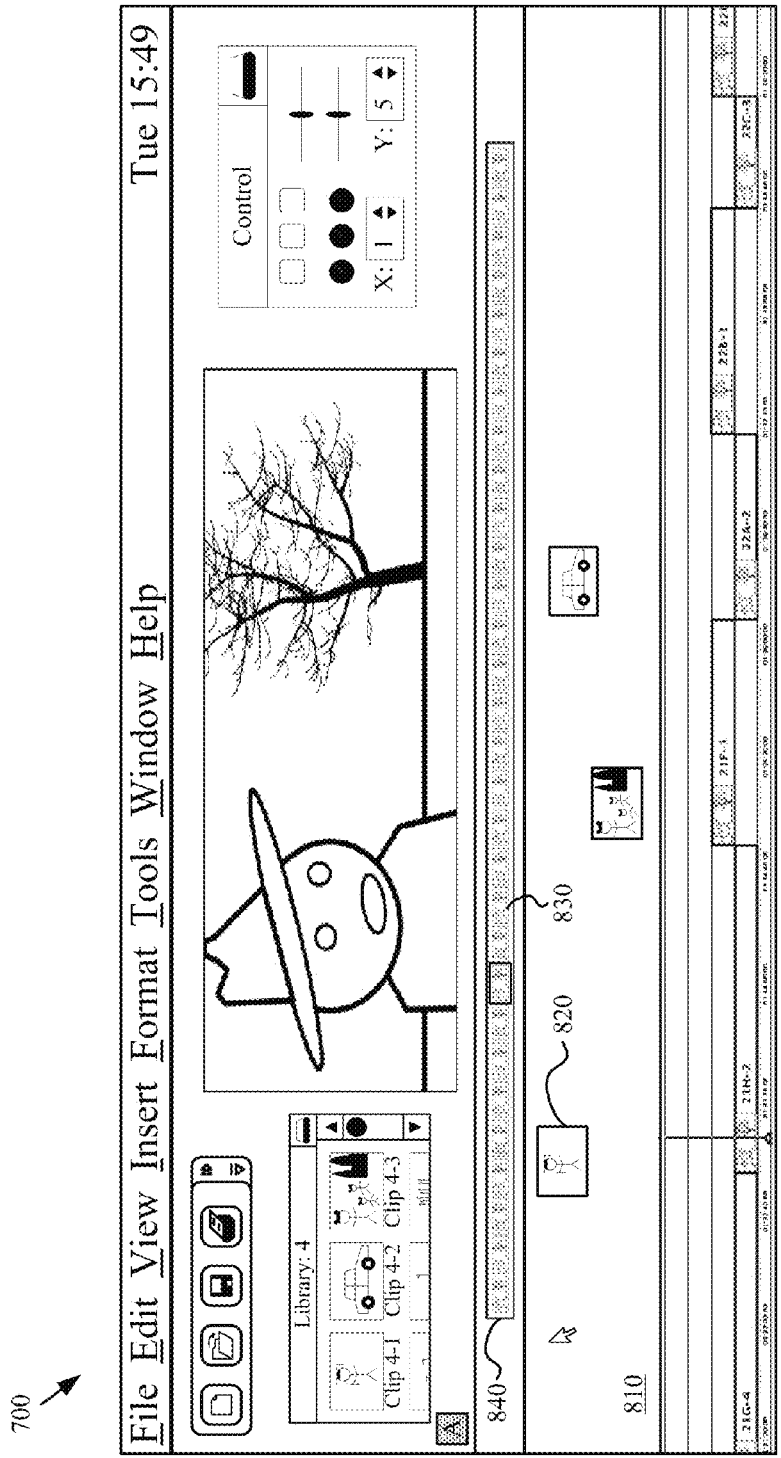
FIG. 8 illustrates another example GUI that includes an audition display area of some embodiments.

FIG. 8 illustrates another example GUI 700 of a media editing application of some embodiments. Specifically, this figure shows a GUI that includes an audition display area 810 of some embodiments. The GUI 700 is the same GUI described above in reference to FIG. 7. As shown, in addition to the elements described above in reference to FIG. 7, the GUI 700 of FIG. 8 includes the audition display area 810 for storing candidate clips 820 associated with various sections of the composite project. FIG. 8 also illustrates a set of location markers 830 provided by a navigation tool 840 of some embodiments. Although several examples are described below by reference to location markers such as those provided by the navigation tool 840, any type of location marker could be used (e.g., location marker 250 described above in reference to FIG. 2). A more detailed explanation of such a navigation tool is provided in concurrently filed U.S. patent application Ser. No. 12/688,857, now issued as U.S. Pat. No.

8,359,537, entitled "Tool for Navigating a Composite Presentation", which is incorporated herein by reference.

In the example of FIG. 8, the audition display area includes various thumbnail images that represent various previously-added candidate clips 820. Different embodiments may use different representations for the candidate clips (e.g., textual, graphical, etc.). In some embodiments, a user may customize the display of the audition display area 810 by selecting the desired type of marker from a set of available options.

In some embodiments, the displayed thumbnails represent candidate clips that are associated with the displayed section of the composite display area. The displayed clips are thus available whenever the user accesses that section of the composite display area. Different embodiments may associate the clips in different ways. For instance, in some embodiments the clips may include a reference to a particular time instance along the timeline. In these embodiments, any clip associated with a time instance that is currently visible in the composite display area would be displayed in the audition display area. The operation of the audition display area 810 under various different scenarios will be described below in Sections III and IV.

B. Invoking the Audition Display Area

Figure 9:
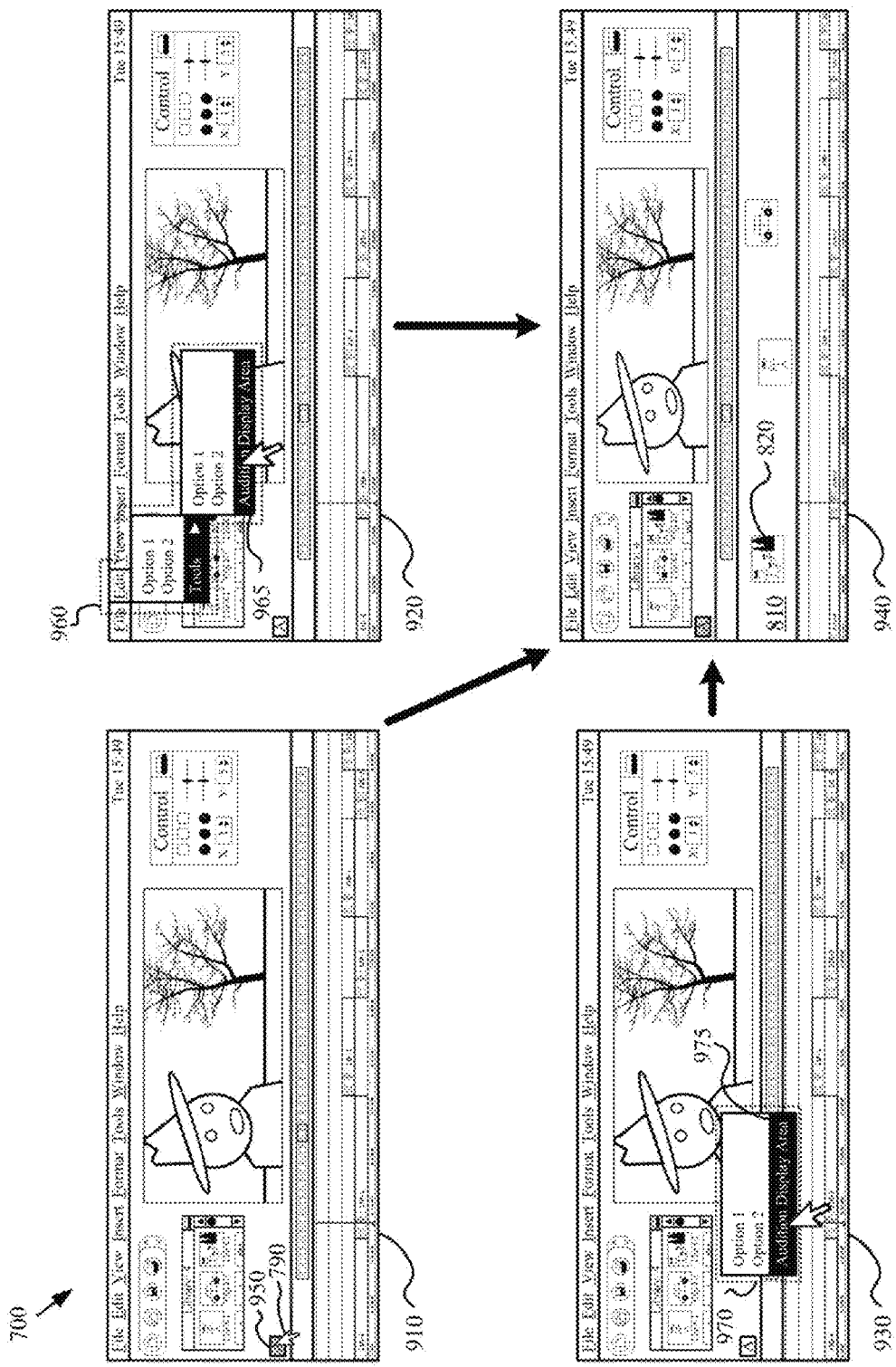
FIG. 9 illustrates several ways of invoking the audition display area of some embodiments.

As described above, different embodiments may invoke and display the audition display area in different ways. FIG. 9 illustrates several example user interface interactions that some embodiments use to invoke and display the audition display area. In this example, a user activates the audition display area 810 described above in reference to FIG. 8 using various GUI items. In addition, other types of audition display areas (e.g., alternative audition display area 270 described above in reference to FIG. 2) may be invoked in a similar manner to that described in reference to FIG. 9.

FIG. 9 illustrates the same GUI 700 as described above in reference to FIGS. 7-8. To illustrate the example of invoking the audition display area, FIG. 9 describes three alternative first stages 910-930 and a second stage 940 of a user's interaction with the GUI 700.

FIG. 9 shows a first stage 910 that is before the user has activated the audition display area. In this stage, the user activates an audition display area button 950 using the cursor 790. The user activates the button by performing a click operation when the cursor is over the button. As shown, in this example, activating the button has caused the button to be displayed with a dark background. Different embodiments may change the display of the button in different ways or not at all when a user activates the button (e.g., by showing the button with a thicker border, changing the color of the button, etc.).

FIG. 9 further shows an alternative first stage 920 of user interaction that is before the user has activated the audition display area. In this stage, the user activates a pull-down menu 960 and selects an option 965 from the menu using the cursor 790. Different embodiments may present different options and/or sub-options. In this example, a user activates the menu 960 by performing a cursor click operation over the desired menu bar 760 option. Also, in this example, as indicated by the darker background, the user selects the "Navigator" option 965 by performing a cursor click operation when the cursor is positioned over the desired sub-option.

FIG. 9 also shows another alternative first stage 930 of user interaction that is before the user has activated the audition display area. In this stage, the user activates a pop-up menu 970 and selects an option 975 from the menu using the cursor 790. Different embodiments may present different options and/or sub-options. In this example, a user activates the menu 970 by performing a cursor right-click operation over the GUI 700. Different areas of the GUI may present different pop-up menus when a right-click operation is performed. As indicated by the darker background, in this example the user selects the "Audition Display Area" option 975 by performing a cursor click operation when the cursor is positioned over the desired option.

Different embodiments may generate section information in different ways. For instance, some embodiments determine a set of equally-spaced points that span the timeline of the composite representation. These points may then define the sections of the composite project. In addition, some embodiments automatically generate a set of location markers. The markers may be generated in this example by selecting a frame of video from a media clip included in the composite representation at the associated section. Alternatively and/or conjunctively, in some embodiments a user is asked to generate the navigation information (e.g., the user may select location markers and associated sections using GUI controls of the media editing application).

FIG. 9 shows a second stage 940 of user interaction that is after the GUI 700 has been updated to display the audition display area 810. The second stage may follow any one of the first stages 910-930. Alternatively, a user may perform various other operations to invoke the audition display area (e.g., performing one or more keystroke commands, enabling a default setting, etc.). As shown, in the second stage, the GUI includes the audition display area 810. In this example, the audition display area includes several clips 820 that had been previously associated with the currently-selected section of the project. In some cases, no clips are displayed when the audition display area is invoked (e.g., when the section of the project corresponding to the audition display area does not include any associated candidate clips).

Although the example of FIG. 9 has been shown with reference to certain features and details, one of ordinary skill in the art will recognize that the audition display area may be invoked in various other ways without departing from the spirit of the invention. For instance, some embodiments automatically invoke the display area whenever the media editing application is launched. As another example, some embodiments automatically invoke the audition display area whenever a composite project is opened using the media editing application.

The audition display area of some embodiments may be de-invoked (i.e., removed from the GUI) using similar operations to those described in reference to FIG. 9. For instance, the audition display area may be de-invoked by pressing the button 950 after the tool has been invoked, by making a pull-down menu selection similar to that described above in reference to stage 920, by making a pop-up menu selection similar to that described above in reference to stage 930, by performing one or more keystroke commands, etc.

C. Alternative Views of the Audition Display Area

Figure 10:
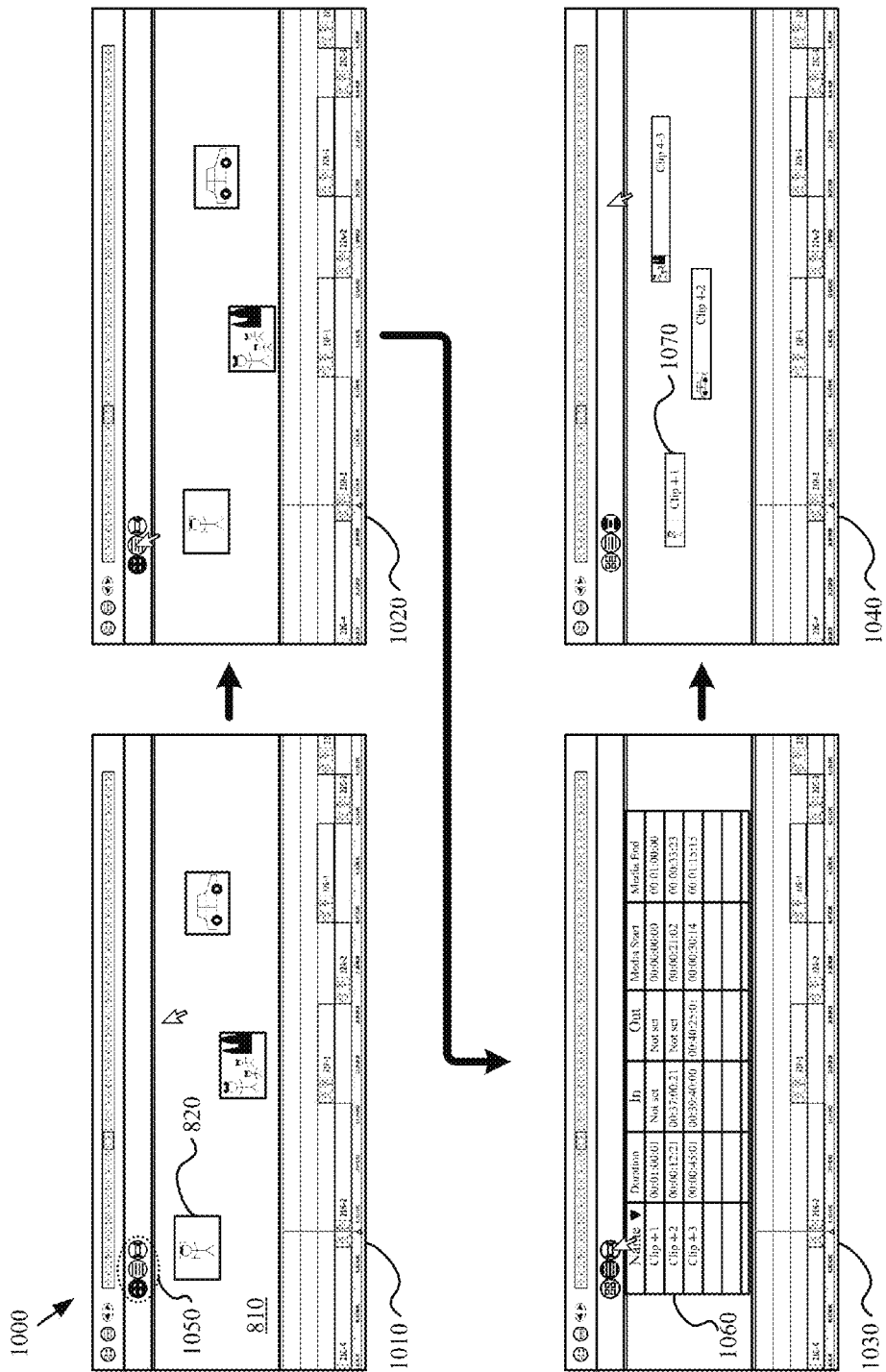
FIG. 10 illustrates several different example views provided by the audition display area of some embodiments.

FIG. 10 illustrates several different example views provided by the audition display area 810 of some embodiments. Specifically, this figure illustrates a GUI 1000 at four different stages of user interaction. The stages 1010-1040 show an example of selecting among the available views. GUI 1000 shows a partial view of GUI 700 described above in reference to FIGS. 7-8. In addition to the controls described above, the GUI 1000 includes a view selection control 1050 for selecting among the available views provided by the audition display area. Different embodiments may provide different view selection controls (e.g., a menu selection, hotkey selection, etc.). The example of FIG. 10 uses the same section of the composite project and associated candidate clips 820 as described above in reference to FIG. 8.

The operation of GUI 1000 will be described by reference to the state of the GUI during the four stages 1010-1040 that are illustrated in FIG. 10. The first stage 1010 shows a thumbnail view, where several clips 820 in the audition display area are represented as thumbnail images. In some embodiments, the clips represented by the thumbnails are associated with a particular location in the audition display area (e.g., based on a timeline point, based on section association, etc.). In some embodiments, a user may select specific locations within the audition display area to display the clips (e.g., by performing a drag-and-drop operation, by setting an insertion point, etc.). In this manner, any candidate clips associated with a particular section may be easily viewed and/or accessed when a user navigates to the particular section and invokes the audition display area.

In the second stage 1020, a user moves the cursor 790 to a location over the view selection control 1050 and performs a click operation. In this example, the location of view selection control corresponds to a textual list view. The third stage 1030 shows the result of this selection. The audition display area now displays a list view 1060 of the candidate clips in the audition display area. The list may display various attributes of the clips (e.g., duration, timeline in point, media in point, etc.). Some embodiments allow a user to select the attributes that are displayed.

In the third stage 1030, a user moves the cursor 790 to a different location over the view selection control 1050 and performs a click operation. In this example, the location of view selection control corresponds to a "clip" view. The fourth stage 1040 shows the result of this selection. The audition display area now displays a clip representation 1070 of each of the candidate clips in the audition display area. Such a clip representation may provide a visual indication of the length of the clip relative to the timeline. As in the example of the first stage 1010, the clip representations may be associated with a particular location in the audition display area.

Although the example of FIG. 10 has been described with reference to certain details, one of ordinary skill in the art will recognize that different embodiments may include different specific features and functionality. For instance, in some embodiments other views than those described may be selected (e.g., an icon view, other types of graphical indicators, etc.).

In addition, one of ordinary skill in the art will recognize that actual implementations of various media editing applications may differ from the conceptual representations shown in FIGS. 7-10. For instance, a particular implementation may include different and/or additional display areas, menus, controls, etc. than those shown in FIGS. 7-10. Furthermore, although various examples below may show specific controls, selection options, etc., one of ordinary skill in the art will in the art recognize that other specific controls, selection options, and/or other components may be implemented in various different ways. For instance, although shown as buttons 740 in GUI 700, the operations associated with such buttons 740 may be associated with various other controls and/or operations (e.g., an option of a pull-down menu, one or more keystroke commands, a voice command, etc.).

II. Navigation Tool Background

As described above, in some embodiments the audition display area works in conjunction with a navigation tool that allows a user to navigate to various sections of a project. Sub-section II.A provides a conceptual description of the various types of navigable locations that may be defined in a project. Sub-section II.B then describes a process used by some embodiments to navigate among the locations.

A. Navigable Locations of a Composite Project

Figure 11:
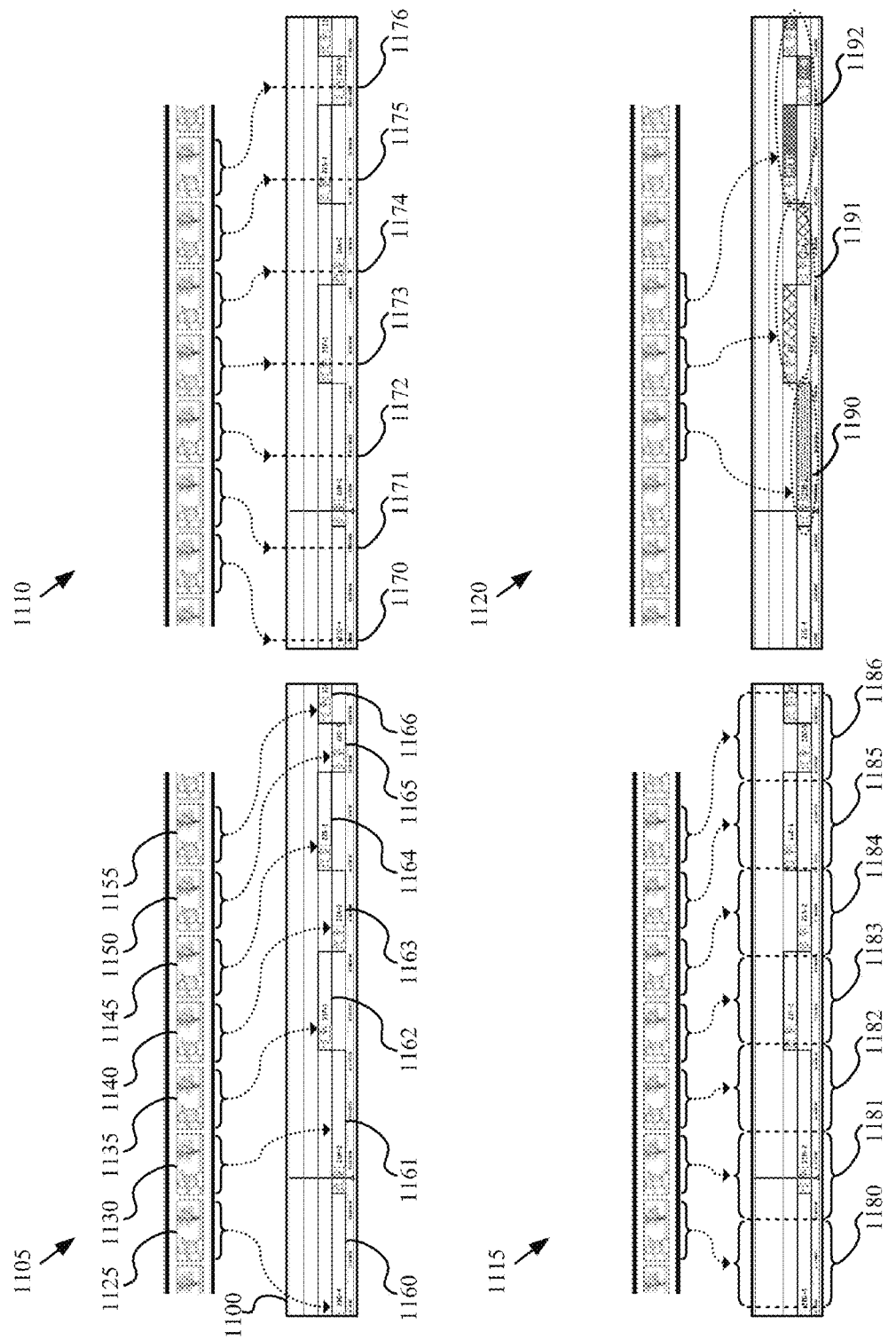
FIG. 11 illustrates several potential associations between the selectable location markers of the audition display area and sections of the composite presentation in some embodiments.

For some embodiments, FIG. 11 illustrates several potential associations between selectable location markers and navigable locations of the composite project as shown in a composite display area 1100. Specifically, this figure shows four potential associations 1105-1120 between various selectable location markers 1125-1155 and different types of locations of a composite project. In this example, the location markers are thumbnails, however different embodiments may use different types of location markers (e.g., marker 250 described above in reference to FIG. 2).

Some embodiments allow a user to select among the different associations between the selectable location markers and navigable locations of the composite representation (e.g., by selecting a menu option, through one or more keystroke commands, etc.). In some embodiments, the selection of a particular association may be made by default, may be based on the type of media included in the composite project, may be based on information stored in the composite project file, etc. In addition, different embodiments provide various other potential associations.

In the first association 1105, each location marker 1125-1155 is associated with (e.g., linked to the location of) a media clip, such as one of media clips 1160-1166, that is part of the composite representation and may be displayed in the composite display area 1100. In some embodiments, only a subset of media clips may correspond to a particular location marker (i.e., the location markers may correspond to every third media clip or some other increment). Such an increment may be based on a user selection, the number of media clips in the composite project, a desired number of location markers, etc.

The selection of a location marker that corresponds to a media clip causes the media clip to be displayed at a particular location of the composite display area 1100 (e.g., at the far-left of the composite display area, at a fixed offset from the far-left of the composite display area, at the playhead location, etc.). In some embodiments, the navigation tool scrolls the composite representation across composite display area 1100 such that the media clip is displayed at the particular location of the composite display area. In addition, the navigation tool of some embodiments adjusts the zoom of the composite display area such that a particular range of the composite representation is displayed in the composite display area. Some embodiments automatically determine whether to scroll and/or zoom the display, while other embodiments allow a user to select whether to scroll and/or zoom (and/or allow the user to select under what conditions to scroll and/or zoom). Navigation will be described in more detail in sub-section I.B below.

In the second association 1110, each location marker 1125-1155 is associated with a navigable location point along the timeline, such as one of points 1170-1176, that may be displayed in the composite display area 1100. Although the navigable location points are shown as evenly spaced in this example, one of ordinary skill in the art will recognize that some or all of the navigable location points may be placed at irregular intervals along the timeline. Different embodiments set the location of each navigable location point in different ways (e.g., by a user selection, by automatically determining the location based on the media content included in the composite project, etc.).

The selection of a location marker that corresponds to a navigable location point causes the navigable location point to be displayed at a particular location of the composite display area. As mentioned above, the navigation tool scrolls the display of the composite display area such that the navigable location point is displayed at the particular location of the composite display area. In addition, the navigation tool may adjust the zoom of the composite display area such that a particular range along the timeline is displayed in the composite display area.

In the third association 1115, each location marker 1125-1155 corresponds to a section of the composite representation, such as one of sections 1180-1186, that may be displayed in the composite display area 1100. Although the sections are shown as evenly spaced in this example, one of ordinary skill in the art will recognize that the sections may have various durations along the timeline. In some embodiments, the section boundaries are not adjacent as shown (i.e., there may be portions of the composite representation that are not included in any section). Different embodiments define section boundaries in different ways (e.g., the boundaries may be set by a user, may be generated by dividing the composite representation into a particular number of sections of equal duration, etc.).

The selection of a location marker that corresponds to a section causes the selected section to be displayed at a particular location of the composite display area. As mentioned above, the navigation tool scrolls the display of the composite display area such that the section (or a particular point within the section) is displayed at the particular location of the composite display area. In addition, the navigation tool may adjust the zoom of the composite display area such that only the selected section is displayed in the composite display area. Alternatively, some embodiments adjust the zoom such that the composite display area includes portions of the composite representation adjacent to the selected section.

In the fourth association 1120, each location marker 1135-1145 corresponds to a set of media clips, such as one of sets 1190-1192, that may be displayed in the composite display area 1100. For clarity, in this example not all location markers 1125-1155 are shown as corresponding to a set of media clips. However, one of ordinary skill in the art will recognize that each location marker corresponds to a set of media clips, where some of the sets of media clips are not displayed in the composite display area (i.e., where some of the media clips included in the composite representation have scrolled off the visible display of the composite display area).

The selection of a location marker that corresponds to a set of media clips causes the selected set of clips to be displayed at a particular location of the composite display area. As mentioned above, the navigation tool scrolls the display of the composite display area such that the set of clips (or a particular point within the set of clips) is displayed at the particular location of the composite display area. In addition, the navigation tool may adjust the zoom of the composite display area such that only the selected set of clips is displayed in the composite display area. Alternatively, some embodiments adjust the zoom such that the composite display area includes portions of the composite representation adjacent to the selected set of clips.

Different embodiments define sets of media clips in different ways (e.g., the sets may be defined by a user, may be generated by dividing the composite project into sets of media clips based on an evaluation of content in the media clips, etc.). A set of media clips may include one media clip (such as section 1190) or more than one media clip (such as section 1191 or 1192).

One of ordinary skill in the art will recognize that the navigable locations may differ from the conceptual representations shown in FIG. 11. For instance, in some embodiments the navigable locations may not be arranged in the same order as the location markers. In addition, although various examples below may reference particular types of navigable locations (e.g., sections), one of ordinary skill in the art will recognize that other types of navigable locations may be used (e.g., a set of media clips). Furthermore, some embodiments may use a combination of types of navigable locations in a single navigation tool (e.g., one location marker may correspond to a clip while a second marker corresponds to a section along the timeline).

Although many examples refer to a navigation tool that provides direct navigation to various locations, different embodiments allow different types of navigation. For instance, some embodiments may include hierarchical navigation where the selection of a particular location marker provides a set of markers corresponding to sub-locations of the selected marker. A more detailed explanation of such hierarchical segmentation of media projects is provided in U.S. patent application Ser. No. 12/551,557, now published as United States Publication No. 2010/0281381, entitled "Graphical User Interface for a Media-Editing Application With a Segmented Timeline," filed on Aug. 31, 2009, incorporated herein by reference.

B. Navigation Process

Figure 12:
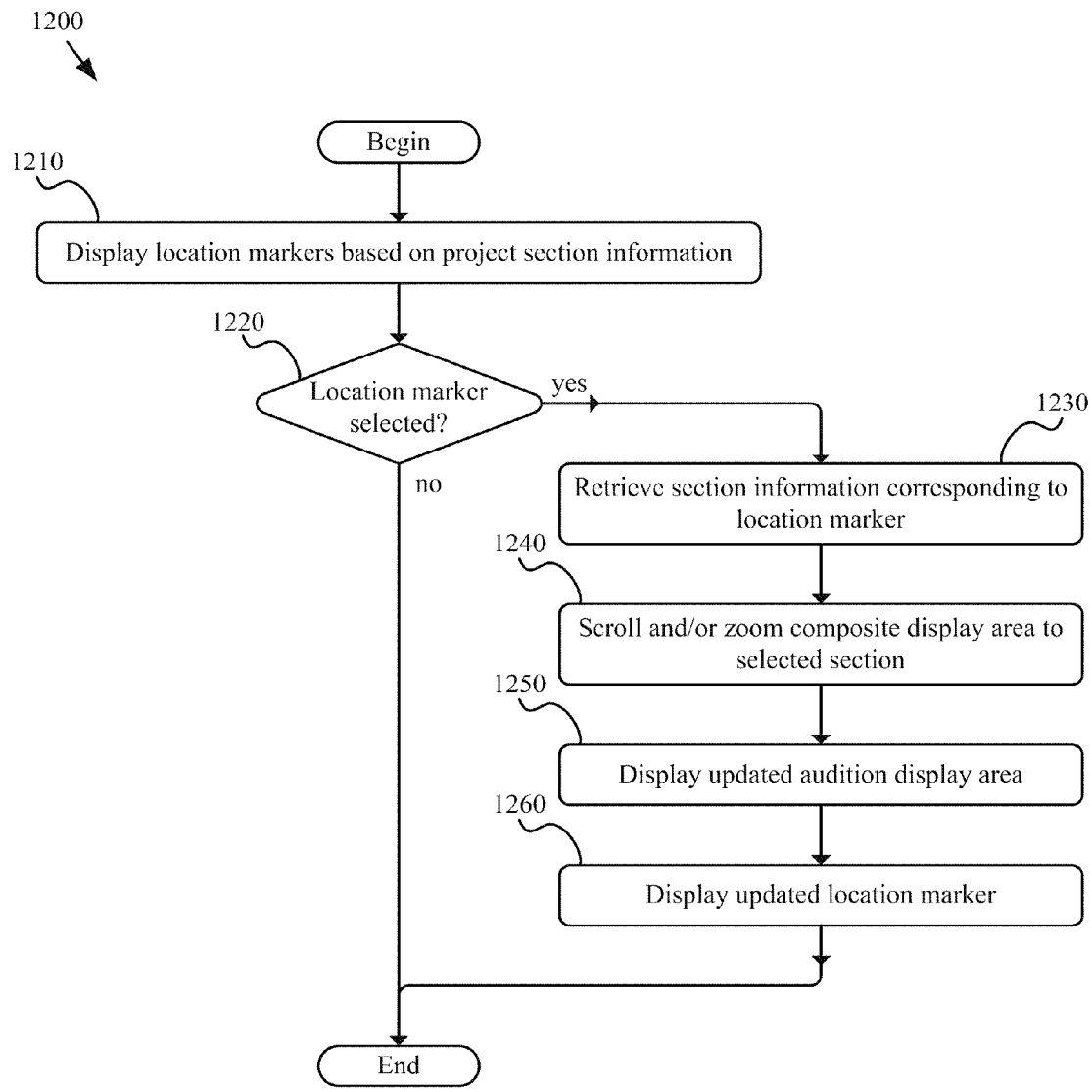
FIG. 12 conceptually illustrates an example of a process that some embodiments use to navigate to a particular section of the project using the location markers.

As described above, in some embodiments the selection of a location marker causes the audition display area to be opened, or to display the section of the audition display area associated with the selected location marker. FIG. 12 conceptually illustrates an example of a process 1200 that some embodiments use to select a particular section of the project using location markers. Process 1200 will be described by reference to FIGS. 7-11 and 13 which illustrate various example user interfaces, example section types, and an example user interface interaction.

Process 1200 begins when a media editing application that includes the audition display area is launched. Next, the process displays (at 1210) location markers based on the project section information. In some embodiments, the location markers may not be displayed until activated by a user (e.g., by selecting a GUI button, performing a menu selection, etc.). In addition, some embodiments may display other features of the GUI (e.g., an audition display area corresponding to the currently-displayed section). The location markers may be similar to markers 830 described above in reference to FIG. 8 or markers 250 described above in reference to FIG. 2. In addition, as described above in reference to FIGS. 8-11, the audition display area may be implemented using various other GUI features, controls, etc.

Next, the process determines (at 1220) whether a location marker has been selected. Such a selection may be made by performing a cursor click operation, a menu selection, or some other appropriate way. When the process determines (at 1220) that no location marker has been selected, the process ends. Otherwise, the process proceeds to operation 1230 described below. One example of the selection of a location marker is described below.

Figure 13:
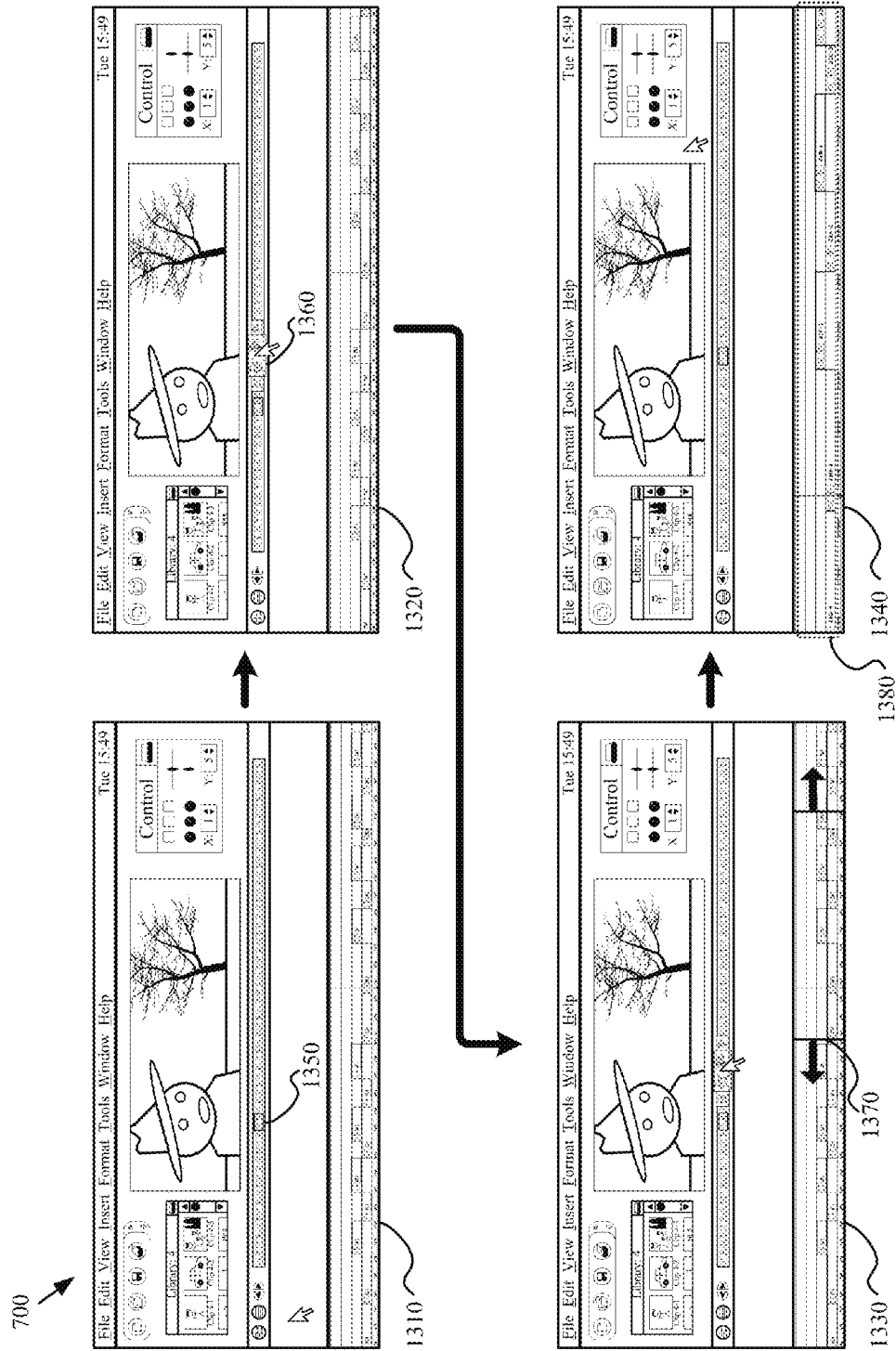
FIG. 13 illustrates an example of using the location markers of some embodiments to navigate to a particular location in a composite media presentation.

FIG. 13 illustrates an example of using the location markers of some embodiments to navigate to a particular location in a composite media presentation. FIG. 13 illustrates the same GUI 700 as described above in reference to FIGS. 7-8. In this example, a user navigates from one location in a composite project to another location by using a cursor to select a location marker provided by some embodiments. This example illustrates a zoom adjustment to the composite display area in addition to a scrolling adjustment. To illustrate the example of navigating from one location to another using the location markers, FIG. 13 describes four different stages 1310-1340 of a user's interaction with the GUI 700.

FIG. 13 shows a first stage 1310 that is before the user has selected a location marker in order to navigate to a different section of the presentation. In this stage, the composite display area 730 displays a location of the composite project that is associated with previously-selected location marker 1350. The selection of location marker 1350 has caused a change in the graphical representation of the selected location marker relative to the other location markers.

Although the location marker 1350 is indicated as having been previously selected, the location of the composite project shown in the composite display area may not necessarily correspond to the selected marker (i.e., the user may have manually navigated away from that location after selecting the marker).

FIG. 13 further shows a second stage 1320 of user interaction that is after the user has positioned the cursor 790 over a particular location marker 1360. As shown, in this example, positioning the cursor over the particular location marker has caused the particular location marker and several adjacent markers to be displayed at a larger size than other location markers. Different embodiments may change the display of the location markers in different ways or not at all when a user positions the cursor over the marker. In this stage, the user selects the particular location marker 1360 in order to initiate the navigation. The user makes this selection by positioning the cursor 790 over the location marker 1360 and performing a click operation.

Returning to FIG. 12, when process 1200 determines (at 1220) that a location marker has been selected, the process retrieves (at 1230) section information corresponding to the selected location marker. Various examples of different types of sections were described above in reference to FIG. 11.

After retrieving (at 1230) the section information, the process scrolls and/or zooms (at 1240) the composite display area to the section associated with the selected location marker. In some embodiments, zoom adjustment may be performed based on various criteria (e.g., user preference, default selection, type of navigable location, etc.). The zoom adjustment may be used to display an appropriate viewing range of the project. The appropriate viewing range may be based on the location information, as described above in reference to FIG. 11, or may be based on user preference, evaluation of the content at that location, or some other appropriate criteria. Such scrolling and zooming may be performed in a similar manner to that described below. One example of such scrolling and/or zooming is described below.

FIG. 13 also shows a third stage 1330 of user interaction that is after the user has selected the particular location marker 1360. In this stage, the composite display area 730 is updated to present the section 1370 associated with the particular location marker. As shown, in this example the composite display area is scrolled from right to left as the display is updated. In addition, the zoom of the composite display area is adjusted such that the selected section 1370 is enlarged to fill the entire composite display area. Some embodiments may adjust the zoom such that the selected section does not fill the entire composite display area (i.e., the zoom may be adjusted such that the composite display area presents the selected section and some portion of the composite representation adjacent to the selected section). In this manner, a user may view the selected section in context within the composite project.

After scrolling and/or zooming (at 1240) the composite display area, process 1200 displays (at 1250) an updated audition display area. Alternatively, some embodiments may open an audition display area (e.g., the example of FIG. 2) in order to receive candidate clips. The display of the audition display area may be updated concurrently with the composite display area in some embodiments. Other embodiments may update the audition display area separately from the update of the composite display area. One example of such an update is described below.

FIG. 13 shows a fourth stage 1340 of user interaction that is after the composite display area has been updated to present the section 1370 associated with the particular location marker 1360. In addition, the display has been updated to reflect the selection of the particular location marker 1360 (as indicated by the thicker border). As described above in reference to FIG. 11, the section 1370 may be a clip, a point within the composite representation, a segment of the timeline, a set of media clips, or some other appropriate portion of the composite project. In the example of FIG. 13, the playhead 780 has moved relative to the composite display area 730, however, in some embodiments the playhead will remain at a fixed location relative to the composite display area.

Next, process 1200 displays (at 1260) an updated location marker to reflect the currently-selected location. Such an update may be performed as described in reference to the fourth stage 1340 of FIG. 13. After displaying the updated marker, the process ends. In some embodiments, operations 1220-1260 are iteratively repeated until the audition display area is deactivated.

Different embodiments allow a user to deactivate the audition display area in different ways (e.g., by performing a pull-down menu operation, clicking a button, etc.). In addition, the audition display area may be deactivated automatically in some embodiments (e.g., when a user selects an option or tool of the media editing application that is incompatible with the audition display area, when loading a project that does not include section information, etc.).

One of ordinary skill in the art will recognize that the operations of process 1200 are conceptual and may not necessarily be performed in the order shown. For instance, in some embodiments, the process may retrieve section information (if available) before receiving a command to invoke the audition display area. Furthermore, different specific operations may be performed in different embodiments. For instance, some embodiments may display an updated preview display area to reflect the content at the selected section of the composite project in addition to scrolling and/or zooming the composite display area. Also, the process may not be performed as one continuous series of operations. In addition, the process could be implemented using several sub-processes, or as part of a larger macro-process. Furthermore, various processes may be performed concurrently, sequentially, or some combination of sequentially and concurrently (e.g., certain operations of a first process may be performed concurrently with certain operations of a second process, while other operations of the first process may need to be completed before continuing to other operations of the second process).

Although several examples above and below describe particular operations, features, etc., one of ordinary skill in the art will recognize that different embodiments may perform different operations, present different features, or otherwise differ from the examples given. For instance, although many operations are described as being performed using a cursor, one of ordinary skill in the art will recognize that these operations could also be performed using a set of keystrokes, making one or more pop-up or pull-down menu selections, or various other ways (e.g., a combination of cursor movement and keystrokes, activation of a hotkey, etc.). As another example, although several examples may be described by reference to a navigation tool, some embodiments may implement the audition display area independently of the navigation tool (e.g., a user may manually navigate to a desired location whether the navigation tool is available or not). As yet another example, in some embodiments the location markers provide visual indications of one or more audition display areas without providing any navigation functions.

In addition, although the examples above and below may show various specific changes in display appearance of different GUI elements, one of ordinary skill in the art will recognize that different embodiments may change the display in different ways. For instance, while many examples shows a selected item as having a thicker border than other, non-selected items, one of ordinary skill in the art will recognize that selected items could be indicated in various other ways (e.g., changes in background, changes in color saturation, changes in contrast, etc.). Furthermore, although various examples above and below show various combinations of media clips, different embodiments may include various different media items than those shown (e.g., digital pictures, special effects, overlay text, etc.).

III. Adding Candidate Clips to the Audition Display Area

Figure 14:
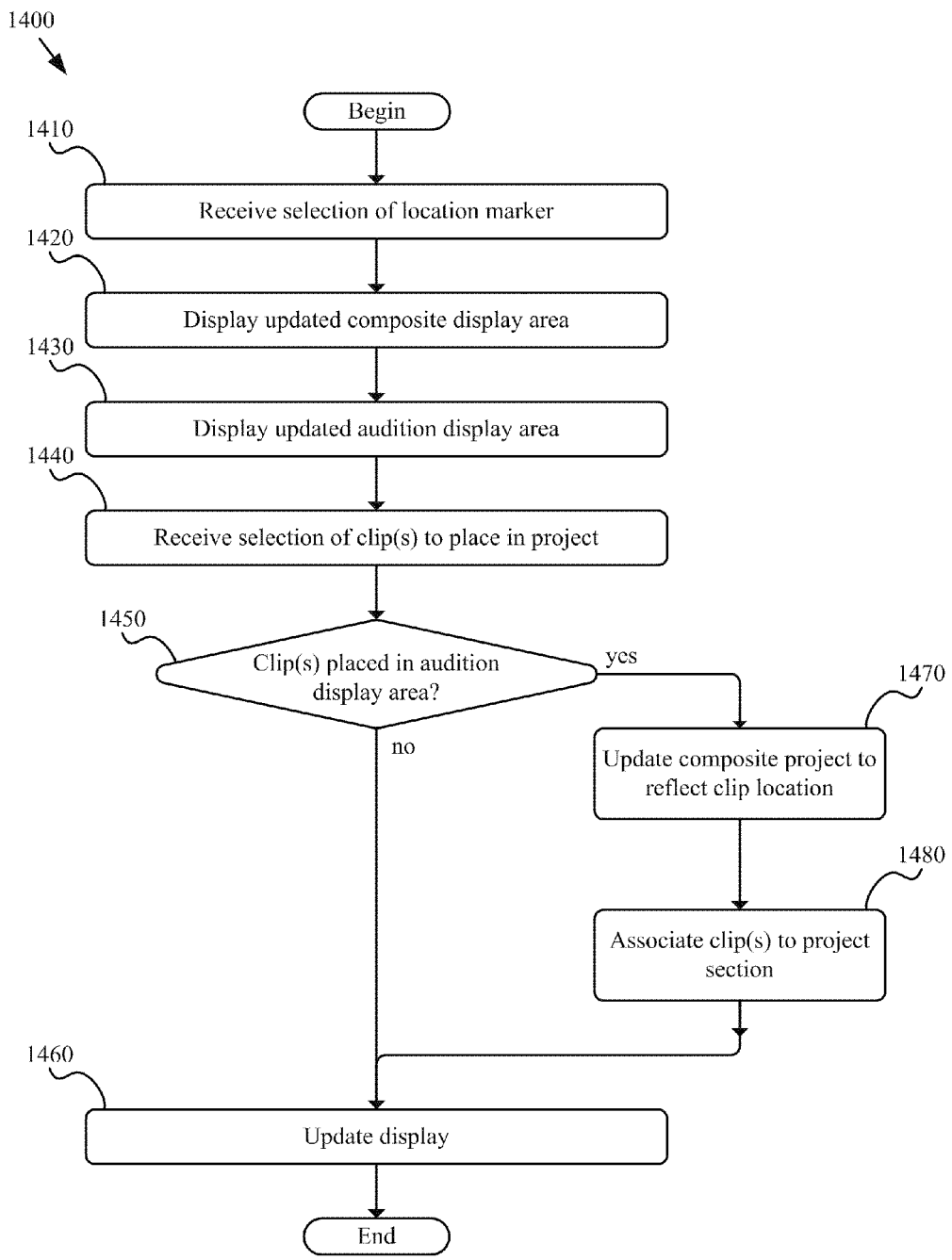
FIG. 14 illustrates a conceptual process used by a media editing application of some embodiments to add one or more clips to the audition display area.

As described above, in some embodiments the audition display area is used to associate candidate clips with various locations of a composite media project. FIG. 14 conceptually illustrates an example of a process 1400 that some embodiments use to add one or more clips to the audition display area. Process 1400 will be described by reference to FIG. 15 which illustrates an example user interface interaction.

Figure 15:
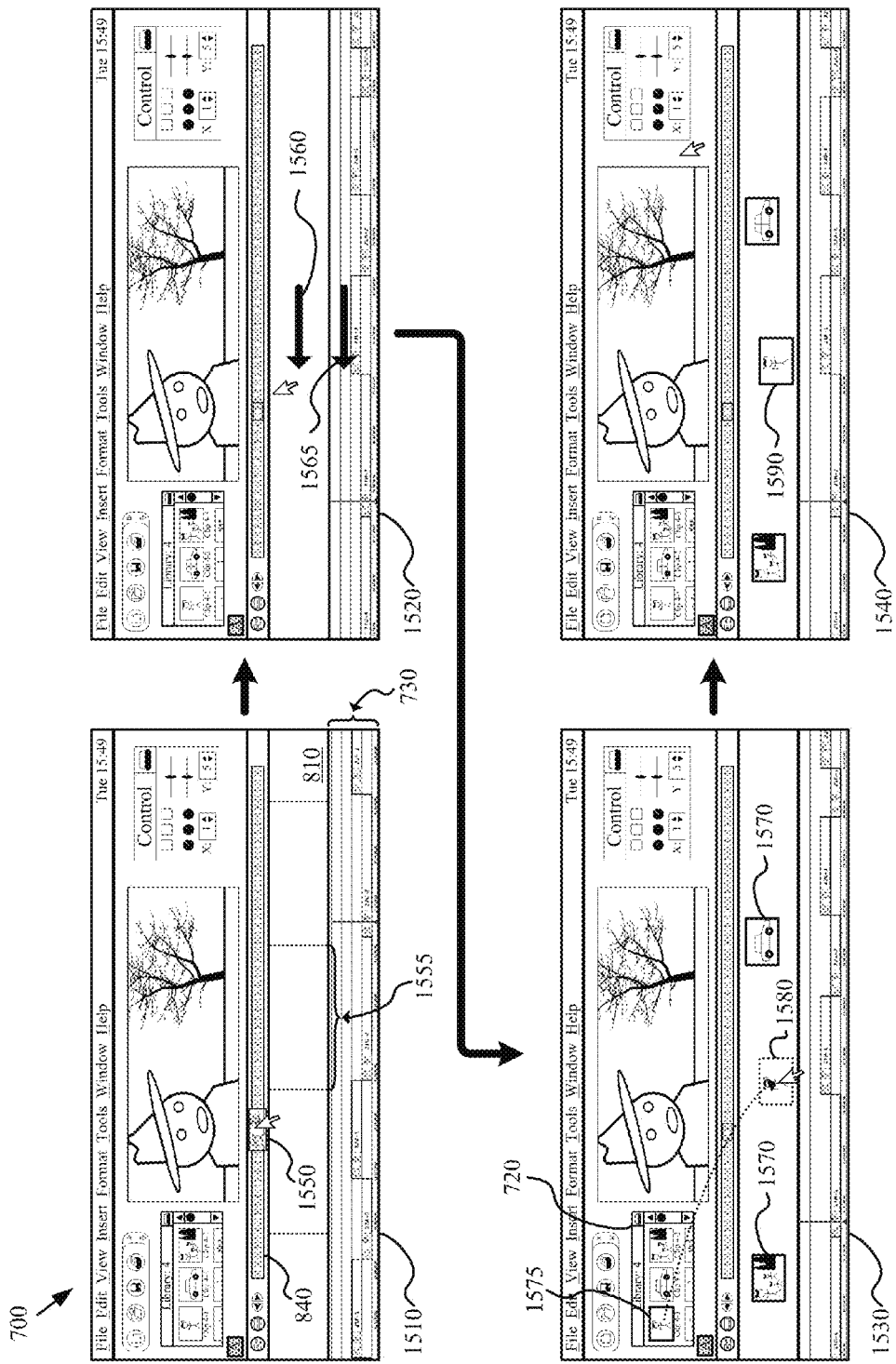
FIG. 15 illustrates an example of using a navigation tool in conjunction with the audition display area of some embodiments to navigate to a particular section of a composite media presentation and add a candidate clip to the audition display area associated with the particular section.

FIG. 15 illustrates an example of using a navigation tool 840 in conjunction with an audition display area 810 of some embodiments to navigate to a particular section of a composite media presentation and add a candidate clip to the audition display area associated with the particular section. In this example, a user navigates from one section of a composite project to another section by using a cursor to select a location marker provided by the navigation tool in conjunction with the audition display area of some embodiments. The user is then able to select and place the clip in the audition display area associated with the selected section of the project. FIG. 15 illustrates the same GUI 700 as described above in reference to FIGS. 7-9 and 13. To illustrate the example of navigating to a particular section of a composite media presentation and adding a candidate clip to the audition display area, FIG. 15 describes four different stages 1510-1540 of a user's interaction with the GUI 700.

Process 1400 begins when a media editing application that includes the audition display area is launched. Process 1400 then receives (at 1410) a selection of a location marker. The location marker corresponds to a project section in which the user may choose to add the clips. The selection of a location marker may be made using an appropriate user interface item. The selection of a location marker may be performed as described below.

FIG. 15 shows a first stage 1510 that is before the user has selected a location marker. In this stage, the composite display area 730 displays a portion of the composite project that has been previously navigated to in some appropriate way (e.g., by manipulating scroll and zoom controls associated with the composite display area). In this example, the composite display area includes sections that are segments along the timeline 1555. The segments are indicated by dashed lines in this example; however, such dashed lines may not necessarily be displayed in the GUI 700. As described above in reference to FIG. 11, a section may be a clip, a point within the composite project, a segment of the timeline, a set of media clips, or some other appropriate portion of the composite project.

In the first stage, a user selects a particular location marker 1550 (e.g., by positioning the cursor over the desired location marker and performing a click operation) in order to select the section associated with the particular location marker. As shown, the particular location marker 1550 (and several surrounding markers) has been enlarged relative to the other markers. Different embodiments may indicate the selected marker in different ways (e.g., by changing the background color of the marker, by changing the border of the marker, etc.).

Process 1400 then displays (at 1420) an updated composite display area corresponding to the section associated with the selected location marker. The composite display area may be scrolled and/or zoomed depending on the current display, the properties of the selected section, user preference, or some other appropriate criteria. Next, process 1400 displays (at 1430) an updated audition display area. The updates to the composite display area and the audition display area may be performed as described below.

FIG. 15 further shows a second stage 1520 of user interaction that is after the user has selected the particular location marker 1550. In this stage, the display of the composite display area 730 and the display of the audition display area 810. The update of the display areas may be performed in a similar manner to that described above in reference to FIGS. 12-13. In this example, the update to the display areas involves scrolling the display such that the desired section of the project is visible in the display areas. The second stage 1520 illustrates arrows 1560-1565 to indicate that the scrolling is in midstream. In some embodiments, the update of the audition display area involves opening the audition display area, such as in the example of FIG. 2 described above.

After displaying (at 1430) the updated audition display area, process 1400 receives (at 1440) a selection of one or more clips to place in the project. One example of receiving such a selection is described below. After receiving (at 1440) a selection of one or more clips, process 1400 determines (at 1450) whether the selected clips have been placed in the audition display area. Some embodiments may determine (at 1450) whether the selected clips have been placed in the audition display area by determining the location of the GUI over which the clips were released. When the clips are released over the audition display area, the clips are determined to have been placed in the audition display area in some embodiments. Different embodiments may make the determination in different ways, depending on how the clips are added. For example, if the clips are added through one or more keystroke commands, a particular keystroke or keystrokes may correspond to placing the clips in the audition display area. Some embodiments may select and place the clips in the audition display area in a similar manner to that described below.

FIG. 15 also shows a third stage 1530 of user interaction that is after the composite display area and audition display area have been updated to reflect the section of the project associated with the particular location marker 1550. In this stage, the updated audition display area 810 includes various previously-added candidate clips 1570. In this stage, the user selects a clip 1575 from the media library 720 and moves the selected clip 1575 to a desired location 1580 in the audition display area 810 (e.g., by using a drag-and-hold cursor operation). In this example, the clip is shown with a dashed border to indicate that it has not yet been added to the audition display area. The user then places the selected clip 1575 in the audition display area (e.g., by performing a cursor release operation).

When process 1400 determines (at 1450) that the clips have not been placed in the audition display area, the process updates (at 1460) the display of the GUI and ends. Otherwise, the process continues to operation 1470 described below. In some embodiments, the process may determine that the clips have been placed in another location of the GUI (e.g., placed in the composite display area 730 as a committed clip). In these cases, the display may be updated (at 1460) to reflect the placement of the clips outside the audition display area (e.g., the display of the composite display area may be updated).

When the process determines (at 1450) that the clips have been placed in the audition display area, the process updates (at 1470) the composite project to reflect the clip's location in the audition display area. After updating (at 1470) the composite project, the process associates (at 1480) the clips with the project section associated with the location marker selected in operation 1410. In some embodiments, this association is performed when updating (at 1470) the composite project. The association may allow the candidate clips placed in the audition display area to be displayed when a user selects the section in the future. Conceptual data structures used by some embodiments to implement such functionality will be described in more detail in reference to FIG. 22 below.

In some embodiments, as an alternative to placing the clips in the audition display area, the clips may be released over the location marker. In some of these embodiments, the clips may be placed at a location within the audition display area (e.g., at the far left of the displayed audition display area, at the far right of the audition display area, at a location to the right of previously-placed clips, at a location previously selected by the user, etc.). In some embodiments, process 1400 performs operations 1470-1480 in a similar manner to that described above when the clips are released over the location marker.

After associating (at 1480) the clips with the project section, the process updates (at 1460) the display of the GUI and ends. The update of the GUI display may include updates to the audition display area as described below. In addition, other areas of the GUI (e.g., the preview display area) may be updated as appropriate.

FIG. 15 shows a fourth stage 1540 of user interaction that is after the user has placed the clip 1590 to the audition display area and the display has been updated. In this manner, the clip is added to the project as a candidate clip and is associated with the desired section of the project. In some embodiments, this association is explicit (i.e., section data in the project is updated to reflect the added clip), while in other embodiments, the association is implicit (e.g., the added clip is associated with a particular location along the timeline, such that it may be associated with one or more sections of the project, as appropriate).

One of ordinary skill in the art will recognize that the conceptual operations described in reference to FIG. 15 may be performed in various ways without departing from the spirit of the invention. For instance, as described above in reference to FIG. 4, in some embodiments a user may select a clip from the media library before dragging the clip to a location over a navigation marker in order to navigate to the desired section of the project and then add the selected clip to the audition display area. As another example, in some embodiments a user may select multiple clips to add at one time.

In addition to the examples of FIGS. 2 and 15, different embodiments may add candidate clips to an audition display area in various different ways. For instance, a user could manually navigate to a particular location of the composite project before invoking an audition display area such as area 810 described above in reference to FIG. 8 and then adding one or more candidate clips to the area.

One of ordinary skill in the art will recognize that the operations of process 1400 are conceptual and may not necessarily be performed in the order shown. For instance, in some embodiments, the process may associate the selected clips with the project section before updating the composite project. Furthermore, different specific operations may be performed in different embodiments. For instance, in some embodiments (e.g., when the audition display area is opened), the update of the display includes removing the audition display area and updating the display of the location marker as described above in reference to FIG. 2. Also, the process may not be performed as one continuous series of operations. In addition, the process could be implemented using several sub-processes, or as part of a larger macro-process. Furthermore, various processes may be performed concurrently, sequentially, or some combination of sequentially and concurrently.

IV. Edit Operations Using the Audition Display Area

As described above, various edit operations may be performed using with the audition display area. Sub-section IV.A provides a conceptual description of various operations that may be performed to change the status of a clip (e.g., committed or candidate). Sub-section IV.B then describes grouping of candidate clips. Next, Sub-section IV.C describes example operations used to iteratively evaluated candidate clips at a particular project location.

A. Modifying Clip Status

Figure 16:
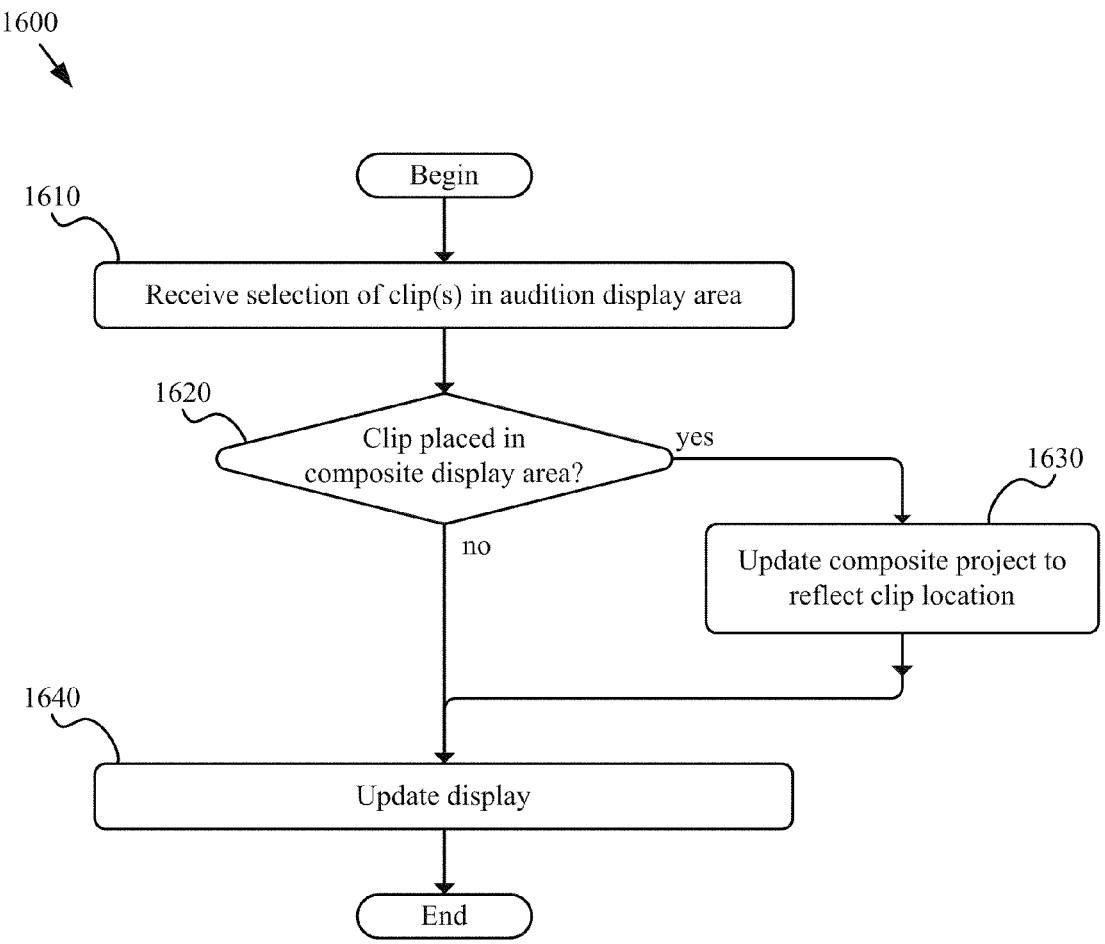
FIG. 16 illustrates a conceptual process used by a media editing application of some embodiments to change the status of a clip from committed to candidate.

As described above, in some embodiments a committed clip may be moved from the audition display area to the composite display area in order to change the clip to a committed clip. FIG. 16 conceptually illustrates an example of a process 1600 that some embodiments use to change the status of a clip from candidate to committed. Process 1600 will be described by reference to FIG. 17 which illustrates an example user interface interaction.

Figure 17:
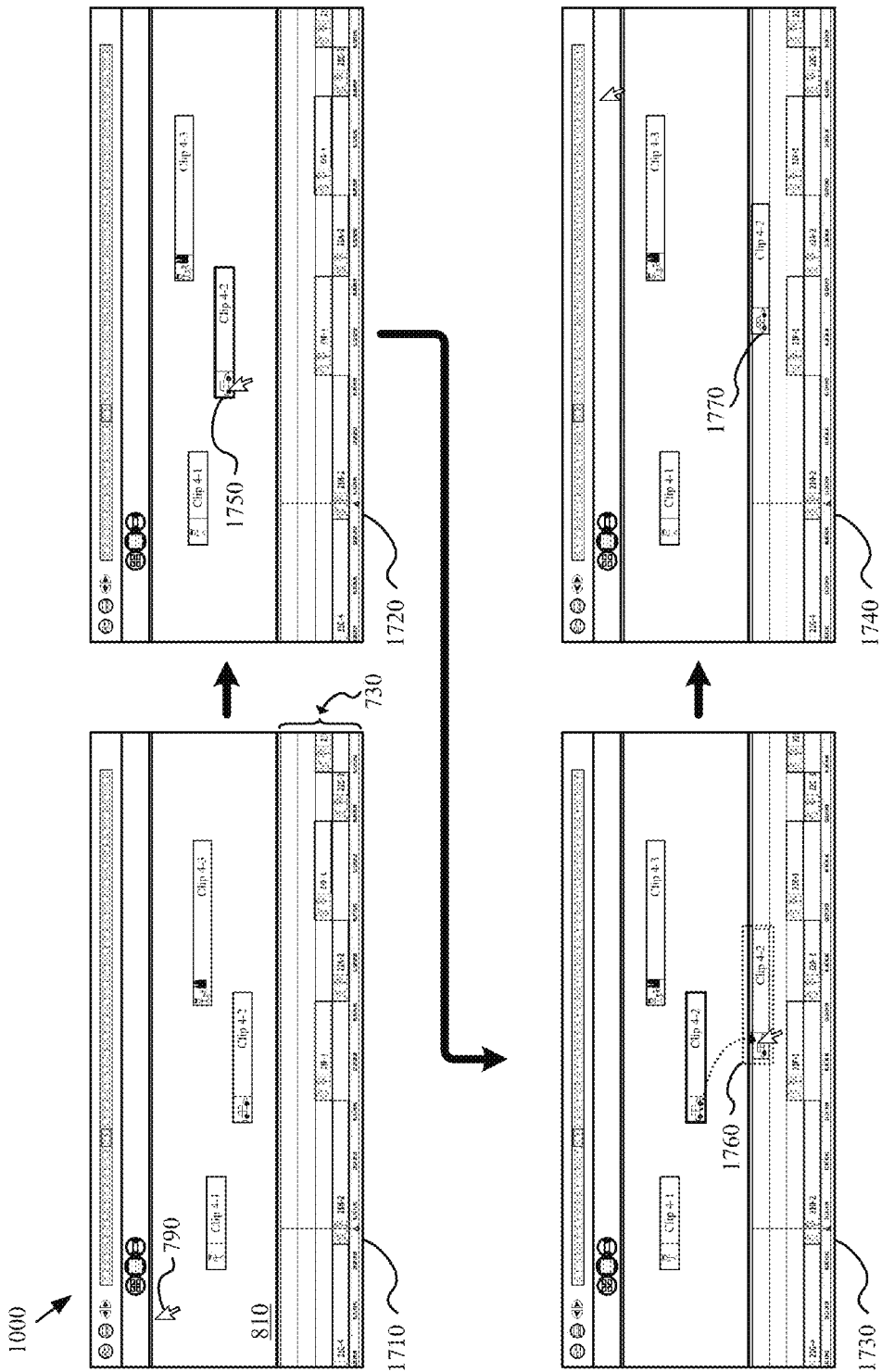
FIG. 17 illustrates an example of changing a clip from a candidate to a committed clip using the audition display area of some embodiments in conjunction with the composite display area.

FIG. 17 illustrates an example of changing a clip from a candidate to a committed clip using the audition display area 810 of some embodiments in conjunction with the composite display area 730. In this example, a user removes a candidate clip from the audition display area and adds the clip to the composite display area (as a committed clip) by using a cursor operation to select the clip and drag the clip to a location over the composite display area. FIG. 17 illustrates the same GUI 1000 as described above in reference to FIG. 10. To illustrate the example of changing a clip from a candidate to a committed clip, FIG. 17 describes four different stages 1710-1740 of a user's interaction with the GUI 1000.

Process 1600 begins when a media editing application that includes the audition display area is launched. In some embodiments, the process may not begin until the audition display area is activated. Next, the process receives (at 1610) a selection of one or more clips from the audition display area. This selection could be received by selecting clips from the audition display area as described below.

FIG. 17 shows a first stage 1710 that is before the user has selected a candidate clip. This stage is the same as stage 1040 described above in reference to FIG. 10. FIG. 17 further shows a second stage 1720 of user interaction that is after the user has positioned the cursor 790 over a particular candidate clip 1750 displayed in the audition display area 810. In this stage, the user selects the particular candidate clip (e.g., by performing a cursor click operation). The selected clip is indicated by a thicker border in this example.

Process 1600 then determines (at 1620) whether the clip was placed in the composite display area. When the process determines that the clip was not placed in the composite display area, the process continues to operation 1640 described below. Otherwise, the process updates (at 1630) the composite project to reflect the new clip location (and the new clip status). Conceptual data structures used by some embodiments to manage clip location and clip status will be described in more detail in reference to FIG. 22 below. The determination of whether the clip was placed in the composite display area could be made in a similar manner to that described below.

FIG. 17 also shows a third stage 1730 of user interaction that is after the user has moved the selected clip 1750 to a location 1760 over the composite display area (e.g., by using a drag-and-hold cursor operation). In this example, the clip is shown with a dashed border to indicate that it has not yet been placed in the composite display area.

Lastly, FIG. 17 shows a fourth stage 1740 of user interaction that is after the user has placed the clip 1750 in the composite display area (e.g., by performing a cursor release operation). As shown, the clip 1750 has been removed from the audition display area (indicating that the clip is no longer a candidate clip) and the clip 1770 has been added to the composite display area (indicating that the clip is now a committed clip). In this manner, the status of the clip is changed from candidate to committed, and the clip would be included in the composite presentation.

One of ordinary skill in the art will recognize that the conceptual operations described in reference to FIG. 17 may be performed in various ways without departing from the spirit of the invention. For instance, in some embodiments the clip may be displayed in both the audition display area and the composite display area after releasing the clip over the composite display area. In such embodiments, the representation of the clip in the audition display area may be changed (e.g., by using a different color, different shape, etc.) in order to indicate that the clip is now a committed clip. As another example, in some embodiments a user may select multiple clips to add at one time.

In the example of FIG. 17, the added clip 1760 does not overlap any previously-placed clips in the composite display area; however, some embodiments allow a user to move a candidate clip from the audition display area to an area of a track that holds one or more other clips. In some of these embodiments, placing a candidate clip in this manner changes the attributes of an existing clip that it overlaps on the same track (e.g., by trimming the existing clip such that the two clips no longer overlap, by removing the existing clip from the composite display area, by moving the existing clip to an open area of a different track, etc.).

In addition, although the example of FIG. 17 has been shown by reference to an overwrite edit operation (i.e., an edit operation that does not affect previously placed clips), different types of edit operations may be used (e.g., insert, fit-to-fill, ripple edit, replace, exchange, superimpose, etc.) Furthermore, these edit operations may be performed in conjunction with other operations that define the effects of the edit operations (e.g., one or more tracks may be locked during an insertion operation). A more detailed explanation of various edit operations is provided in U.S. patent application Ser. No. 12/433,893, now published as United States Publication No. 2010/0281376, entitled "Edit Visualizer for Modifying and Evaluating Uncommitted Media Content," filed on Apr. 30, 2009, incorporated herein by reference.

Returning to FIG. 16, after updating (at 1630) the composite project or after determining (at 1620) that the clips were not placed in the composite display area, process 1600 updates (at 1640) the display and ends. The update of the display may include removing the selected clips from the audition display area and adding the clips to the composite display area as described above. When the clips were not placed in the composite display area, the display update may depend on where the clips were placed. For instance, if the clips were placed at a location in the audition display area, the display of the audition display area may be updated.

One of ordinary skill in the art will recognize that the operations of process 1600 are conceptual and may not necessarily be performed in the order shown. Furthermore, different specific operations may be performed in different embodiments. For instance, in some embodiments, the status of a clip may be changed in different ways than selecting a clip in the audition display area and moving the clip to the composite display area (e.g., through one or more keystroke commands, menu commands, etc.). As another example, various operations (e.g., operation 1620) may include a timeout feature such that the process ends (or executes a different process, performs other operations, etc.) if a clip is not placed in the GUI within a certain time of selecting the clip. Also, the process may not be performed as one continuous series of operations. In addition, the process could be implemented using several sub-processes, or as part of a larger macro-process. Furthermore, various processes may be performed concurrently, sequentially, or some combination of sequentially and concurrently.

Figure 18:
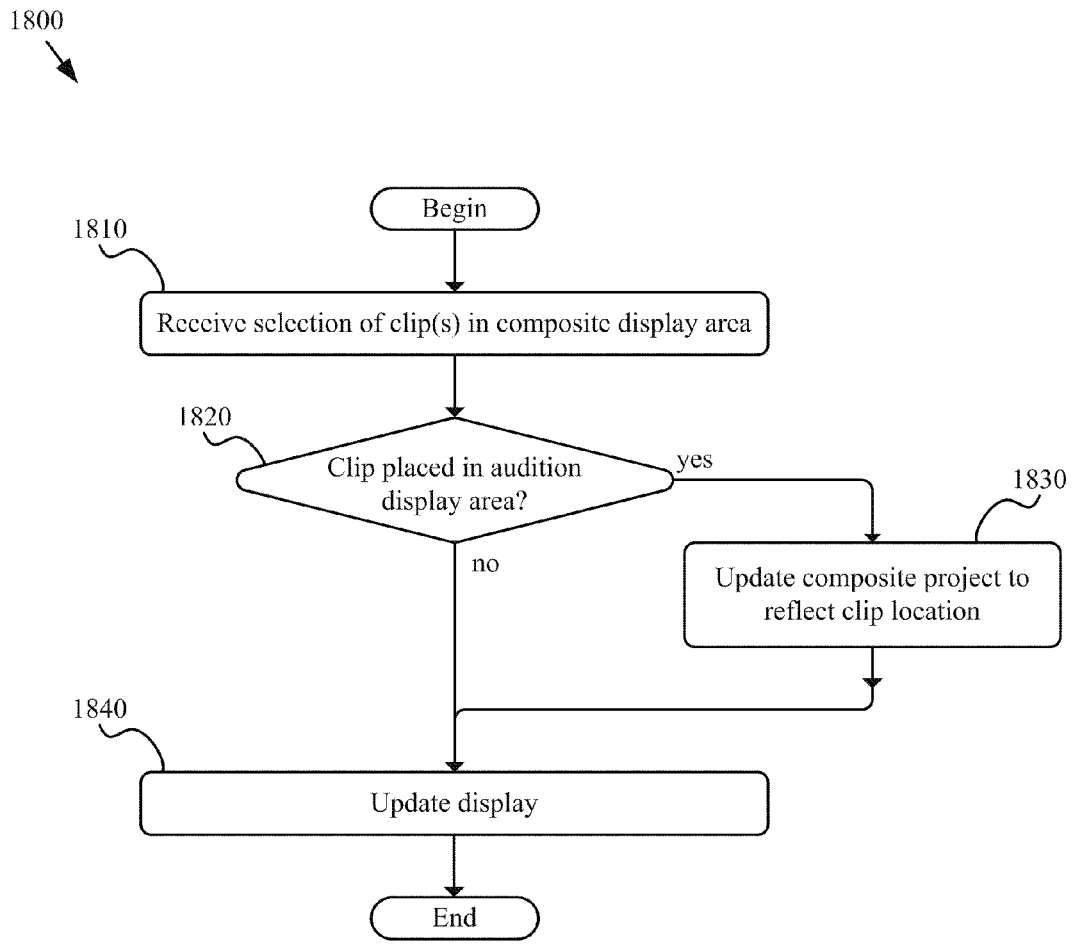
FIG. 18 illustrates a conceptual process used by a media editing application of some embodiments to change the status of a clip from a candidate clip to a committed clip.

As described above, in some embodiments a candidate clip may be moved from the composite display area to the audition display area in order to change the clip to a candidate clip. FIG. 18 conceptually illustrates an example of a process 1800 that some embodiments use to change the status of a clip from committed to candidate. Process 1800 will be described by reference to FIG. 19 which illustrates an example user interface interaction.

Figure 19:
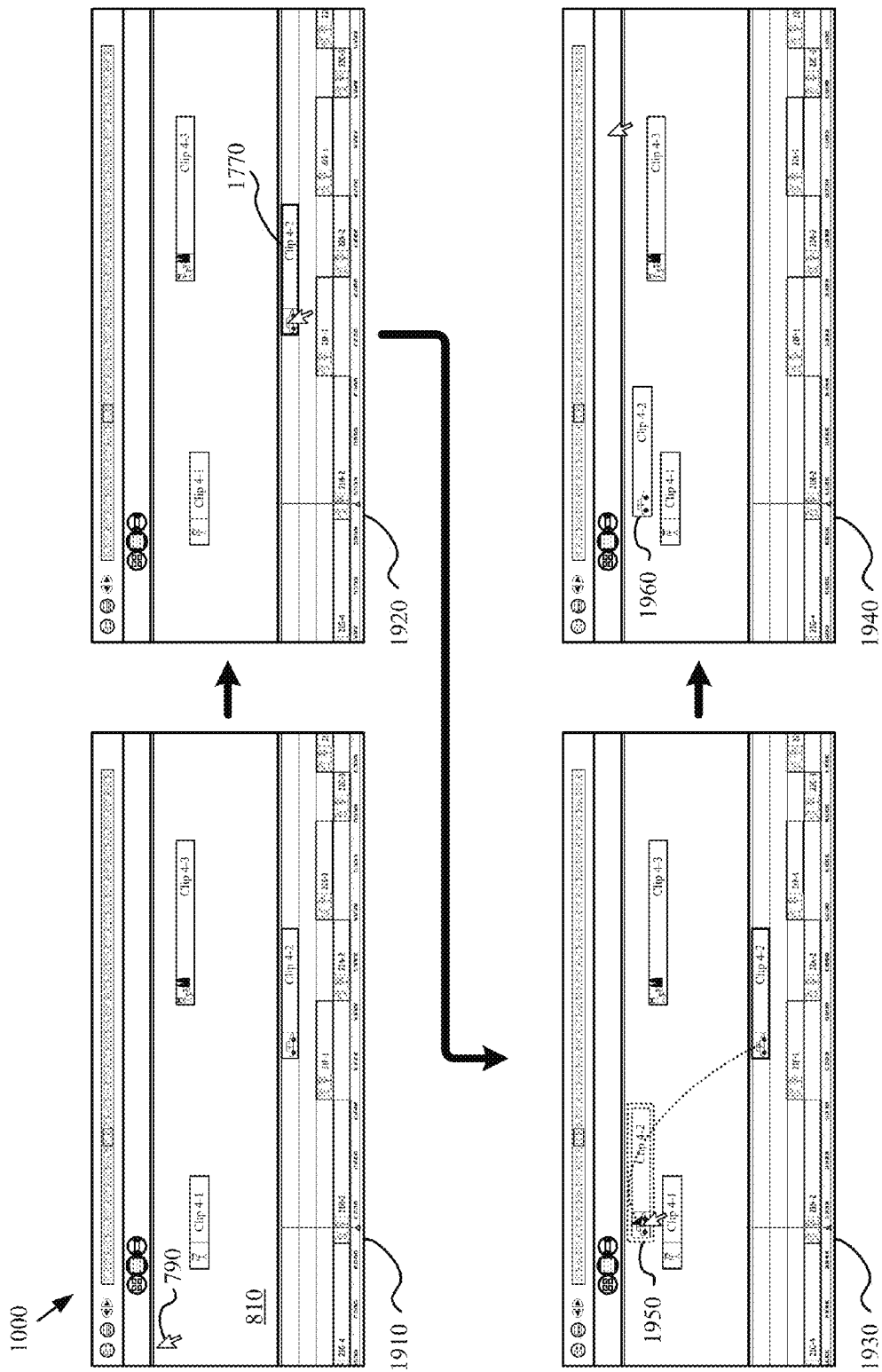
FIG. 19 illustrates an example of changing a clip from a committed to a candidate clip using the audition display area of some embodiments in conjunction with the composite display area.

FIG. 19 illustrates an example of changing a clip from a committed to a candidate clip using the audition display area 810 of some embodiments in conjunction with the composite display area 730. In this example, a user removes a candidate clip from the composite display area and adds the clip to the audition display area by using a cursor to select the clip and drag the clip to a location over the audition display area. FIG. 19 illustrates the same GUI 1000 as described above in reference to FIGS. 10 and 17. To illustrate the example of changing a clip from a committed to a candidate clip, FIG. 19 describes four different stages 1910-1940 of a user's interaction with the GUI 1000.

Process 1800 begins when a media editing application that includes the audition display area is launched. In some embodiments, the process does not begin until the audition display area is activated. Next, the process receives (at 1810) a selection of one or more clips from the composite display area. This selection could be received by selecting clips from the audition display area as described below.

FIG. 19 shows a first stage 1910 that is before the user has selected a committed clip. This stage is the same as stage 1740 described above in reference to FIG. 17. FIG. 19 further shows a second stage 1920 of user interaction that is after the user has positioned the cursor 790 over a particular committed clip 1770 displayed in the composite display area 810. In this stage, the user selects the particular committed clip (e.g., by performing a cursor click operation). The selected clip is indicated by a thicker border in this example.

Process 1800 then determines (at 1820) whether the clip was placed in the audition display area. When the process determines that the clip was placed in the audition display area, the process updates (at 1830) the composite project to reflect the new clip location (and the new clip status). Conceptual data structures used by some embodiments to manage clip location and clip status will be described in more detail in reference to FIG. 22 below. The determination of whether the clip was placed in the audition display area could be made in a similar manner to that described below.

FIG. 19 also shows a third stage 1930 of user interaction that is after the user has moved the selected clip 1770 to a location 1950 over the audition display area (e.g., by using a drag-and-hold cursor operation). In this example, the clip is shown with a dashed border to indicate that it has not yet been placed in the audition display area.

Lastly, FIG. 19 shows a fourth stage 1940 of user interaction that is after the user has placed the clip 1770 in the audition display area (e.g., by performing a cursor release operation). As shown, the clip 1770 has been removed from the composite display area (indicating that the clip is no longer a committed clip) and the clip 1960 has been added to the audition display area (indicating that the clip is now a candidate clip). In this manner, the status of the clip is changed from committed to candidate, and the clip would not be included in the composite presentation.

One of ordinary skill in the art will recognize that the conceptual operations described in reference to FIG. 19 may be performed in various ways without departing from the spirit of the invention. For instance, in some embodiments the clip may be displayed in both the audition display area and the composite display area after releasing the clip over the audition display area. In such embodiments, a user may delete the clip from the composite display area to remove the clip from the display. As another example, in some embodiments a user may select multiple clips to remove from the composite display area at one time.

In addition, although the example of FIG. 19 shows the clips as freely placed within the audition display area, different embodiments may arrange the clips in different ways. For instance, in some embodiments the clips are placed in an end-to-end series. In such embodiments, clips added to the audition display area may be added at the end of the series, or have their positions defined relative to other clips in the audition display area (e.g., defined between two existing clips in the series). Some embodiments that provide multiple audition display areas (e.g., the example described above in reference to FIG. 2) include such an end-to-end positioning or relative positioning in each audition display area.

In the example of FIG. 19, the added clip 1960 does not overlap any previously-placed clips in the audition display area; however, some embodiments allow a user to move a committed clip from the composite display area to a location in the audition display area that holds one or more other clips. In some of these embodiments, placing a clip in this manner changes the attributes of any clip that it overlaps (e.g., by trimming the existing clip such that the two clips no longer overlap, by removing the existing clip from the audition display area, by moving the existing clip to an open location in the audition display area, etc.). Some embodiments may group overlapping clips as described below in sub-section IV.B.

Returning to FIG. 18, after updating (at 1830) the composite project, process 1800 updates (at 1840) the display and ends. The update of the display may include removing the selected clips from the composite display area and adding the clips to the audition display area as described above.

When the process determines (at 1820) that the clips were not placed in the audition display area, the process updates (at 1840) the display and ends. In such cases, the display update may depend on where the clips were placed. For instance, if the clips were placed at a location in the composite display area, the display of the composite display area may be updated.

One of ordinary skill in the art will recognize that the operations of process 1800 are conceptual and may not necessarily be performed in the order shown. Furthermore, different specific operations may be performed in different embodiments. For instance, in some embodiments, the status of a clip may be changed in different ways than selecting a clip in the composite display area and moving the clip to the audition display area (e.g., through one or more keystroke commands, menu commands, etc.). As another example, various operations (e.g., operation 1820) may include a timeout feature such that the process ends (or executes a different process, performs other operations, etc.) if a clip is not placed in the GUI within a certain time of selecting the clip. Also, the process may not be performed as one continuous series of operations. In addition, the process could be implemented using several sub-processes, or as part of a larger macro-process. Furthermore, various processes may be performed concurrently, sequentially, or some combination of sequentially and concurrently.

In addition, although the examples of FIGS. 16-19 do not show clips in the audition display area moving relative to the timeline (i.e., the clips are associated with a particular instance along the timeline or "timecode"), some embodiments may update the position of such clips based on various edit operations. For instance, in some embodiments the clips in the audition display area are associated with one or more clips in the composite display area. In these embodiments, the clips in the audition display area may be moved relative to the timeline in order to maintain the association with the clips in the composite display area (e.g., when the clips in the composite display area change position due to an insertion edit operation). As another example, some embodiments allow a user to specify the effects of various edit operations on the clips in the audition display area (e.g., move on insert, lock on insert, etc.).

B. Grouping Candidate Clips

As mentioned above, some embodiments allow a user to group clips in the audition display area. Grouping clips may be desirable when, for instance, a user has compiled several takes of a scene (or other related clips, such as associated video and audio clips) that the user may wish to try at different locations in a project. By grouping the clips, a user may select several clips at once and perform various edit operations (e.g., moving the clips to a different location, deleting the clips, etc.).

Such grouping may be performed in different ways in different embodiments. For instance, in some embodiments several clips may be grouped by defining a boundary around the clips (e.g., by performing a click and drag cursor operation). As another example, some embodiments group clips when the clips overlap in the audition display area (e.g., when a user selects a clip and places the clip at a location that overlaps one or more clips using a click and drag cursor operation). Different embodiments allow a user to group clips in various other ways (e.g., by sequentially selecting several clips through a ctrl-click cursor operation, by performing a menu selection, etc.).

Figure 20:
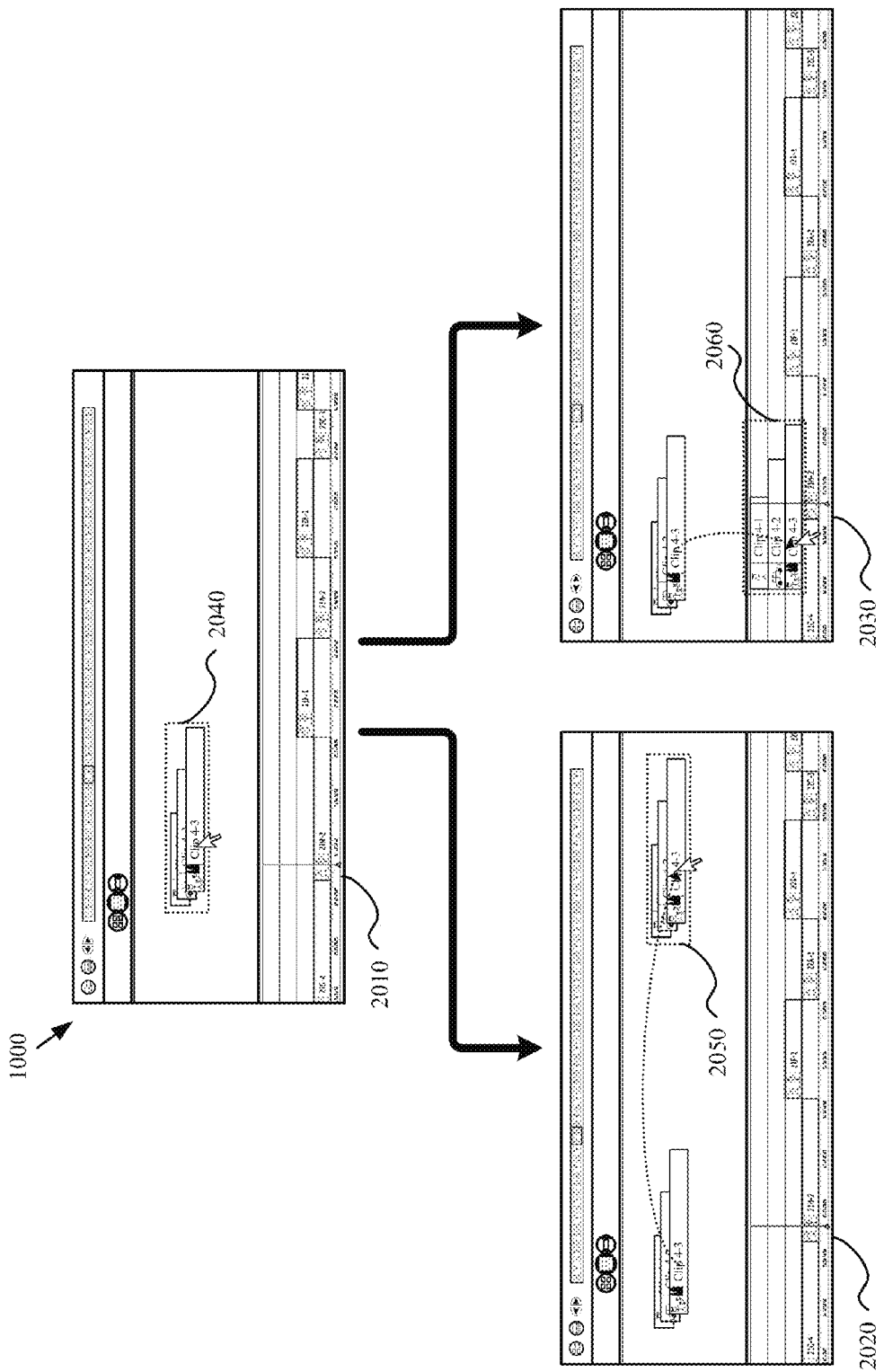
FIG. 20 illustrates an example of moving a group of clips from a location in the audition display area.

FIG. 20 illustrates an example of moving a group of clips from a location in the audition display area. Specifically, this figure shows the group of clips being moved to another location in the audition display area and the group of clips being moved to a location in the composite display area. FIG. 20 illustrates the same GUI 1000 as described above in reference to FIGS. 10, 17, and 19. To illustrate the example of moving a group of clips, FIG. 20 describes three different stages 2010-2030 of a user's interaction with the GUI 1000.

FIG. 20 shows a first stage 2010 that is after the user has created a group of clips 2040. This stage includes the same clips as stage 1940 described above in reference to FIG. 19. However, in this example the clips have been grouped by moving the clips such that they overlap in the audition display area (e.g., by performing click and drag cursor operations to position the clips such that they overlap). In this stage, a user selects the group of clips 2040 (e.g., by moving the cursor to a location over the group performing a cursor click operation).

FIG. 20 further shows a second stage 2020 of user interaction that is after the user has moved the group of clips 2040 to another location 2050 in the audition display area. In this example, the user has moved the group of clips to a location that was previously displayed in the audition display area, however some embodiments allow a user to navigate to other locations of the audition display area, or other audition display areas (e.g., by dragging the group of clips to a location over a location marker in a similar manner to that described above in reference to FIG. 4).

FIG. 20 also shows an alternative second stage 2030 of user interaction that is after the user has moved the group of clips 2040 to a location 2060 in the composite display area. In this example, the clips have been spread across multiple tracks such that the clips do not overlap; however, different embodiments may place the clips in the composite display area in different ways. For instance, in some embodiments the clips are superimposed over each other in a single track. As another example, some embodiments place the group of clips in series on a single track. As yet another example, in some embodiments the clips are placed across several tracks and/or along one or more tracks according to some criteria (e.g., multiple video clips may be placed sequentially in a video track, while any associated audio clips are placed in an audio track such that the audio clips are synchronized to the associated video clips). As still another example, some embodiments prompt a user to select a desired action when a group of clips is moved to the composite display area (e.g., whether to insert across multiple tracks, superimpose clips, insert a single clip from the group, etc.). Some embodiments remove the group from the audition display area after the group is placed in the composite display area in a similar manner to that described above in reference to FIGS. 16-17.

In addition, although the example of FIG. 20 shows a group of clips being moved from the audition display area to the composite display area (or to another location in the audition display area), one of ordinary skill in the art will recognize that groups of clips may also be moved from the composite display area to the audition display area (or to another location in the composite display area). Furthermore, different embodiments may provide different edit operations, insertion options, etc. when moving groups of clips.

One of ordinary skill in the art will recognize that the conceptual operations described in reference to FIG. 20 may be performed in various ways without departing from the spirit of the invention. For instance, in some embodiments the group of clips may be selected in various ways (e.g., by selecting a menu command, performing one or more keystroke commands, etc.). As another example, some embodiments allow a user to select a sub-set of clips from a group of clips (e.g., by performing sequential cursor click operations over the group) in order to modify only a sub-set of clips in the group (e.g., to remove a clip from the group, to place a single clip from the group at a different location, etc.).

C. Evaluating Candidate Clips

Figure 21:
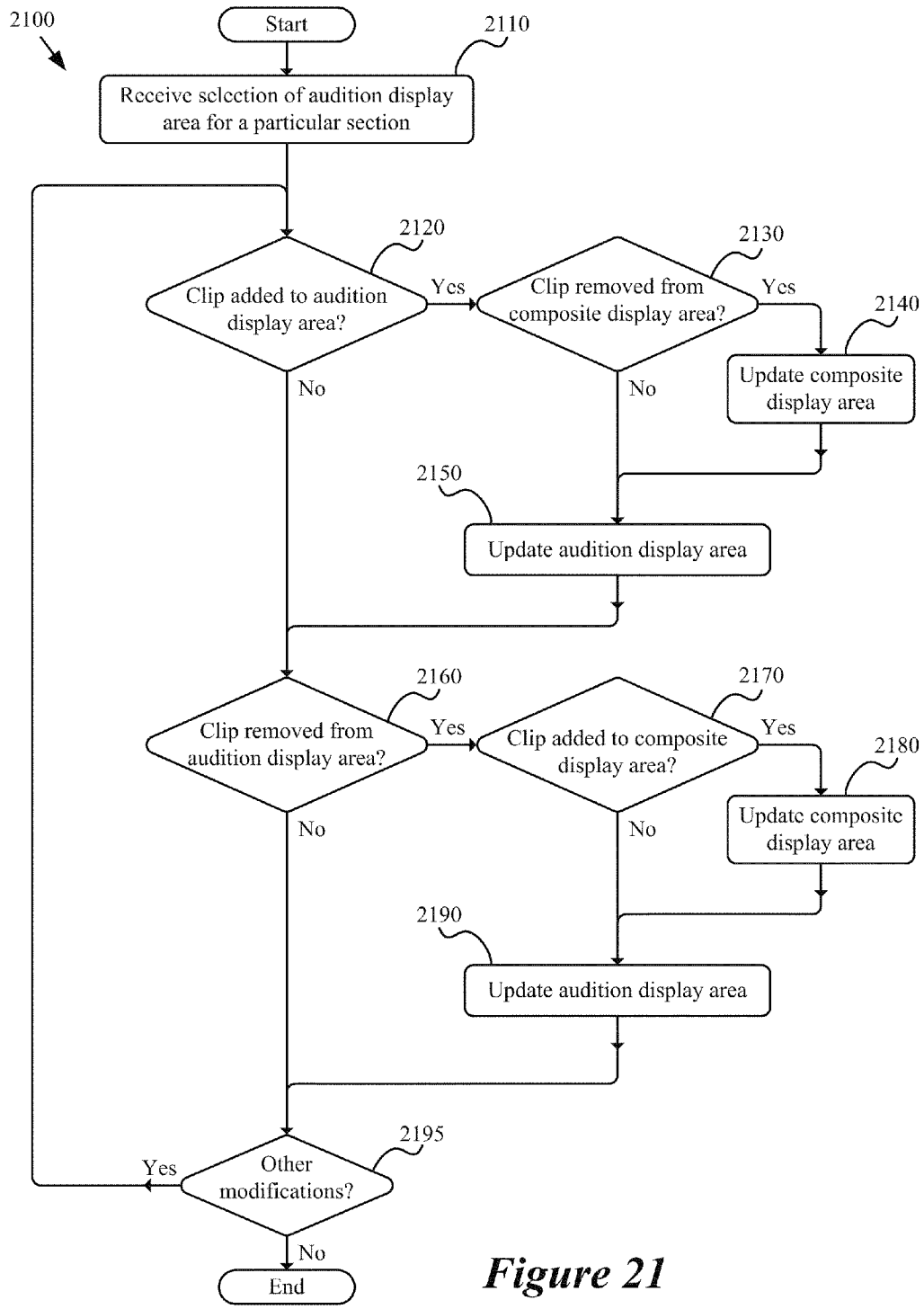
FIG. 21 conceptually illustrates a process used to iteratively evaluate different candidate clips for possible inclusion in a composite media presentation.

FIG. 21 conceptually illustrates a process 2100 used to iteratively evaluate different candidate clips for possible inclusion in a composite media presentation. The process 2100 begins when a project is loaded using a media editing application of some embodiments. Next, the process receives (at 2110) a selection of an audition display area for a particular section of the project. Such a selection could be made as described above in reference to FIG. 2 or FIGS. 14-15.

After receiving (at 2110) a selection of an audition display area, the process determines (at 2120) whether a clip has been added to the audition display area. Such a determination could be made as described above in reference to FIGS. 18-19. When process 2100 determines that a clip has not been added to the audition display area, the process continues to operation 2160 described below. Otherwise, the process determines (at 2130) whether the clip was removed from the composite display area.

When the process determines that the clip was not removed from the composite display area, the process continues to operation 2150 described below. Otherwise, the process updates (at 2140) the composite display area. This update includes removing the clip from the composite display area as described above in reference to FIGS. 18-19. After updating (at 2140) the composite display area, or determining (at 2130) that the clip was not removed from the composite display area, process 2100 updates (at 2150) the audition display area. This update includes adding the clip to the audition display area as described above in reference to FIGS. 18-19.

After updating (at 2150) the audition display area or determining (at 2120) that no clip was added to the audition display area, the process determines (at 2160) whether a clip was removed from the audition display area. Such a determination may be made as described above in reference to FIGS. 16-17. When process 2100 determines that a clip has not been removed from the audition display area, the process continues to operation 2195 described below. Otherwise, the process determines (at 2170) whether the clip was added to the composite display area.

When the process determines that the clip was not added to the composite display area, the process continues to operation 2190 described below. Otherwise, the process updates (at 2180) the composite display area. This update includes adding the clip to the composite display area as described above in reference to FIGS. 16-17. After updating (at 2180) the composite display area, or determining (at 2170) that the clip was not added to the composite display area, process 2100 updates (at 2190) the audition display area. This update includes removing the clip from the audition display area as described above in reference to FIGS. 16-17.

After updating (at 2190) the audition display area or determining (at 2160) that no clip was removed from the audition display area, the process determines (at 2195) whether there are any other modifications to the section. Such a determination may be made based on various factors (e.g., whether a selection of a different section or audition display area has been made). When the process determines that there are other modifications, the process repeats operations 2120-2195 until the process determines (at 2195) that there are no other modifications, at which point the process ends.

By performing process 2100, some embodiments allow a user to iteratively evaluate various candidate clips by adding and/or removing candidate clips to and from the audition display area and/or adding and/or removing committed clips to and from the composite display area. In this way, a user may determine which potential clip provides the desired result without having to access potential candidate clips from various distinct clip libraries or other locations. In addition, although the user may remove a clip from the composite display area, but placing such a clip in the audition display area associated with that section of the project, the user is able to easily revert to the original clip if desired.

One of ordinary skill in the art will recognize that the operations of process 2100 are conceptual and may not necessarily be performed in the order shown. For instance, some embodiments determine whether a clip was removed from the audition display area before determining whether a clip was added to the audition display area. Furthermore, different specific operations may be performed in different embodiments. For instance, after a selection of an audition display area is received, some embodiments update the display of various GUI elements as described above in reference to FIG. 14. As another example, some embodiments prompt a user to save any unsaved edits before process 2100 ends. Also, the process may not be performed as one continuous series of operations. For instance, after adding a clip to the composite display area, a user may wish to view a preview of the composite presentation before continuing the operations of process 2100. In addition, the process could be implemented using several sub-processes, or as part of a larger macro-process. Furthermore, various processes may be performed concurrently, sequentially, or some combination of sequentially and concurrently.

V. Software Architecture and Implementation

In some embodiments, the processes described above are implemented as software running on a particular machine, such as a computer or a handheld device, or stored in a computer readable medium. Sub-section V.A below describes various conceptual data structures used by some embodiments to implement such software. Sub-section V.B then describes a conceptual software architecture used by some embodiments to present the tools and features described above.

A. Data Structures

Figure 22:
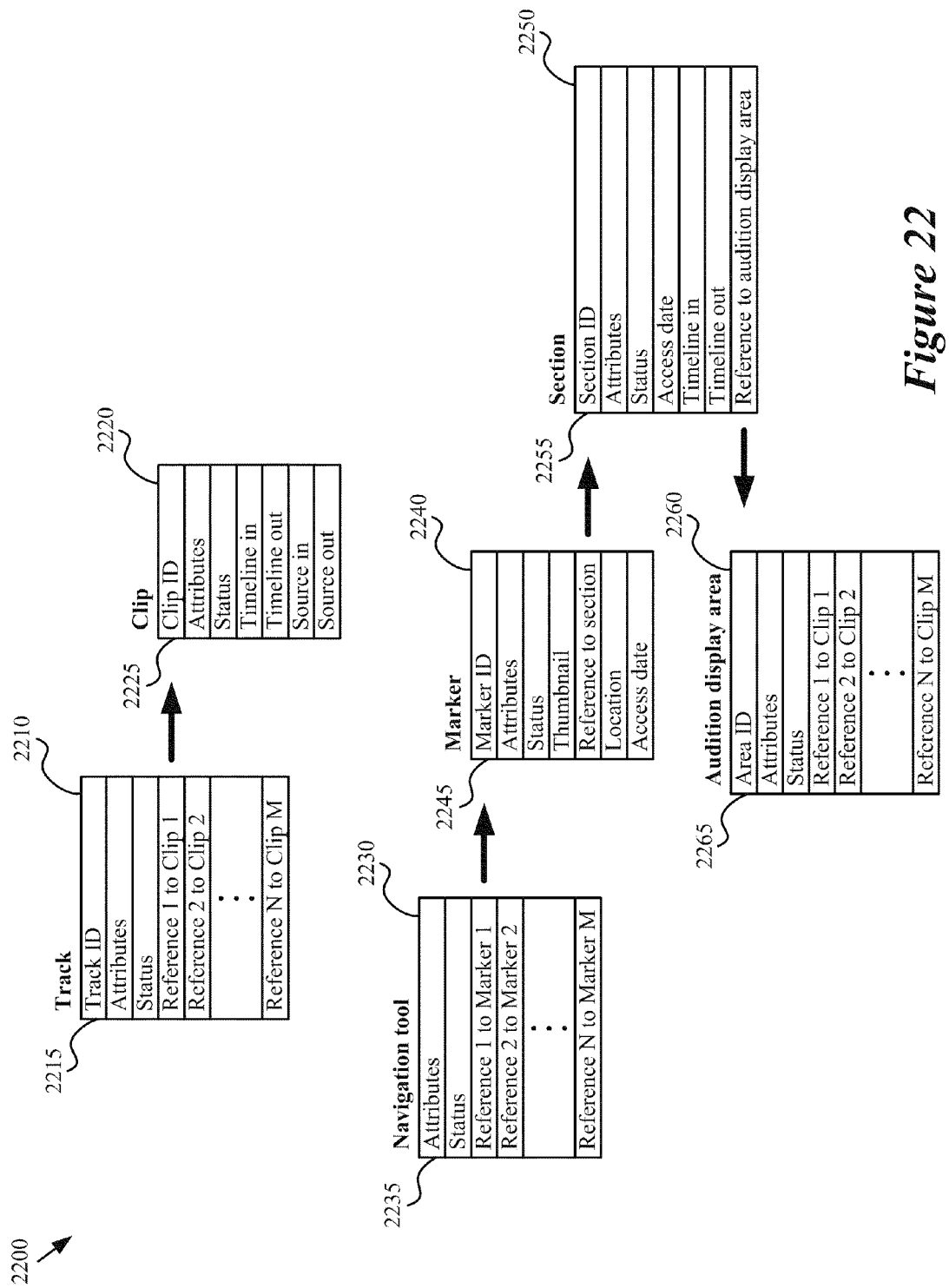
FIG. 22 illustrates an example data structure of a composite project file used by some embodiments to implement various tools and features of the media editing application.

FIG. 22 illustrates an example data structure of a composite project file 2200 used by some embodiments to implement various tools and features of the media editing application described above. As shown, the project file includes a track data element 2210. Such a track data element may be used to implement the video tracks, audio tracks, and/or other types of tracks (e.g., effects tracks, text overlay tracks, etc.) that may be included in a composite project. For example, the track data element could be used to implement a track such as track 770 described above in reference to FIG. 7. Although only one track data element is shown, a project will typically include multiple tracks, with each track corresponding to a different track data element. Each track data element includes multiple sub-elements 2215. These sub-elements may include data such as a track ID (e.g., "Audio Track 1"), track attributes (e.g., "audio", "video", etc.), and track status (e.g., "active", "inactive", etc.). In addition, each track data element includes one or more references to various clip data elements 2220.

Each clip data element 2220 corresponds to a media clip that is referenced by a track data element (e.g., clip 775 described above in reference to FIG. 7). Each clip data element includes various sub-elements 2225. The sub-elements may include data such as a clip ID (e.g., "clip 1"), clip attributes (e.g., "audio", "video", etc.), clip status (e.g., "committed", "candidate", etc.), as well as other data (e.g., timeline in, timeline out, source in, source out, etc.). In addition, the clip data element 2220 may include an audition display area location sub-element in some embodiments (i.e., the clip may include information related to the clip's position in the audition display area). In some embodiments each clip data element may include one or more references to media content (not shown). Such media content may include video files, audio files, digital images, etc. In some embodiments, the media content may be stored externally to the project file. Alternatively, in some embodiments the media content may be stored within the project file.

In addition to the track and clip data elements 2210 and 2220, in some embodiments the project file includes a navigation tool data element 2230. Such a navigation tool data element may be used to implement the navigation tool of some embodiments (e.g., tool 840 described above in reference to FIG. 8). The navigation tool data element includes sub-elements such as tool attributes (e.g., display mode, display size, etc.) and tool status (e.g., "active", "inactive", etc.). Each navigation tool data element also includes one or more references to various location marker data elements 2240.

Each marker data element 2240 may correspond to a location marker referenced by the navigation tool (e.g., location marker 830 described above in reference to FIG. 8). Alternatively, the marker data elements may be implemented without reference to or from the navigation tool data element (e.g., in some embodiments the location markers may be implemented separately from the navigation tool). The marker data element 2240 may include various sub-elements 2245. These sub-elements may include a marker ID (e.g., "intro", "scene 1", etc.), marker attributes, marker status (e.g., "selected", "highlighted", "inactive", etc.), thumbnail image, location, and access date. In some embodiments, the thumbnail image may be stored externally to the project file and referenced by the marker data element 2240. In other embodiments, the thumbnail image may be stored in the project file. In addition, the marker data element includes a reference to a section data element 2250 in this example; however different types of locations (e.g., those described above in reference to FIG. 11) may be referenced in different embodiments. For instance, some embodiments may include a reference to a single clip, a reference to timeline in and out points, etc., depending on the type of navigable location used by the navigation tool.

The section data element 2250 includes several sub-elements 2255. In this example, the sub-elements include a section ID (e.g., "scene 1", "intro", etc.), section attributes, section status, access date, and timeline in and out points. In addition, the section data element 2250 includes one or more references to an audition display area data element 2260 in some embodiments.

The audition display area data element 2260 includes various sub-elements 2265.

The sub-elements in this example include an area ID (e.g., "audition display area 1"), audition display area attributes, audition display area status (e.g., "active", "inactive", etc.), and references to clips. The references to clips may include multiple clip references similar to clip references of the track data element 2210 and may reference clip data elements such as clip element 2220.

One of ordinary skill in the art will recognize that project file 2200 is a conceptual representation only. Different embodiments may implement the data structures in various different ways. For instance, some embodiments may include various other elements in the project file (e.g., author name, project title, etc.). In addition, many of the example values are conceptual only and may be implemented in different ways in different embodiments. For instance, rather than a value such as "active", an audition display area status data element may include an alphanumeric string (or other data structure) that specifies the status.

In addition, some embodiments may include different numbers of individual elements, different references and/or data in each element, and/or different structures. For instance, some embodiments may not include navigation tool data elements. As another example, instead of including a separate audition display area data element, some embodiments set the status in the clip data element to committed or candidate in order to generate the audition display area by examining each clip reference in the applicable section of the composite project. Furthermore, although various sub-elements are included in some data elements, these sub-elements may not always be populated with values or may not be populated with current values.

For instance, the location sub-element of marker data element 2240 may depend on the timeline in and out points in the section data element 2250. In such a case, the section data element 2250 may be analyzed to determine the location to be included in the marker data element. At that point, the determined location may be populated through the other data elements.

B. Software Block Diagram

Figure 23:
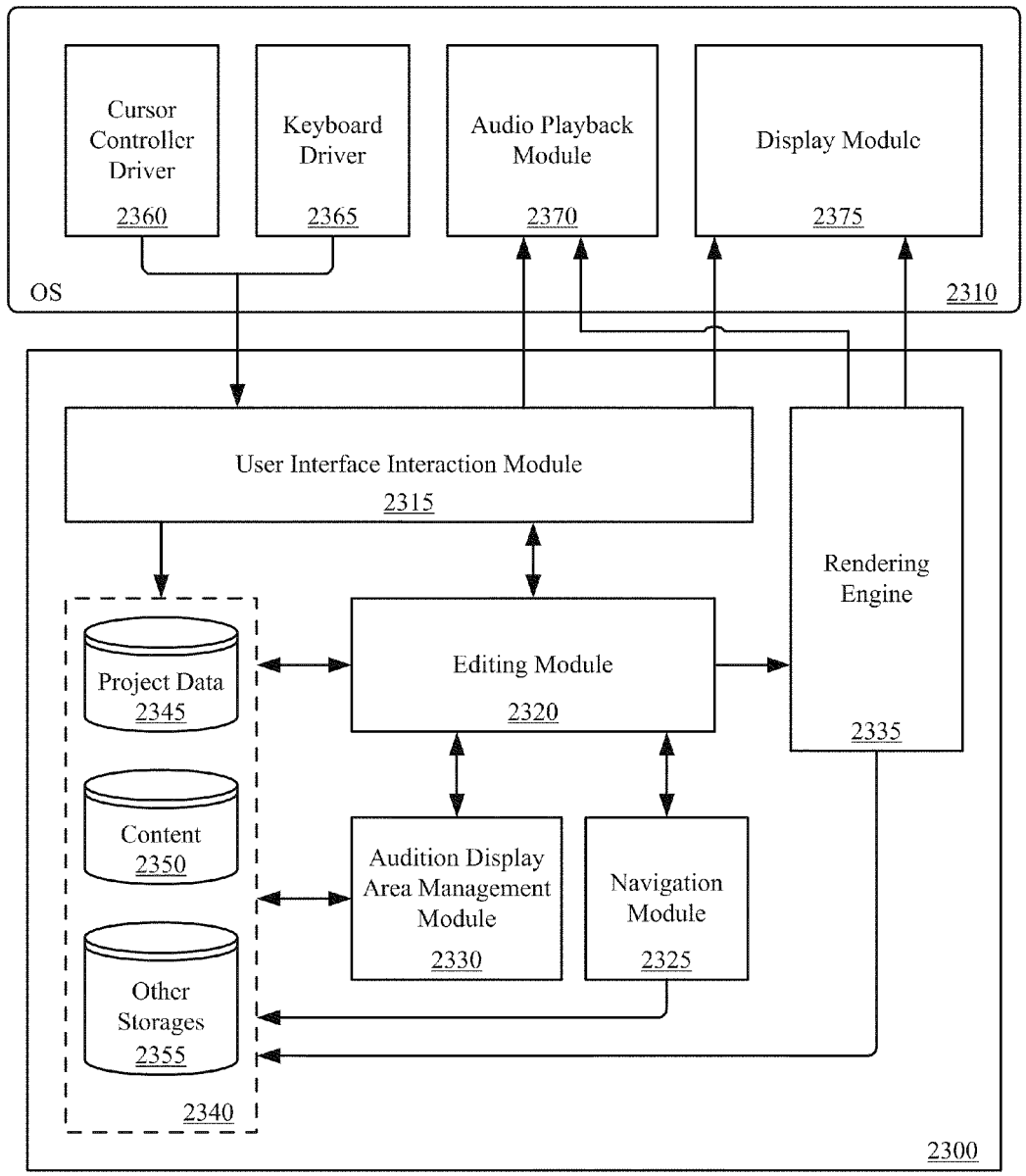
FIG. 23 conceptually illustrates the software architecture of the media editing application of some embodiments.

FIG. 23 conceptually illustrates the software architecture of an application 2300 of some embodiments for providing tools and features such as those described in the preceding sections. In some embodiments, the application is a stand-alone application or is integrated into another application (for instance, application 2300 might be a portion of a video-editing application), while in other embodiments the application might be implemented within an operating system. Furthermore, in some embodiments, the application is provided as part of a server-based (e.g., web-based) solution. In some such embodiments, the application is provided via a thin client. That is, the application runs on a server while a user interacts with the application via a separate client machine remote from the server (e.g., via a browser on the client machine). In other such embodiments, the application is provided via a thick client. That is, the application is distributed from the server to the client machine and runs on the client machine.

Media editing application 2300 includes a user interface interaction module 2315 for sending data to and receiving data from a user, an editing module 2320 for receiving and processing edits to a composite project, a navigation module 2325 for implementing the navigation tool (or other navigation features) of some embodiments, an audition display area management module 2330 for implementing the audition display area features of some embodiments, a rendering engine 2335 used to generate image data and/or audio data for storage and/or playback, and a set of storages 2340 for storing data used by the application 2300. The set of storages 2340 includes storages for project data 2345, content data 2350, and other data 2355.

The operating system 2310 of some embodiments includes a cursor controller driver 2360 that allows the application 2300 to receive data from a cursor control device, a keyboard driver 2365 for that allows the application 2300 to receive data from a keyboard, an audio playback module 2370 for processing audio data that will be supplied to an audio device (e.g., a soundcard and speakers), and a display module 2375 for processing video data that will be supplied to a display device (e.g., a monitor).

A user interacts with items in the user interface of the media editing application 2300 via input devices (not shown) such as a cursor controller (e.g., a mouse, touchpad, trackpad, etc.) and/or keyboard. The input from these devices is processed by the cursor controller driver 2360 and/or the keyboard driver 2365, and passed to the user interface interaction module 2315. In addition, other embodiments may allow a user to interact with items in the user interface using other input devices (e.g., a microphone) that are processed by other drivers and/or software modules (e.g., a microphone driver and a voice-recognition module).

The present application describes a graphical user interface that provides users with numerous ways to perform different sets of operations and functionalities. In some embodiments, these operations and functionalities are performed based on different commands that are received from users through different input devices (e.g., keyboard, trackpad, touchpad, mouse, etc). For example, the present application describes the use of a cursor in the graphical user interface to control (e.g., select, move) objects in the graphical user interface. However, in some embodiments, objects in the graphical user interface can also be controlled or manipulated through other controls, such as touch control.

In some embodiments, touch control is implemented through an input device that can detect the presence and location of touch on a display of the device. An example of such a device is a touch screen device. In some embodiments, with touch control, a user can directly manipulate objects by interacting with the graphical user interface that is displayed on the display of the touch screen device. For instance, a user can select a particular object in the graphical user interface by simply touching that particular object on the display of the touch screen device. As such, when touch control is utilized, a cursor may not even be provided for enabling selection of an object of a graphical user interface in some embodiments. However, when a cursor is provided in a graphical user interface, touch control can be used to control the cursor in some embodiments.

The user interface interaction module 2315 translates the data from the drivers 2360 and 2365 into the user's desired effect on the media editing application 2300. For example, when the user edits content in a display area of the media editing application, the user interface interaction module 2315 may translate these edits into instructions that are processed by the editing module 2320 in some embodiments. In other embodiments, the edits may be applied directly to project data 2345, or other data stored by the application 2300 in the set of storages 2340. An example of the user editing content is if the user trims a media clip in a display area of the media editing application 2300. The user interface interaction module 2315 also receives input data that is translated as instructions to preview visual content in a preview display area (for example, if a user clicks a play control while editing a media project).

Editing module 2320 of some embodiments processes edit instructions received from the user interface interaction module 2315 and data retrieved from the set of data storages 2340. Editing module 2320 may also create and/or update data stored within the set of data storages 2340 based on received instructions that affect the project data 2345, content 2350, or other stored data 2355. In addition, the editing module 2320 may send and/or receive instructions and/or data to and from the audition display area management module 2330 and/or navigation module 2325 of some embodiments. Furthermore, the editing module 2320 may also send data and/or instructions to the rendering engine 2335 of some embodiments.

In some embodiments, the editing module 2320 may include various sub-modules. For instance, some embodiments include a composite display area control module as a sub-module of the editing module 2320. Such a sub-module processes instructions received through the user interface interaction module 2315 and data retrieved from the set of data storages 2340. The composite display area control module may perform, for example, some or all of the operations of processes 1200, 1400, 1600, 1800, and/or 2100 in some embodiments. In addition, the composite display area control module may operate in conjunction with other modules (e.g., performing process 2100 in conjunction with the audition display area management module 2330, performing process 1800 in conjunction with the user interface interaction module 2315, etc.).

The navigation module 2325 of some embodiments processes navigation instructions received through the editing module 2320. The navigation module also accesses and/or generates data (e.g., section data elements, marker references, etc.) stored within the set of storages 2340. The navigation module 2325 may perform, for example, some or all of the operations of processes 1200, 1400, and/or 2100 in some embodiments. In addition, the navigation module may operate in conjunction with other modules (e.g., performing process 1200 in conjunction with the user interface interaction module 2315, performing process 2100 in conjunction with the editing module 2320, etc.).

The audition display area management module 2330 of some embodiments processes audition display instructions received through the editing module 2320. The audition display area management module may also access and/or generate data (e.g., audition display area data elements 2260, section data elements 2250, etc.) stored within the set of storages 2340 through the editing module 2320. The audition display area management module 2330 may perform, for example, some or all of the operations of processes 1200, 1400, 1600, 1800 and/or 2100 in some embodiments. In addition, the audition display area management module may operate in conjunction with other modules (e.g., performing processes 1200, 1400, 1600, 1800 and/or 2100 in conjunction with the editing module 2320, etc.).

Rendering engine 2335 enables the storage or output of audio and video from the media editing application 2300. For example, rendering engine 2335 uses data about media objects in a video scene to render the video scene from the particular location, direction, etc. defined by a camera object. As such, the rendering engine receives, in some embodiments, data from the editing module 2320 so that a preview can be displayed. Data from the rendering engine 2335 (e.g., audio and video data of a video scene, preview data, etc.) is passed to the display module 2375 and/or the audio playback module 2370. The audio playback module enables audio playback from the media editing application 2300 on an audio device (e.g., a set of speakers or headphones). Display module 2375 enables the display of the media editing application 2300 on a display device (e.g., a CRT monitor, LCD screen, etc.). Alternatively, data may be passed from the rendering engine 2335 to the set of storages 2340 for later playback.

Although the application 2300 and its features have been described using several specific embodiments, other embodiments might implement the application or its features using different resources or by placing the various modules in different specific locations. For instance, while many of the features have been described as being performed by one module (e.g., the UI interaction module 2315 or audition display area management module 2330), one of ordinary skill in the art would recognize that a particular operation might be performed using multiple modules. In addition, although various specific communication pathways have been described (e.g., audition display area management module 2330 receiving instructions from the editing module 2320), one of ordinary skill in the art will recognize that various other pathways could be used (e.g., the audition display area management module receiving instructions directly from the user interface interaction module). Furthermore, the application 2300 may include various other modules than those shown (e.g., a section management module for managing sections of the composite project).

One of ordinary skill in the art will recognize that the conceptual descriptions provided above in reference to FIGS. 22-23 may be implemented using different embodiments without departing from the spirit of the invention. For instance, the various storage modules 2245-2255 described above in reference to FIG. 23 may be implemented as a single storage element, where the various storage modules all exist at the same physical location, and are differentiated using some appropriate method. As another example, various storage modules 2245-2255 may be located externally to the application 2200 and accessed through a communication pathway (e.g., a bus). Section VI below describes a process of some embodiments for defining and storing the software modules described above. Section VII then describes a computer system used by some embodiments to implement the various software modules and structures described above.

VI. Process for Defining a Media Editing Application

Figure 24:
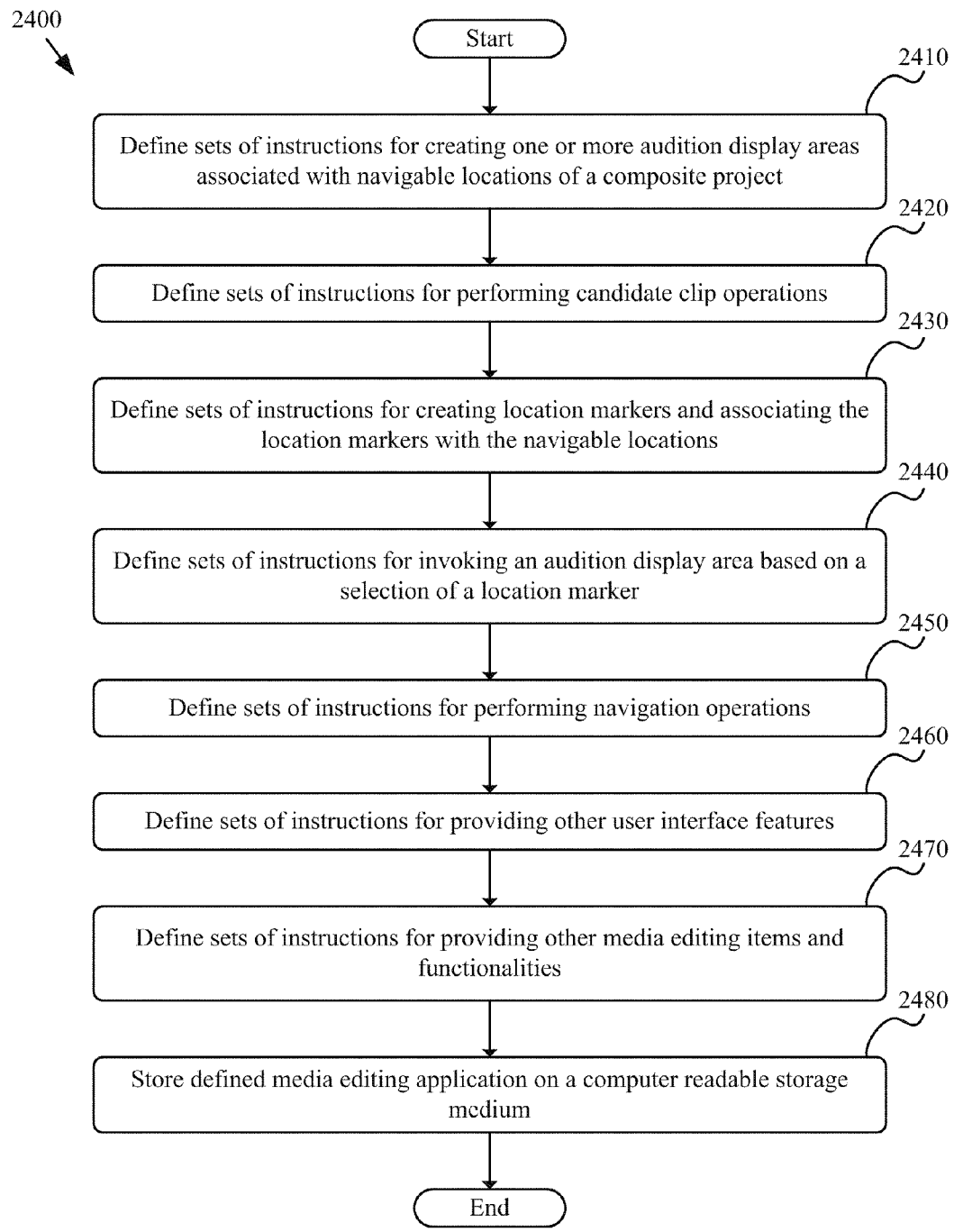
FIG. 24 conceptually illustrates a process used by some embodiments to define a media-editing application.

FIG. 24 conceptually illustrates a process 2400 of some embodiments for defining and storing a media-editing application of some embodiments, such as application 2300. Specifically, process 2400 illustrates the operations used to define sets of instructions for providing several of the elements shown in GUI 800 and for performing various navigation, edit, and audition display area operations described above.

As shown, process 2400 begins by defining (at 2410) sets of instructions for creating (or instantiating) one or more audition display areas (e.g., audition display area 810 described above in reference to FIG. 8) associated with navigable locations of a media editing project. In some cases such sets of instructions are defined in terms of object-oriented programming code. For example, some embodiments may include sets of instructions for defining classes and instantiating various objects at runtime based on the defined classes. The process then defines (at 2420) sets of instructions for performing candidate clip operations (e.g., various operations described above in reference to FIGS. 14-21).

The process 2400 then defines (at 2430) sets of instructions for creating location markers (e.g., markers 830 described above in reference to FIG. 8) and associating the navigation markers with navigable locations (e.g., navigable locations 1160-1192 described above in reference to FIG. 11) of a media editing project. Next, the process defines (at 2440) sets of instructions for invoking an audition display area based on a selection of a location marker (e.g., as described above in reference to FIG. 2).

Next, the process defines (at 2450) sets of instructions for performing navigation operations (e.g., the operations described above in reference to FIGS. 12-13). The process then defines (at 2460) sets of instructions for providing various other user interface features for invoking and/or utilizing the audition display area, navigation tool, and/or other features. These user interface features may include items such as pop-up or drop-down menus (e.g., menu 960, menu 970 described above in reference to FIG. 9, etc.), and/or other items (e.g., view selection control 1050 described above in reference to FIG. 10, composite display area 730 described above in reference to FIG. 7, media library 720 described above in reference to FIG. 7, etc.).

Next, process 2400 defines (at 2470) sets of instructions for providing other media editing items and functionalities. Examples of such editing items may include zoom, color enhancement, blemish removal, audio mixing, etc. In addition, various other media editing functionalities may be defined. Such functionalities may include library functions, format conversion functions, etc. The process defines these additional tools in order to create a media editing application that has many additional features to the features described above.

The process then stores (at 2480) the defined media editing application (i.e., the various sets of instructions) on a computer readable storage medium. In some embodiments, the medium is one or more of a solid-state device, a hard disk, a CD-ROM, or other non-volatile computer readable storage medium.

One of ordinary skill in the art will recognize that the various sets of instructions defined by process 2400 are not exhaustive of the sets of instructions that could be defined and stored on a computer readable storage medium for a media editing application incorporating some embodiments of the invention. In addition, the process 2400 is a conceptual process, and the actual implementations may vary. For example, different embodiments may define the various sets of instructions in a different order, may define several sets of instructions in one operation, may decompose the definition of a single set of instructions into multiple operations, etc. In addition, the process 2400 may be implemented as several sub-processes or combined with other operations within a macro-process.

VII. Computer System

Many of the above-described processes and modules are implemented as software processes that are specified as a set of instructions recorded on a computer readable storage medium (also referred to as "computer readable medium" or "machine readable medium"). When these instructions are executed by one or more computational element(s), such as processors or other computational elements like Application-Specific ICs ("ASIC") and Field Programmable Gate Arrays ("FPGA"), they cause the computational element(s) to perform the actions indicated in the instructions. Computer is meant in its broadest sense, and can include any electronic device with a processor. Examples of computer readable media include, but are not limited to, CD-ROMs, flash drives, RAM chips, hard drives, EPROMs, etc. The computer readable media do not include carrier waves and/or electronic signals passing wirelessly or over a wired connection.

In this specification, the term "software" includes firmware residing in read-only memory or applications stored in magnetic storage which can be read into memory for processing by one or more processors. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described herein is within the scope of the invention. In some embodiments, the software programs when installed to operate on one or more computer systems define one or more specific machine implementations that execute and perform the operations of the software programs.

Figure 25:
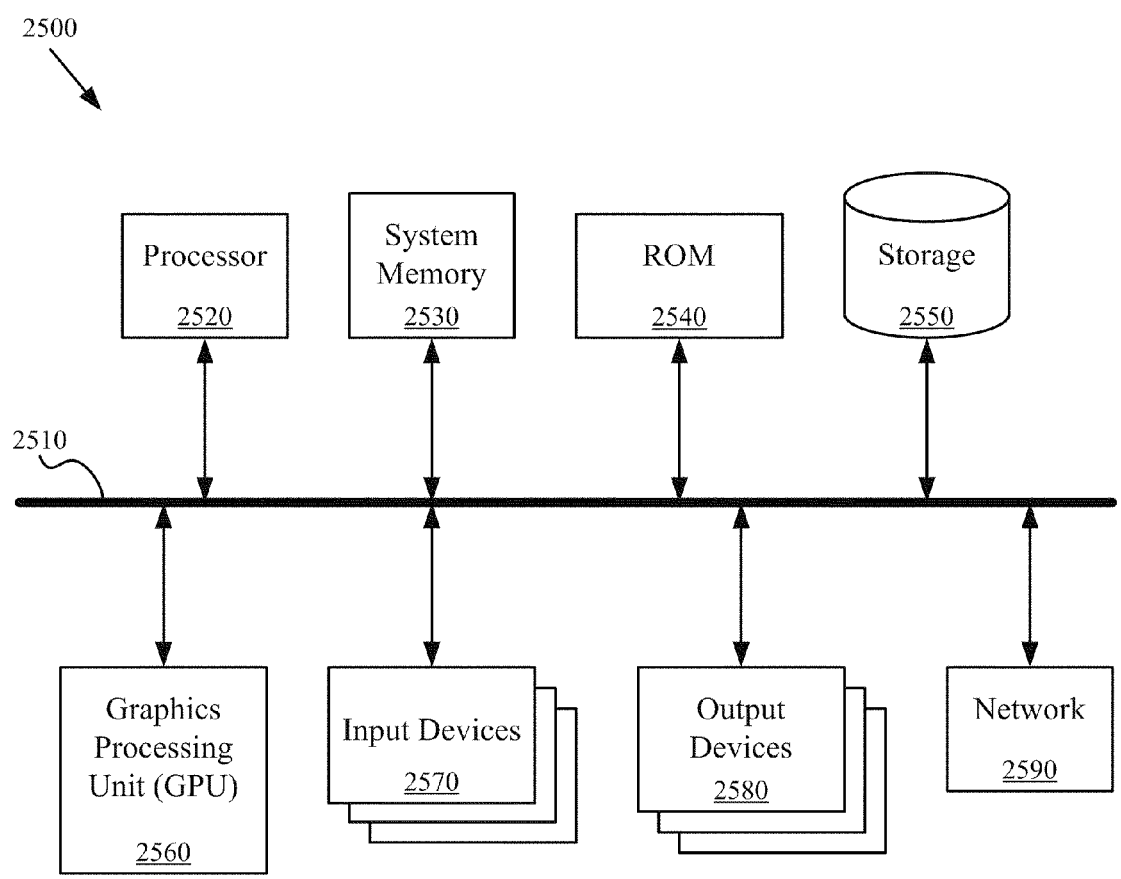
FIG. 25 illustrates a computer system with which some embodiments of the invention are implemented.

FIG. 25 conceptually illustrates a computer system 2500 with which some embodiments of the invention are implemented. For example, the system described above in reference to FIG. 23 may be at least partially implemented using sets of instructions that are run on the computer system 2500. As another example, the processes described in reference to FIGS. 12, 14, 16, 18, and 21 may be at least partially implemented using sets of instructions that are run on the computer system 2500.

Such a computer system includes various types of computer readable mediums and interfaces for various other types of computer readable mediums. Computer system 2500 includes a bus 2510, at least one processing unit (e.g., a processor) 2520, a system memory 2530, a read-only memory (ROM) 2540, a permanent storage device 2550, a graphics processing unit ("GPU") 2560, input devices 2570, output devices 2580, and a network connection 2590. The components of the computer system 2500 are electronic devices that automatically perform operations based on digital and/or analog input signals. The various examples of user interfaces shown in FIGS. 7-10, 13, 15, 17, and 19 may be at least partially implemented using sets of instructions that are run on the computer system 2500 and displayed using the output devices 2580.

One of ordinary skill in the art will recognize that the computer system 2500 may be embodied in other specific forms without deviating from the spirit of the invention. For instance, the computer system may be implemented using various specific devices either alone or in combination. For example, a local PC may include the input devices 2570 and output devices 2580, while a remote PC may include the other devices 2510-2560, with the local PC connected to the remote PC through a network that the local PC accesses through its network connection 2590 (where the remote PC is also connected to the network through a network connection).

The bus 2510 collectively represents all system, peripheral, and chipset buses that communicatively connect the numerous internal devices of the computer system 2500. In some cases, the bus 2510 may include wireless and/or optical communication pathways in addition to or in place of wired connections. For example, the input devices 2570 and/or output devices 2580 may be coupled to the system 2500 using a wireless local area network (W-LAN) connection, Bluetooth®, or some other wireless connection protocol or system.

The bus 2510 communicatively connects, for example, the processor 2520 with the system memory 2530, the ROM 2540, and the permanent storage device 2550. From these various memory units, the processor 2520 retrieves instructions to execute and data to process in order to execute the processes of some embodiments. In some embodiments the processor includes an FPGA, an ASIC, or various other electronic components for execution instructions.

The ROM 2540 stores static data and instructions that are needed by the processor 2520 and other modules of the computer system. The permanent storage device 2550, on the other hand, is a read-and-write memory device. This device is a non-volatile memory unit that stores instructions and data even when the computer system 2500 is off. Some embodiments of the invention use a mass-storage device (such as a magnetic or optical disk and its corresponding disk drive) as the permanent storage device 2550.

Other embodiments use a removable storage device (such as a floppy disk, flash drive, or CD-ROM) as the permanent storage device. Like the permanent storage device 2550, the system memory 2530 is a read-and-write memory device. However, unlike storage device 2550, the system memory 2530 is a volatile read-and-write memory, such as a random access memory (RAM). The system memory stores some of the instructions and data that the processor needs at runtime. In some embodiments, the sets of instructions and/or data used to implement the invention's processes are stored in the system memory 2530, the permanent storage device 2550, and/or the read-only memory 2540. For example, the various memory units include instructions for processing multimedia items in accordance with some embodiments.

In addition, the bus 2510 connects to the GPU 2560. The GPU of some embodiments performs various graphics processing functions. These functions may include display functions, rendering, compositing, and/or other functions related to the processing or display of graphical data.

The bus 2510 also connects to the input devices 2570 and output devices 2580. The input devices 2570 enable the user to communicate information and select commands to the computer system. The input devices include alphanumeric keyboards and pointing devices (also called "cursor control devices"). The input devices also include audio input devices (e.g., microphones, MIDI musical instruments, etc.) and video input devices (e.g., video cameras, still cameras, optical scanning devices, etc.). The output devices 2580 include printers, electronic display devices that display still or moving images, and electronic audio devices that play audio generated by the computer system. For instance, these display devices may display a GUI. The display devices include devices such as cathode ray tubes ("CRT"), liquid crystal displays ("LCD"), plasma display panels ("PDP"), surface-conduction electron-emitter displays (alternatively referred to as a "surface electron display" or "SED"), etc. The audio devices include a PC's sound card and speakers, a speaker on a cellular phone, a Bluetooth® earpiece, etc. Some or all of these output devices may be wirelessly or optically connected to the computer system.

Finally, as shown in FIG. 25, bus 2510 also couples computer 2500 to a network 2590 through a network adapter (not shown). In this manner, the computer can be a part of a network of computers (such as a local area network ("LAN"), a wide area network ("WAN"), an Intranet, or a network of networks, such as the Internet. For example, the computer 2500 may be coupled to a web server (network 2590) so that a web browser executing on the computer 2500 can interact with the web server as a user interacts with a GUI that operates in the web browser.

As mentioned above, some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable blu-ray discs, ultra density optical discs, any other optical or magnetic media, and floppy disks. The computer-readable media may store a computer program that is executable by a device such as an electronics device, a microprocessor, a processor, a multi-processor (e.g., an IC with several processing units on it) and includes sets of instructions for performing various operations. The computer program excludes any wireless signals, wired download signals, and/or any other ephemeral signals.

Examples of hardware devices configured to store and execute sets of instructions include, but are not limited to, ASICs, FPGAs, programmable logic devices ("PLDs"), ROM, and RAM devices. Examples of computer programs or computer code include machine code, such as produced by a compiler, and files including higher-level code that are executed by a computer, an electronic component, or a microprocessor using an interpreter.

As used in this specification and any claims of this application, the terms "computer", "server", "processor", and "memory" all refer to electronic or other technological devices. These terms exclude people or groups of people. For the purposes of this specification, the terms display or displaying mean displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and/or any other ephemeral signals.

It should be recognized by one of ordinary skill in the art that any or all of the components of computer system 2500 may be used in conjunction with the invention. Moreover, one of ordinary skill in the art will appreciate that any other system configuration may also be used in conjunction with the invention or components of the invention.

While the invention has been described with reference to numerous specific details, one of ordinary skill in the art will recognize that the invention can be embodied in other specific forms without departing from the spirit of the invention. For example, several embodiments were described above by reference to particular media editing applications with particular features and components (e.g., the audition display area, the audition display area management module). However, one of ordinary skill in the art will realize that other embodiments might be implemented with other types of media editing applications with other types of features and components (e.g., different types of audition display areas).

Moreover, while the examples shown illustrate many individual modules as separate blocks (e.g., the editing module 2320, the audition display area management module 2330, etc.), one of ordinary skill in the art would recognize that some embodiments may combine these modules into a single functional block or element. One of ordinary skill in the art would also recognize that some embodiments may divide a particular module into multiple modules. One of ordinary skill in the art would understand that the invention is not to be limited by the foregoing illustrative details, but rather is to be defined by the appended claims.

The invention claimed is:
1. A method of providing a media-editing application for creating a composite presentation by compositing a set of media clips, the method comprising:
   providing a media display area to display a plurality of media clips for adding to the composite presentation;
   providing a composite display area to receive and display a plurality of committed media clips that are committed to be a part of the composite presentation;
   providing a plurality of audition display areas to receive and display candidate media clips that are not committed media clips but are candidates for adding to the composite presentation;
   providing a plurality of selectable location markers that are associated with a plurality of locations along the composite display area; and
   responsive to selection of one of the location markers, causing an associated audition display area to be opened to receive one or more candidate media clips for adding to the composite presentation at the location of the composite display area that is associated with the selected location marker;
   wherein each location marker has a first appearance when no candidate media clip is present in the marker's audition display area, and a second appearance when at least one candidate media clip is present in the marker's audition display area;

wherein, when the marker has the first appearance, the marker's associated audition display area opens in order to receive one or more media clips; and wherein, when the marker has the second appearance, the marker's associated audition display area opens to display the candidate media clips that are present in the audition display area, receive additional candidate media clips to add to the audition display area, and receive selections of one or more candidate media clips present in the audition display area to remove from the audition display area.

2. The method of claim 1, wherein the location marker changes from the first appearance to the second appearance when a candidate clip is added to the audition display area.

3. The method of claim 1, wherein the location marker changes from the second appearance to the first appearance when a candidate media clip that is the only candidate media clip present in the audition display area is removed from the audition display area.

4. The method of claim 1, wherein a candidate media clip is added to the audition display area using at least one of a cursor operation and a set of keystrokes.

5. The method of claim 1, wherein a committed clip is removed from the composite display area and added as a candidate clip to the audition display area associated with the location marker.

6. The method of claim 1, wherein a media clip from the media display area is added as a candidate clip to the audition display area associated with the location marker.

7. The method of claim 1, wherein each location marker comprises a representative image of a media clip in the associated location in the composite display area.

8. The method of claim 7, wherein the representative image is a thumbnail image.

9. The method of claim 1, wherein the composite display area receives and displays a set of clips from the media display area or the audition display areas, wherein adding the set of clips from a particular audition display area removes the same set of clips from the particular audition display area.

10. The method of claim 1, wherein each audition display-area receives and displays a set of clips from the media display area or the composite display area, wherein adding the set of clips from the composite display area removes the same set of clips from the composite display area.

11. A non-transitory computer readable medium storing a media editing application that when executed by at least one processing unit provides a user interface (UI) for creating a composite presentation using a plurality of media clips, said UI comprising:

a media display area to display media clips for adding to the composite presentation;

a composite display area to receive and display a plurality of committed media clips that are committed to be a part of a composite presentation;

a plurality of audition display areas to receive and display one or more candidate media clips that are not committed media clips but are candidates for adding to the composite presentation;

a plurality of selectable location markers that are associated with a plurality of locations along the composite display area, wherein each location marker is associated with one audition display area; and responsive to selection of one of the plurality of location markers, causing the associated audition display area to be opened to receive one or more candidate media clips for adding to the composite presentation at the location of the composite display area that is associated with the selected location marker;

wherein each location marker has a first appearance when no candidate media clip is present in the marker's audition display area, and a second appearance when at least one candidate media clip is present in the marker's audition display area;

wherein, when the marker has the first appearance, the marker's associated audition display area opens in order to receive one or more media clips; and wherein, when the marker has the second appearance, the marker's associated audition display area opens to display the candidate media clips that are present in the audition display area, receive additional candidate media clips to add to the audition display area, and receive selections of one or more candidate media clips present in the audition display area to remove from the audition display area.

12. The non-transitory computer readable medium of claim 11, wherein the composite display area comprises a plurality of tracks for displaying one or more of the committed clips, wherein each candidate clip in an audition display area is for adding to any one of the plurality of tracks of the composite display area, wherein adding the candidate clip removes the same clip from the audition display area.

13. The non-transitory computer readable medium of claim 11, wherein each audition display area receives and displays a set of clips from the media display area or the composite display area, wherein adding the set of clips from the composite display area removes the same set of clips from the composite display area.

14. The non-transitory computer readable medium of claim 11, wherein the UI further comprises a timeline that represents a duration of the composite presentation, wherein the composite display area spans along the timeline.

15. The non-transitory computer readable medium of claim 11, wherein the UI further comprises a set of selectable items for switching between a thumbnail view that displays each candidate clip as thumbnail representations, and a list view that lists each candidate clip with the candidate clip's associated attributes.

16. The non-transitory computer readable medium of claim 15, wherein the UI further comprises a timeline that represents a duration of the composite presentation, wherein the composite display area spans along the timeline, wherein the candidate clip's associated attributes include at least one attribute that identifies a position of the candidate clip with respect to the timeline.

* * * * *